United States Patent [19]
Kishimoto et al.

[11] Patent Number: 5,648,160
[45] Date of Patent: Jul. 15, 1997

[54] MAGNETIC POWDER, METHOD FOR PRODUCING THE SAME AND USE OF THE SAME

[75] Inventors: Mikio Kishimoto; Shinichi Kitahata; Hisao Kanzaki, all of Ibaraki; Noriaki Ohtani, Osaka; Toshinobu Sueyoshi, Kyoto, all of Japan

[73] Assignee: Hitachi Maxell, Ltd., Osaka, Japan

[21] Appl. No.: 557,174

[22] PCT Filed: Apr. 14, 1995

[86] PCT No.: PCT/JP95/00731

§ 371 Date: Mar. 14, 1996

§ 102(e) Date: Mar. 14, 1996

[87] PCT Pub. No.: WO95/28718

PCT Pub. Date: Oct. 26, 1995

[30] Foreign Application Priority Data

| Apr. 14, 1994 | [JP] | Japan | 6-101877 |
| Apr. 27, 1994 | [JP] | Japan | 6-89910 |
| Jun. 20, 1994 | [JP] | Japan | 6-162645 |
| Jul. 25, 1994 | [JP] | Japan | 6-192902 |
| Aug. 24, 1994 | [JP] | Japan | 6-222418 |

[51] Int. Cl.$^6$ ................................ G11B 5/706
[52] U.S. Cl. ............... 428/328; 428/336; 428/403; 428/404; 428/694 BA; 428/900; 148/105; 148/314; 360/2; 235/493; 283/82; 283/904
[58] Field of Search ............... 428/403, 404, 428/694 BA, 328, 900, 65.3, 336; 148/105, 314; 360/135, 2; 235/493; 283/82, 904

[56] References Cited

U.S. PATENT DOCUMENTS 4,277,806 7/1981 Jeffers et al. .................. 360/16

FOREIGN PATENT DOCUMENTS 61-105727 5/1986 Japan.

OTHER PUBLICATIONS

Derwent Publications Ltd., London, GB, Abstract No. AN 77–44523Y, May 1977.

Derwent Publications Ltd., London, GB, Abstract No. AN 77–38926Y, Apr. 1977.

*Primary Examiner*—Stevan A. Resan
*Attorney, Agent, or Firm*—Birch, Stewart, Kolasch & Birch, LLP

[57] ABSTRACT

A magnetic powder containing MnBi, in which an average particle size of the magnetic powder is from 0.1 µm to 20 µm; a coercive force is from 3000 to 15,000 Oe at 300 K. and 50 to 1000 Oe at 80 K. when measured with applying a magnetic field of 16 KOe; an amount of magnetization is from 20 emu/g to 60 emu/g when measured at 300 K. with applying a magnetic field of 16 KOe; a degree of decrease of an amount of magnetization is 40% or less after being maintained in an atmosphere of 60° C. and 90% RH for 7 days; and a content of metal bismuth (Bi) satisfies the following equation: Metal Bi/(MnBi+metal Bi)<0.5 in which "metal Bi" means a peak area assigned to the (012) plane in a X-ray diffraction pattern of Bi, and "MnBi" means a peak area assigned to the (101) plane in a X-ray diffraction pattern of MnBi, which magnetic powder is excellent in corrosion resistance, and suffers from very slight deterioration of saturation magnetization, and provides a magnetic recording medium that can prevent altering of recorded data.

48 Claims, 19 Drawing Sheets

Change of reproducing output after application of direct demagnetization magnetic field (Reproducing output being normalized by output before application of direct demagnetization magnetic field)

Temperature dependency of coercive force

Initial magnetization curve of MnBi coating layer of longitudinal direction orientation Change of reproducing output after application of direct demagnetization magnetic field (Reproducing output being normalized by output before application of direct demagnetization magnetic field)

Relationship between grinding time and particle size of MnBi magnetic powder

Relationship between grinding time and magnetization of MnBi magnetic powder at 300K $$S^* = a/b$$

Method for measuring S*

X-ray diffraction patterns of MnBi magnetic powder after maintaining it in atmosphere with humidity

MAGNETIC POWDER, METHOD FOR PRODUCING THE SAME AND USE OF THE SAME

FIELD OF THE INVENTION

The present invention relates to a MnBi magnetic powder, a method for producing the same, a magnetic recording medium comprising the magnetic powder produced by said method, and a method and apparatus for recording and reproducing said magnetic recording medium.

DESCRIPTION OF THE PRIOR ART

A magnetic recording medium is widely used as a video tape, a floppy disc, a credit card, a prepaid card, and so on, since it is easily recorded and reproduced.

However, the feature that the recording and reproducing are easy raises problems that recorded data tend to be erased by mistake and data are easily altered. For example, in a case of a magnetic card, accidents or crimes such that data are erased by a magnetic having a strong magnetic field which is used in various doors or handbags, or data are altered to use the magnetic card fraudulently, occur frequently.

As a countermeasure to such accidents or crimes, there is proposed a recording medium in which irreversible change is caused therein by a laser beam and once recorded data cannot be rewritten such as an optical card, or an IC card in which data cannot be altered and which has a high security. However, the optical card requires an expensive apparatus which is exclusively used with the optical card for recording and reproducing data in the optical card, and the IC card is associated with a high cost since it uses a semiconductor. Then, the optical card or the IC card cannot be substituted for the magnetic cards which are spread over the world, and has not been widely used as expected.

Then, various proposals have been made to prevent altering of the magnetic card. For example, a printing is provided on the magnetic card by a hologram printing method or a high level printing method. This method can be effective in preventing forgery in appearance but cannot prevent the altering of the data recorded on a magnetic stripe, if such altering is done by writing data which are read from other credit card on a genuine credit card which is obtained by an illegal way, and therefore, the written data are genuine. Therefore, such altering of the data cannot be prevented.

It is known that data which are once recorded on a magnetic recording medium using a MnBi magnetic powder as a recording element cannot be easily rewritten at room temperature (see Japanese Patent Publication Nos. 46801/1977, 19244/1979, 33725/1979, 38962/1982, 38963/1982 and 31764/1984). In particular, since reading apparatuses for magnetic cards are widely spread over the world, the magnetic recording media utilizing the MnBi magnetic powder attract attentions as media which can prevent accidents or crimes such as erroneous erasing of the data or intentional altering of the date in the field of credit cards or prepaid cards in which such accidents or fraudulent uses occur frequently.

However, the conventional MnBi magnetic powder has a deliquescence property inherently. When it is stored at high temperature and high humidity for a long time, it is corroded and decomposed, and its saturation magnetization is deteriorated. To solve this drawback, it is tried to surround the MnBi magnetic powder by a dense binder resin, or add a volatile rust preventive in the magnetic layer (see Japanese Patent Publication Nos. 57127/1985 and 1048/1986).

However, in these methods, a shielding effect against steam which is almost in a molecular state is low, so that they cannot sufficiently prevent gradual penetration of water molecules in the magnetic layer, and does not achieve sufficient effect.

Since $MnO_2$, an oxide of Mn which is one of the constituent elements of the MnBi magnetic powder is a stable oxide by nature, corrosion resistance of the magnetic powder may be improved, if a uniform coating of $MnO_2$ can be formed. In general, to form $MnO_2$, Mn should be heated at high temperature in an oxidizing atmosphere. But, when a finely ground magnetic powder for magnetic recording is heated at high temperature in the oxidizing atmosphere, its saturation magnetization is severely decreased. In addition, when MnBi is oxidized, an oxide of Bi is formed in addition to the oxide of Mn. Mn and Bi are present in the form of MnBi which is an intermetallic compound of Mn and Bi, they are relatively stable in a usual atmosphere. But, if water is present, MnBi is decomposed to Mn and Bi to form oxides of Mn and Bi. Once the oxides of Mn and Bi are formed, a local cell is set up, whereby decomposition and corrosion of MnBi are accelerated in the presence of water. Accordingly, it is difficult to apply the stabilization by the formation of a $MnO_2$ film to the MnBi magnetic powder.

SUMMARY OF THE INVENTION

A first object of the present invention is to provide a MnBi magnetic powder which hardly suffers from deterioration of saturation magnetization and is excellent in corrosion resistance, by heat treating a MnBi magnetic powder at a specific temperature in a specific atmosphere to preferentially form an oxide of Mn having a specific structure only on or near surfaces of the MnBi magnetic powder particles.

A second object of the present invention is to provide a method for producing such MnBi magnetic powder which is excellent in corrosion resistance.

A third object of the present invention is to provide a magnetic recording medium comprising a binder resin and an additive which are suitable for such MnBi magnetic powder.

A fourth object of the present invention is to provide a magnetic card made of such magnetic recording medium, in which once recorded data cannot be rewritten.

A fifth object of the present invention is to provide a magnetic recording medium having novel characteristics by using the magnetic recording medium comprising such MnBi magnetic powder and a conventional magnetic recording medium in combination.

A sixth object of the present invention is to provide a method and apparatus for recording and reproducing the above magnetic recording medium having the unique characteristics.

According to a first aspect of the present invention, there is provided a magnetic powder comprising MnBi, wherein an average particle size of the magnetic powder is from 0.1 µm to 20 µm; a coercive force is from 3000 to 15,000 Oe at 300 K. and 50 to 1000 Oe at 80 K. when measured with applying a magnetic field of 16 KOe; an amount of magnetization is from 20 emu/g to 60 emu/g when measured at 300 K. with applying a magnetic field of 16 KOe; a degree of decrease of an amount of magnetization is 40% or less after being maintained in an atmosphere of 60° C. and 90% RH for 7 days; and a content of metal bismuth (Bi) satisfies the following equation:

$$\text{Metal Bi}/(\text{MnBi}+\text{metal Bi}) < 0.5$$

wherein "metal Bi" means a peak area assigned to the (012) plane in a X-ray diffraction pattern of Bi, and "MnBi" means a peak area assigned to the (101) plane in a X-ray diffraction pattern of MnBi.

According to a second aspect of the present invention, there is provided a MnBi magnetic powder particles of which have an inorganic coating in an amount of 1 to 50 wt. % based on the weight of the particles.

According to a third aspect of the present invention, a method for producing the above MnBi magnetic powder comprises the steps of mixing Mn powder or Mn-containing powder and Bi powder or Bi-containing powder both having a particle size of 50 to 300 mesh in amounts such that a molar ratio of Mn to Bi is from 45:55 to 65:35, press molding the mixture, heating and reacting the mixture in a non-oxidizing or reducing atmosphere at a temperature not higher than the melting point of Bi to form MnBi, grinding MnBi in a non-oxidizing atmosphere to form fine magnetic powder of MnBi, and optionally heat treating the obtained magnetic powder in an atmosphere containing oxygen, or in an atmosphere containing oxygen and in a non-oxidizing atmosphere.

According to a fourth aspect of the present invention, there is provide a magnetic recording medium comprising a magnetic layer which contains the above MnBi magnetic powder, wherein a coercive force is from 5000 to 16,000 Oe at 300 K. and 100 to 1500 Oe at 80 K. when measured with applying a magnetic field of 16 KOe; a magnetic flux density is from 500 to 2500 G when measured at 300 K. with applying a magnetic field of 16 KOe; a squareness in the longitudinal direction is from 0.60 to 0.95; a degree of decrease of the magnetic flux density is 50% or less after being maintained in an atmosphere of 60° C. and 90% RH for 7 days. Further, there is provided a magnetic recording medium comprising a magnetic layer which additionally contains a binder resin having a basic functional group or an additive having a basic functional group. In addition, there is provided a magnetic recording medium comprising a water-repellent layer on a surface of a magnetic layer or between the magnetic layer and a substrate, or a magnetic recording medium comprising a magnetic layer which contains the above MnBi magnetic powder and also a conventional magnetic powder. Furthermore, there is provide a magnetic card made of such magnetic recording medium.

According to a fifth aspect of the present invention, there is provided a method for recording and reproducing a magnetic recording medium, which comprises the steps of demagnetizing the above magnetic recording medium by cooling it to a low temperature, and recording and reproducing signals using a magnetic head. Preferably, when the magnetic recording medium is demagnetized at the low temperature, an alternating magnetic field is applied to the magnetic layer to demagnetize it in a state that the magnetic recording medium is cooled or immediately after cooling the magnetic recording medium.

According to a sixth aspect of the present invention, there is provided an apparatus for reproducing a magnetic recording medium comprising a magnetic head for reproducing data which are magnetically recorded in said magnetic recording medium, and means for applying a direct or alternating magnetic field an intensity of which is smaller than a coercive force of the magnetic layer onto the magnetic layer, said means being provided on an upstream side in relation to said magnetic head.

The magnetic powder of the present invention has greatly improved corrosion resistance and less suffers from the deterioration of saturation magnetization.

The magnetic recording medium of the present invention such as the magnetic card has the characteristic that once recorded data cannot be easily erased at room temperature, and prevents the altering of the data which is one of the big problems of the magnetic card. Further, it hardly suffers from the deterioration of saturation magnetization after long term storage at high temperature and high humidity.

Further, the magnetic recording medium of the present invention has a very specific property that its coercive force is very large and at least 10,000 Oe at room temperature, while it decreases to 1500 Oe or less at a temperature of about 100 K. or lower. Then, when the magnetic recording medium is demagnetized at a low temperature of about 100 K. or lower, and the signals are recorded using a magnetic head at room temperature, the recorded signals cannot be easily rewritten at room temperature.

When the recorded magnetic recording medium is reproduced using an apparatus for reproducing the magnetic recording medium comprising means for applying a direct or alternating magnetic field an intensity of which is smaller than a coercive force of the magnetic layer onto the magnetic layer which means is provided on an upstream side in relation to said magnetic head, only the data of a genuine medium can be reproduced, while data of an altered medium which copied the date of the above medium cannot be reproduced.

DETAILED DESCRIPTION OF THE INVENTION

Now, the present invention will be explained in detail.

Figure 1:
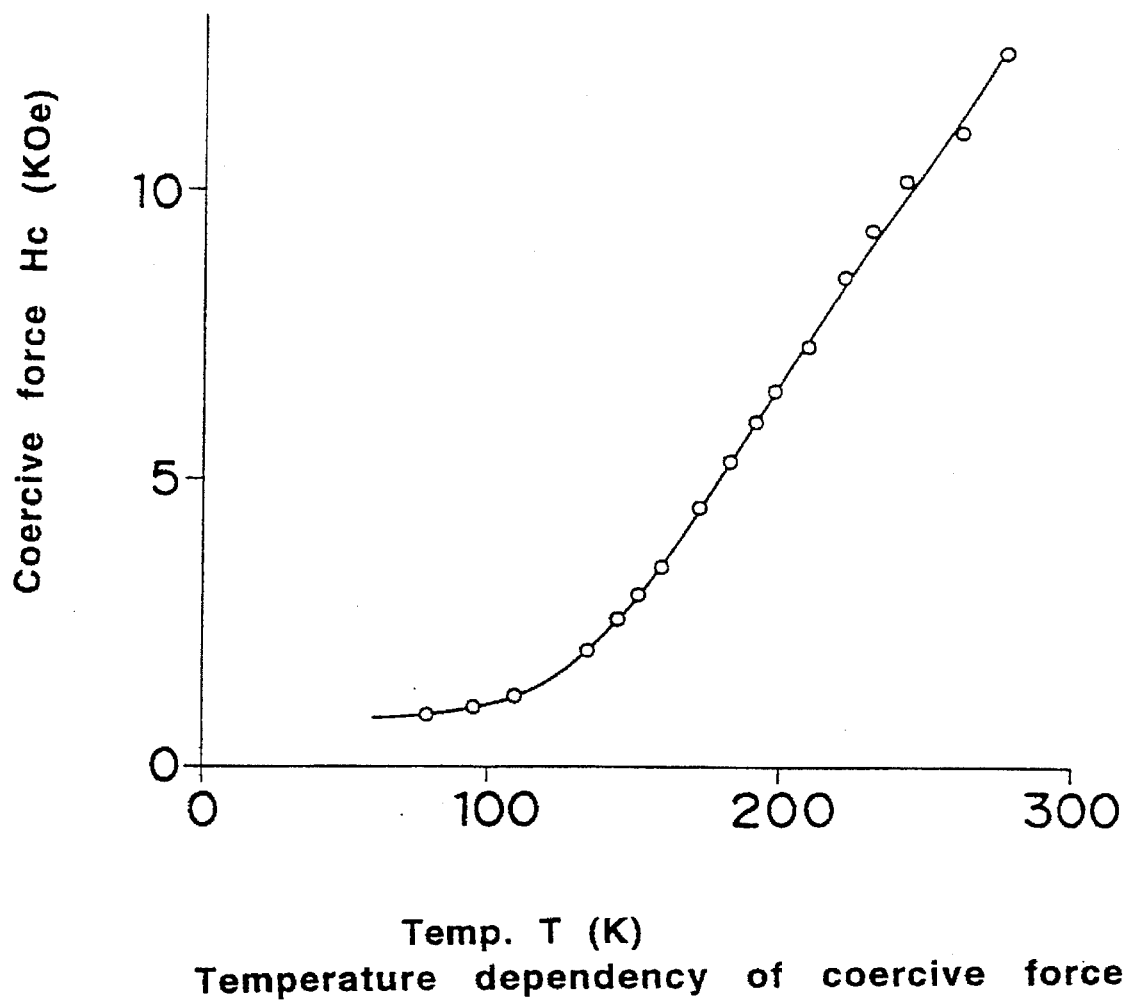
FIG. 1 shows an example of temperature dependency of a coercive force of a MnBi magnetic powder.

As understood from FIG. 1 showing a temperature dependency of a coercive force of an example of the MnBi magnetic powder, its coercive force is as high as about 12,000 Oe at room temperature, while it decreases as the temperature decreases, and reaches 1500 Oe or smaller at 100 K.. Using this property, the MnBi magnetic powder can be demagnetized by cooling it to a low temperature, and after demagnetization, it is easily magnetized at room temperature.

Figure 2:
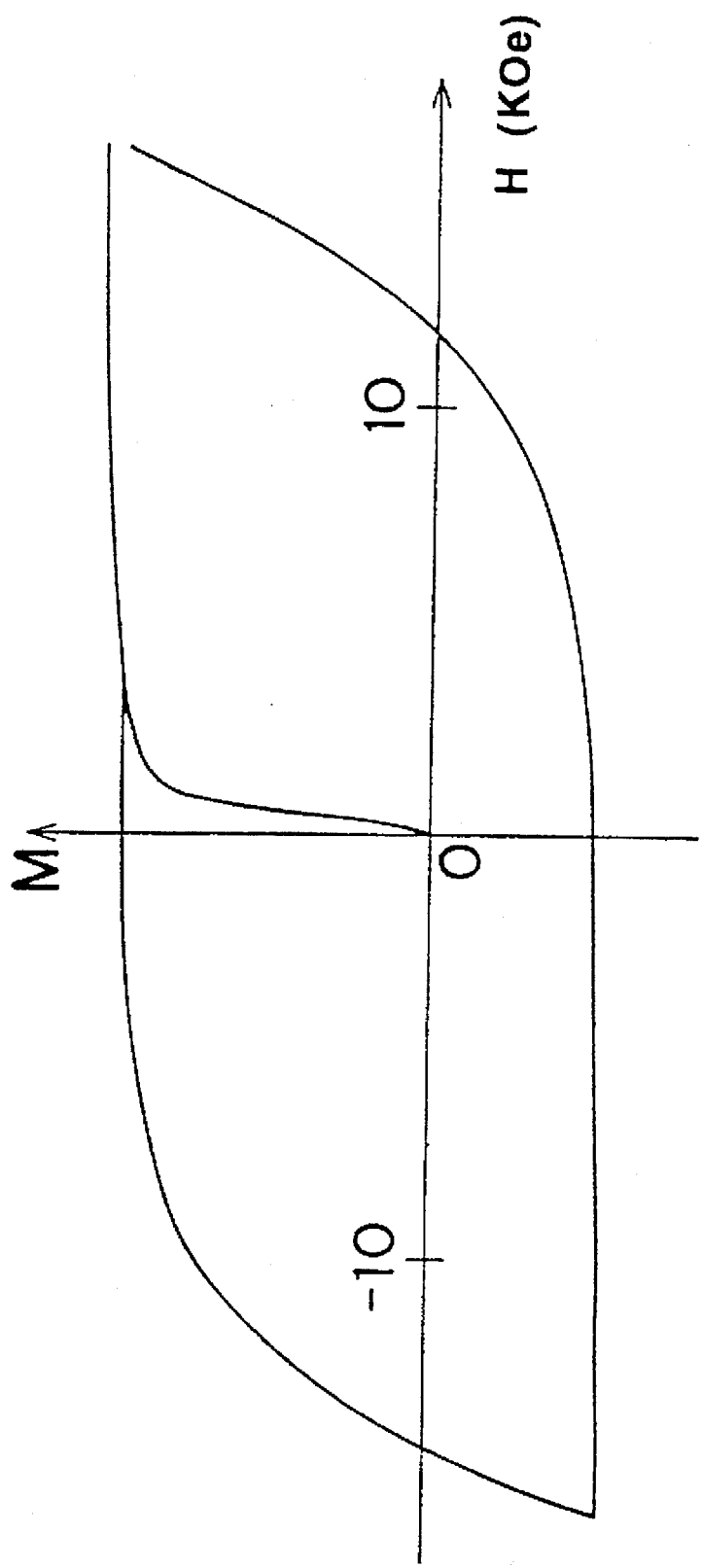
FIG. 2 shows an example of an original magnetization curve and a hysteresis curve of a magnetic recording medium comprising the MnBi magnetic powder.

FIG. 2 shows an original magnetization curve of a magnetic recording medium comprising the MnBi magnetic powder. As seen from FIG. 2, when the magnetic recording medium is demagnetized by cooling it at a low temperature, it can be magnetized easily by a small magnetic field of about 2000 Oe. However, once this magnetic recording medium is magnetized, it has a high coercive force of about 14,000 Oe, and thereafter, data are hardly or not erased or rewritten.

Figure 3:
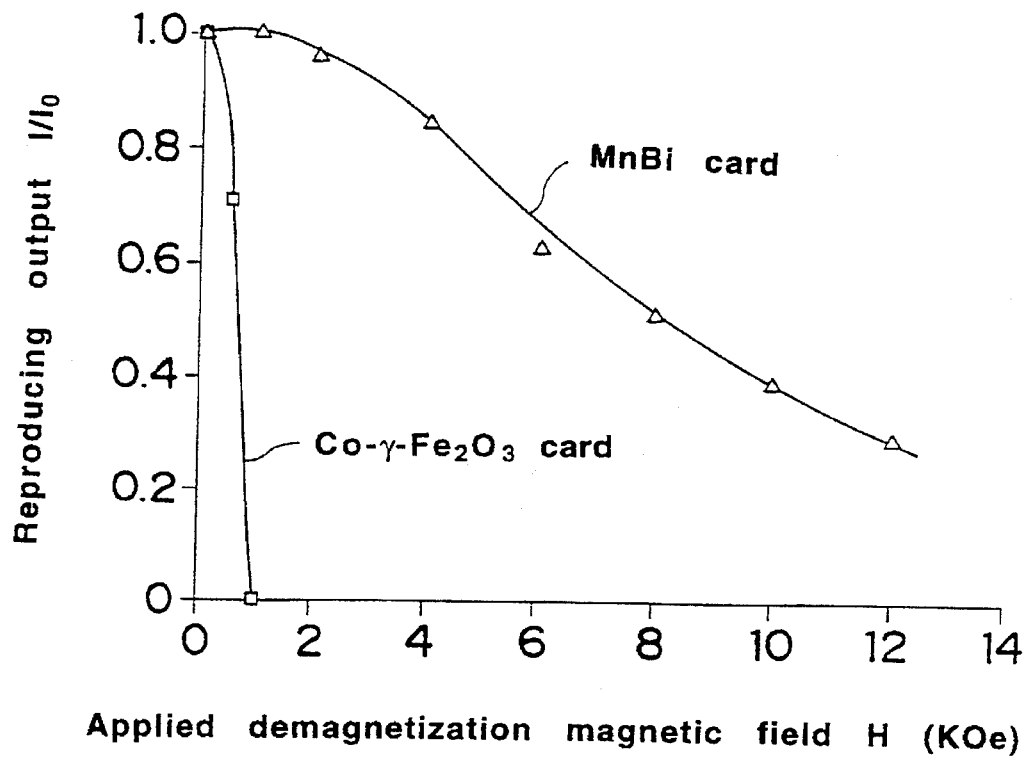
FIG. 3 shows the results of the magnetic field stability test of a reproducing output of a magnetic card using the MnBi magnetic powder and a Co-$\gamma$-$Fe_2O_3$ magnetic powder.
Figure 4:
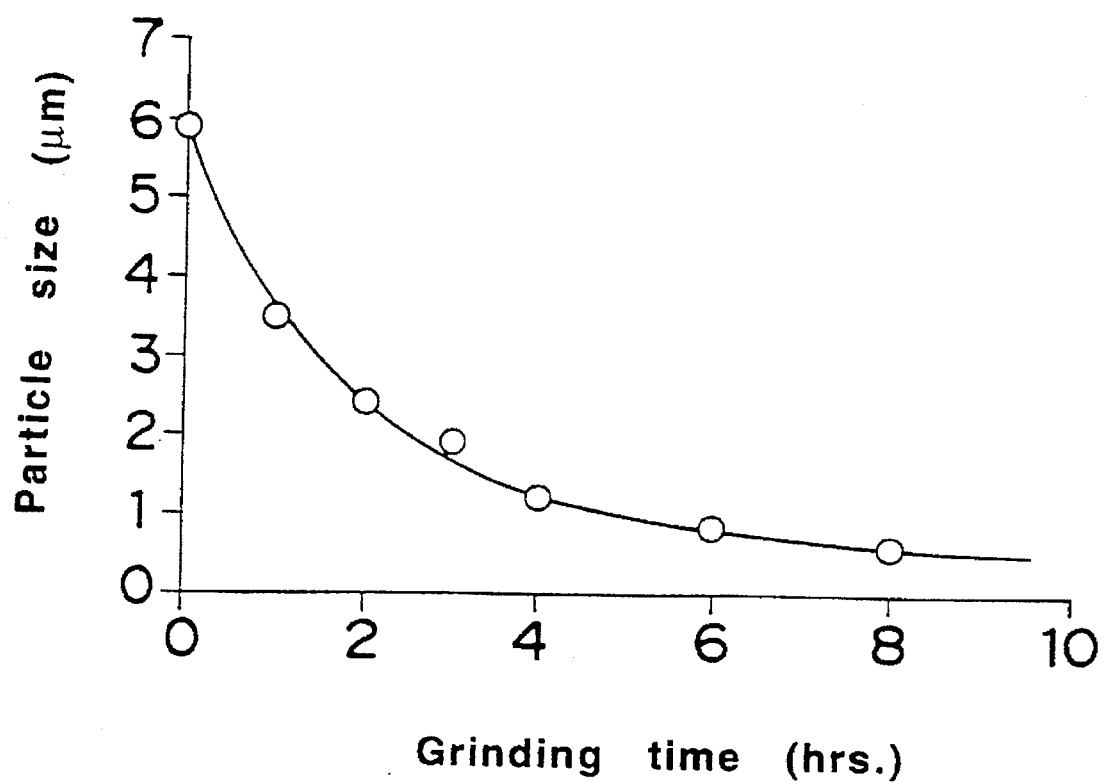
FIG. 4 shows a relationship between a grinding time and a particle size of the MnBi magnetic powder.
Figure 5:
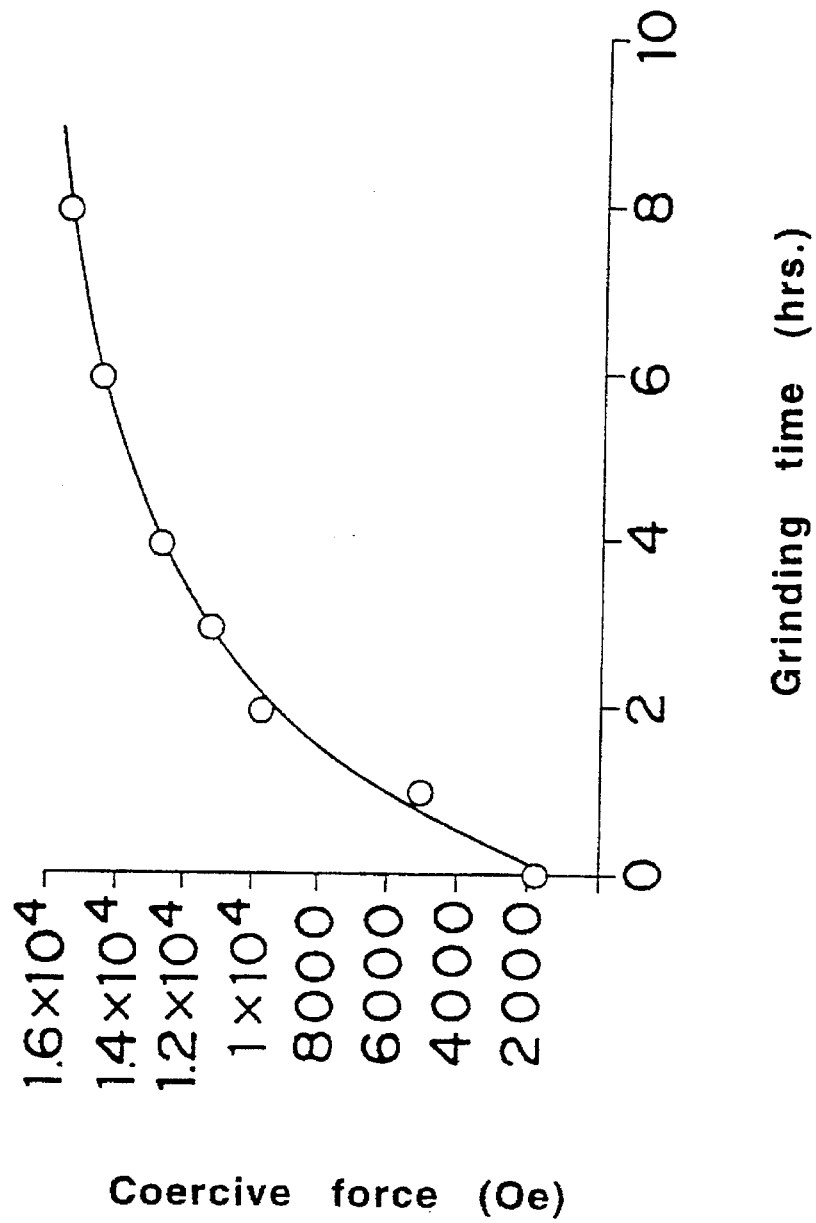
FIG. 5 shows a relationship between a grinding time and a coercive force at 300 K. of the MnBi magnetic powder.
Figure 6:
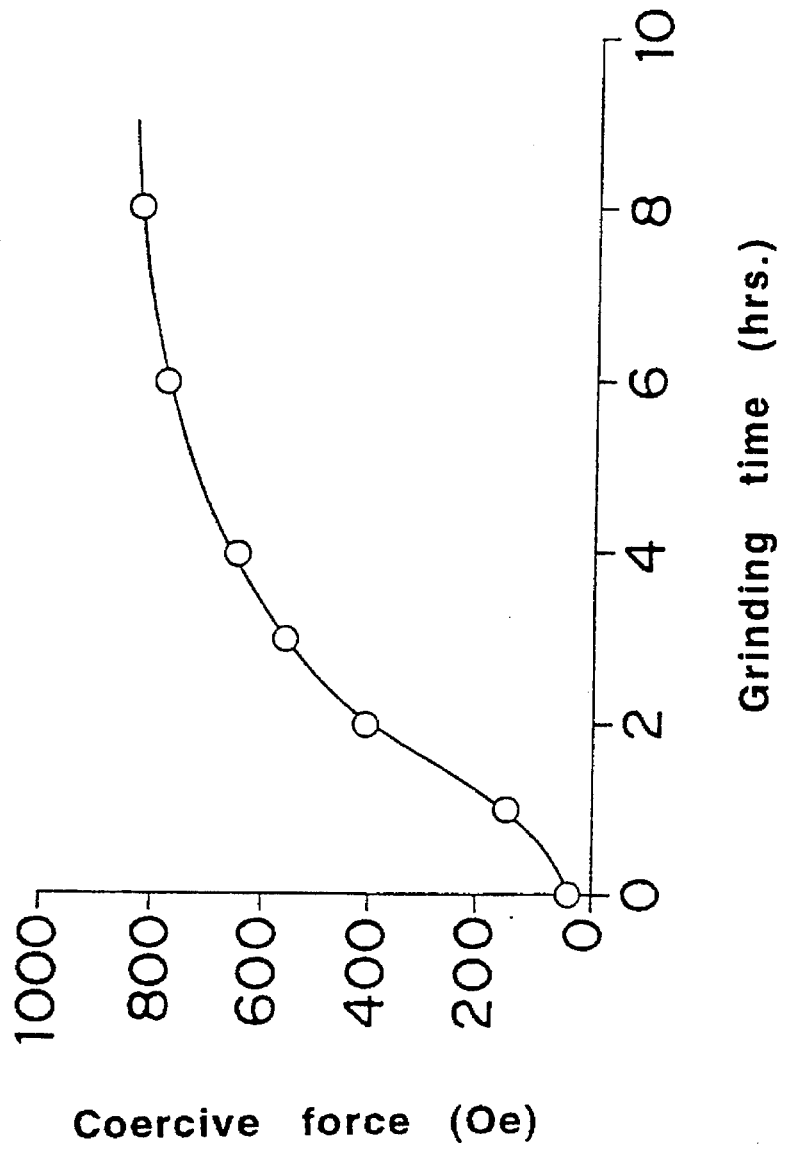
FIG. 6 shows a relationship between a grinding time and a coercive force at 80 K. of the MnBi magnetic powder.
Figure 7:
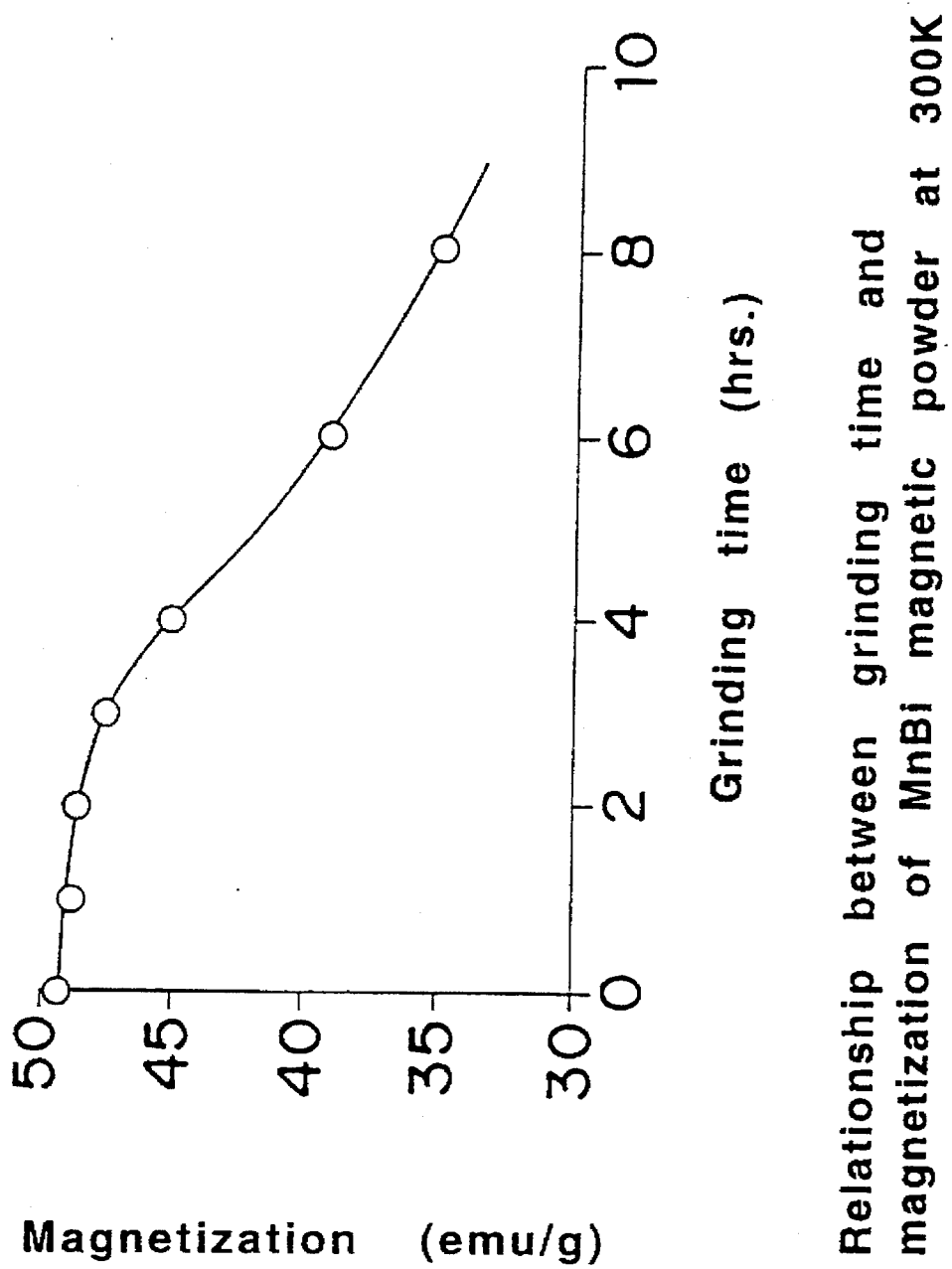
FIG. 7 shows a relationship between a grinding time and an amount of magnetization at 300 K. of the MnBi magnetic powder.

FIG. 3 shows the erasing characteristic of the magnetic card utilizing such magnetic recording medium. FIG. 3 indicates that a conventional magnetic card is almost completely demagnetized by the application of a magnetic filed of about 1000 Oe, so that data can be easily rewritten. In the case of the magnetic card comprising the MnBi magnetic powder, an output decreases only by 30% when a magnetic field of about 5000 Oe is applied, and about 50% of the output remains when a magnetic field of about 8000 Oe is applied. These results mean that, once the data are recorded, they are hardly rewritten.

The MnBi magnetic powder of the present invention may be prepared by forming an MnBi ingot by a powder metallurgy method, an arc furnace melting method, a high frequency melting method, or a melt quenching method, and grinding the ingot. For example, when the powder metallurgy method is used, the magnetic powder is produced by the steps of producing the ingot, grinding the ingot and stabilizing the ground metal as described below. The MnBi magnetic powder may be obtained by a method other than grinding.

First, a Mn powder and a Bi powder both having 50 to 300 mesh sizes are well mixed, and pressed under pressure to obtain an ingot.

The above mixing is preferably carried out in an inert atmosphere, while it may be carried out in an oxidizing atmosphere.

When the Mn powder and the Bi powder are mixed, a molar ratio of Mn to Bi is from 45:55 to 65:35 preferably. When the mole of Mn is larger than that of Bi, an oxide or hydroxide of Mn is formed on the surface of the produced MnBi magnetic powder, so that the corrosion resistance of the MnBi magnetic powder is improved, and good quality powder is obtained. Then, the mole of Mn is preferably larger than that of Bi.

As the Mn powder and the Bi powder to be used herein, those containing a smaller amount of impurities are preferably used, while they may contain other metal such as Ni, Al, Cu, Pt, Zn, Fe, etc. to adjust the magnetic properties. When such other metal is added, an amount of other metal is from 0.6 to 5.0 atomic % based on the amount of MnBi, since the magnetic properties cannot be preferably controlled if the amount of other metal is less than 0.6 atomic %, while a crystalline structure of MnBi is destroyed so that the inherent properties of MnBi cannot be attained if the amount of other metal exceeds 5.0 atomic %.

When the other metal is added, it is preferred to form an alloy of Mn and the other metal.

As the Mn powder and the Bi powder, an already ground powder may be used, or flakes or bulks such as shot may be finely ground and uses. In the case of synthesis of MnBi by a sintering reaction, the synthesis reaction takes place smoothly when the Mn powder and the Bi powder which are finely ground to 50 to 300 mesh, since MnBi is formed by diffusion of Mn and Bi through contact interfaces between the powder particles. Since the reaction is greatly influenced by surface properties, it is preferred to remove oxidized coatings from the surfaces of the Mn and Bi powders. To this end, preferably the surfaces of the Mn and Bi powders are beforehand treated by a conventional surface treating method employed in the powder metallurgy such as etching with, for example, an acid, or defatting with a solvent, and so on.

The Mn and Bi powders are mixed by any apparatus such as an automated mortar, a ball mill, and so on.

When the Mn and Bi powders are pressed under pressure to form a molded piece, a pressing pressure is preferably from 1 to 8 ton/cm$^2$. When the molded piece is produced by pressing under such pressure, the sintering reaction is accelerated so that a homogeneous ingot is obtained. When the pressing pressure is too low, homogeneity of the MnBi ingot is not achieved, while when it is too high, the pressing apparatus becomes expensive but the properties of the MnBi ingot are not improved further.

The produced molded piece is sealed in a glass container or a metal container, and the interior of the container is evacuated or replaced by an inert gas to prevent oxidation of MnBi during the heat treatment. As the inert gas, hydrogen, nitrogen or argon may be used. Among them, nitrogen gas is most suitable in view of a cost.

The sealed container including the molded piece is placed in an electric furnace and heated at a temperature of 260 to 271° C. for 2 to 15 days. When the temperature is low, the heat treatment requires a longer time, and an amount of magnetization of the obtained ingot is lowered. When the temperature is too highs, Bi melts and flows so that the homogeneous ingot cannot be obtained. Then, the heat treatment is carried out preferably at a temperature just below the melting point of Bi.

The produced MnBi ingot is removed from the electric furnace and coarsely ground by, for example, the automated mortar to adjust a particle size to 100 to 500 μm. Then, the coarse particles are finely ground by wet grinding using impact of balls with a ball mill, a planetary ball mill, etc., or dry grinding using impact caused by impinging particles against other particles or a wall of a vessel with a jet mill, etc.

In the grinding using the impact of the balls, when the particles are ground with decreasing a diameter of a ball as the grinding of the particles proceeds, the magnetic powder having more uniform particle sizes can be obtained. Since MnBi has a hexagonal system structure, it is cleaved. Therefore, it is not necessary to apply a large amount of energy in the grinding step.

In the wet grinding, an organic solvent is preferably used as a liquid medium. More preferably, a non-polar solvent such as toluene is used as the organic solvent, and dissolved water is beforehand removed from the solvent.

The dry grinding is preferably carried out in a non-oxidizing atmosphere. As the non-oxidizing atmosphere, a vacuum atmosphere or an inert gas atmosphere of nitrogen or argon is preferred.

An average particle size of the obtained MnBi magnetic powder is in a range between 0.1 μm and 20 μm. A particle size can be controlled by adjusting the grinding conditions. When the average particle size is smaller than 0.1 μm, the saturation magnetization of the finally obtained magnetic powder is decreased. When the average particle size exceeds 20 μm, the coercive force of the magnetic powder does not reach a sufficient value, and surface smoothness of the finally produced magnetic recording medium is lowered so that satisfactory recording cannot be made.

By the above steps, the MnBi magnetic powder having a coercive force of from 3000 to 15,000 Oe at 300 K. and 50 to 1000 Oe at 80 K. when measured with applying a magnetic field of 16 KOe, and an amount of saturation magnetization of from 20 emu/g to 60 emu/g when measured at 300 K. with applying a magnetic field of 16 KOe is obtained.

But, the above obtained MnBi magnetic powder is still chemically unstable. When it is maintained at a high temperature and high humidity for a long time, it is corroded so that the saturation magnetization is deteriorated. Then, a following treatment is carried out to stabilize the MnBi magnetic powder.

The treating methods for stabilizing the MnBi magnetic powder include a method comprising forming a coating of an oxide or hydroxide of Mn or Bi which is contained in the MnBi magnetic powder, near the particle surfaces of the MnBi magnetic powder, a method comprising forming a coating of a nitride or carbide of Mn and Bi, and a method comprising forming a coating of an inorganic material of, for example, such as titanium, silicon, aluminum, zirconium, carbon, etc. directly on the particle surfaces of the MnBi magnetic powder or on the above formed coating. While all the above methods form a coating of the inorganic material on the particle surfaces of the MnBi magnetic powder, it may be effective to form a film of an organic material such as a surfactant on the surfaces of the MnBi magnetic powder.

Among these methods, the method comprising forming a coating of an oxide or hydroxide of Mn or Bi which is contained in the MnBi magnetic powder is to be noted. As a typical embodiment of this method, a method comprising forming an oxide coating utilizing oxygen will be explained.

A step of forming the coating of the oxides of Mn and Bi on the surfaces of the MnBi magnetic powder comprises heating the MnBi magnetic powder in an oxygen-containing atmosphere at a temperature in the range of from 20° to 150° C.

As the heating atmosphere, an inert gas containing a specific amount of oxygen is preferred. Preferably, the heating is carried out in a nitrogen or argon gas containing 100 ppm to 10,000 ppm of oxygen. While it is possible to heat the MnBi magnetic powder in the air, the oxidation reaction tends to take place violently in the air. Then, to obtain a uniform oxide coating, it is preferred to heat the MnBi magnetic powder in the inert gas atmosphere containing the slight amount of oxygen.

A heating time is preferably from 0.5 to 40 hours. The MnBi magnetic powder is heated for a longer time, as the temperature is lower. By the above heat treatment, oxides of Mn a typical example of which is $MnO_x$ ($1 \leq x \leq 3.5$) and oxides of Bi a typical example of which is $BiO_x$ ($1.5 \leq x \leq 2.5$) are formed on the particle surfaces of the MnBi magnetic powder.

The MnBi magnetic powder consists of the intermetallic compound in which Mn and Bi are bonded in the molar ratio of 1:1, and theoretically, the oxides of Bi are formed in the equimolar amount to the oxides of Mn. But, in the heating step of the present invention, the oxides of Mn are formed preferentially to the oxides of Bi. A reason for this has not been clarified but may be assumed as follows:

When the MnBi magnetic powder is oxidized in the mild oxidation conditions as in the present invention, Mn having a lower electrode potential than Bi is oxidized preferentially to Bi. As the result, a concentration of metal Mn is lower than that of metal Bi near the particle surfaces of the MnBi magnetic powder, and Mn atoms diffuse from the inside of the magnetic powder particles to the surfaces so that the concentration distributions of Mn and Bi are as flat as possible. Then, the diffused Mn is also preferentially oxidized. Accordingly, the oxides of Mn are preferentially formed near the particle surfaces of the MnBi magnetic powder.

If the MnBi magnetic powder is quickly oxidized, the oxides of Bi are formed at the same time as the formation of the oxides of Mn. Though the magnetic powder in which the oxides of Mn are preferentially formed and the magnetic powder in which the oxides of Bi and those of Mn are formed at the same time have no material difference of the saturation magnetization in the original state. However, they have very different corrosion resistance, and the magnetic powder in which the oxides of Mn are preferentially formed has extremely good corrosion resistance. The preferential formation of the oxides of Mn, typically $MnO_x$ near the particle surfaces of the magnetic powder can be clearly confirmed by the X-ray photoelectron spectroscopic analysis.

While the oxides of Mn are preferentially formed in the above heating step, the oxides of Bi are formed to some extent. A ratio of the oxides of Mn to those of Bi is preferably at least 2 in terms of an atomic ratio of Mn to Bi (Mn/Bi). When this ratio is less than 2, the oxides of Mn and Bi tend to form a local cell, so that the corrosion resistance is insufficient. The larger ratio of the oxides of Mn to those of Bi is more preferred in view of the corrosion resistance. However, to increase this ratio, a degree of oxidization should be increased. As the result, the original saturation magnetization tends to decrease. Then, the ratio of the oxides of Mn to those of Bi is preferably not larger than about 50 in terms of the atomic ratio of Mn to Bi (Mn/Bi).

As described above, as the degree of oxidation increases, the thickness of the oxide coating formed near the surface increases, and then the corrosion resistance is improved, while the original saturation magnetization is decreased. Then, the thickness of the coating is from 1 to 50 wt. % of the magnetic powder particles. While it is difficult to measure the thickness of the oxide coating, the thickness of the oxide coating is preferably adjusted so that the saturation magnetization of the magnetic powder is from 20 to 60 emu/g at 300 K.. Since the magnetic powder having the saturation magnetization of smaller than 20 emu/g has a thick oxide coating, its corrosion resistance is good, while the saturation magnetization is too low so that the output of the magnetic recording medium comprising such magnetic powder is decreased. When the saturation magnetization is larger than 60 emu/g, the thickness of the oxide coating is too thin so that the corrosion resistance is insufficient.

The corrosion resistance of the MnBi magnetic powder is much improved by the above first step treatment, but the magnetic powder in this state has a very high catalytic activity. Since the magnetic powder is usually used in a dispersed state in a binder resin which is an organic material, when the magnetic powder having the high catalytic activity is contacted to the organic binder resin, the binder resin is decomposed by the catalytic activity of the magnetic powder, and the magnetic powder may be corroded by substances produced from the decomposed binder resin.

Then, after the formation of the $MnO_x$ coating near the surfaces of the MnBi magnetic powder in the first step, $MnO_x$ is converted to $MnO_2$ by heating the MnBi magnetic powder in an inert gas in a second step. $MnO_2$ is a stable oxide, and formed only by heating in an oxidizing atmosphere at a high temperature, usually 500° C. or higher. But, the heating Mn in the oxidizing atmosphere at such high temperature will considerably decrease the saturation magnetization of the magnetic power, and also cause sintering agglomeration of the magnetic powder.

But, when $MnO_x$ is first formed and then heated in the inert gas instead of direct formation of $MnO_2$ on the surfaces of the MnBi magnetic powder, $MnO_x$ can be converted to $MnO_2$ effectively at a relatively low temperature. That is, when $MnO_2$ is formed via $MnO_x$ instead of the direct formation of $MnO_2$ from the metal Mn, the dense coating of $MnO_2$ can be formed at a relatively low temperature.

A temperature in the second heating step is preferably higher than that in the first heating step, and preferably from 200° to 400° C. When the temperature is lower than 200° C., a conversion to $MnO_2$ is insufficient, while when the temperature is higher than 400° C., MnBi tends to be decomposed to Mn and Bi. As the inert gas, nitrogen gas or argon gas is usually used, while the heating in vacuum may achieve the same effect.

As the structures of $MnO_2$, α type, β type and γ type are known. It is preferred to form the β type which has the smallest catalytic activity among those types. To form the β type, the heating temperature is preferably from about 300° C. to about 400° C.

By the above heating, the coating of the oxide of Mn comprising $MnO_2$ mainly is formed near the particle surfaces of the MnBi magnetic powder. The presence of such coating can be clearly confirmed by ESCA (=X-ray photoelectron spectroscopy). In an ESCA chart, a peak area based on the 2p electrons of the tetravalent Mn ion is 0.5 to 50 times larger than that based on the 2p electrons of metal Mn. The oxide coating of Bi is formed at the same time. Since the oxide coating of Mn is preferentially forme, a peak area based on the 2p electrons of the Mn ion is at least two times larger than a peak area based on the 4f electrons of the Bi ion when the magnetic powder is analyzed by ESCA.

The above described method is a basic method for forming the oxides of Mn on the particle surfaces of the MnBi magnetic powder to improve the corrosion resistance of the magnetic powder. It may be possible to from a hydroxide on the surfaces of the magnetic powder by heating the magnetic powder in an atmosphere containing a small amount of water, or the oxides and hydroxide of Mn may be formed together.

As explained above, the oxides of Mn a typical one of which is $MnO_2$ are preferentially formed on the particle surfaces of the magnetic powder by the heat treatments, whereby the magnetic powder having excellent corrosion resistance can be obtained without deteriorating the other properties such as the coercive force, the orientation, and so on.

The original value of the saturation magnetization of the above treated magnetic powder is from 20 to 60 emu/g. After this magnetic powder is kept in an atmosphere of 60° C. and 90% RH for 7 days, a degree of deterioration is 40% or less. Such excellent corrosion resistance is attributed to the prevention of decomposition of MnBi to Mn and Bi by water since the inherent deliquescence of MnBi is suppressed. When the heat treated magnetic powder is analyzed by the X-ray diffraction, a content of Bi satisfies the following equation: Metal Bi/(MnBi +metal Bi) <0.5, after the magnetic powder is maintained in an atmosphere of 60° C. and 90% RH for 7 days, which reflects the prevention of the decomposition of MnBi to Mn and Bi.

In addition, the corrosion resistance can be much improved by the formation of a dense coating of a nitride or carbide on the surfaces of the MnBi magnetic powder.

The coating of the nitride may be formed by heating the magnetic powder in an atmosphere of nitrogen or ammonia which optionally contains hydrogen. To form the coating of the carbide, the magnetic powder is heated in a carbon-containing atmosphere of carbon monoxide or methane which optionally contains hydrogen. A heating temperature is preferably from 300° to 400° C.

The nitride or carbide of Mn and Bi can be deposited from a vapor phase by a CVD method or a pyrolysis method. In addition, the corrosion resistance is further improved by the formation of the nitride or carbide of Mn or Bi on the above oxide coating formed on the particle surfaces of the magnetic powder.

Furthermore, the corrosion resistance may be improved by the formation of a coating of an inorganic compound of a metal such as Ti, Si, Al, Zr, Mg, Pb or P. As the stable inorganic compound of the metal which can form the dense coating, an oxide is preferred. Specific examples are titanium oxide, silicon oxide, aluminum oxide, zirconium oxide, magnesium oxide, lead oxide, and so on. A mixed oxide or solid solution comprising two or more of these oxides, such as mullite, aluminum titanate, forsterite, cordierite, spinel and the like may be used. The oxides, mixed oxides and solid solutions may be used in a crystal state or an amorphous state without difference.

To coat the particle surfaces of the MnBi magnetic powder by the above oxide, mixed oxide or solid solution, a method used in the conventional surface modification of powder may be employed. For example, liquid phase methods such as a sol-gel method, a precipitation method, a microcapsulation method, etc., vapor phase methods such as the CVD method, the pyrolysis method, etc., and a mechanochemical method may be used.

For example, when the coating is formed by the liquid phase method, the MnBi magnetic powder is dispersed in an organic solvent such as toluene, and an organometallic compound such as a titanate, a silane or a silazane is added and dissolved in the dispersion. Then, by the addition of a slight amount of water or beforehand adhering water to the MnBi magnetic powder, the organometallic compound is hydrolyzed on the surfaces of the magnetic powder to absorb the hydrolyzed compound on the magnetic powder surfaces. Thereafter, the magnetic powder is heated in a non-oxidizing gas atmosphere or an atmosphere containing a slight amount of oxygen, the organometallic compound absorbed on the magnetic powder surfaces is condensed through the liberation of water to form a coating of an oxide such as titanium oxide or silicon oxide.

As explained above, the corrosion resistance of the MnBi magnetic powder can be significantly improved by the formation of the oxides or hydroxides of Mn or Bi, the nitride or carbonate of Mn and Bi, and further the inorganic compound of the metal such as Ti, Si, Al, Zr, Mg, Pb or P on the particle surfaces of the MnBi magnetic powder.

The coating of the inorganic compound is formed preferably in an amount that the weight of the inorganic compound is from 2 to 50 wt. % of the MnBi weight. When the amount of the inorganic compound is too small, the corrosion resistance is unsatisfactory, while it is too large, the saturation magnetization is decreased. The formation of the coating of the inorganic compound provides the magnetic powder having the corrosion resistance and the magnetic properties in good balance.

The above method produces the magnetic powder comprising MnBi, which has an average particle size of from 0.1 μm to 20 μm; a coercive force of from 3000 to 15,000 Oe at 300 K. and 50 to 1000 Oe at 80 K. when measured with applying a magnetic field of 16 KOe; and an amount of saturation magnetization of from 20 emu/g to 60 emu/g when measured at 300 K. with applying a magnetic field of 16 KOe.

Since the magnetic powder treated by the above described method has excellent corrosion resistance, a degree of deterioration of the property is 40% of less after being maintained in an atmosphere of 60° C. and 90% RH for 7 days. Reflecting the prevention of the decomposition of MnBi to Mn and Bi by water, a content of Bi satisfies the following equation:

$$\text{Metal Bi}/(\text{MnBi}+\text{metal Bi})<0.5$$

when the magnetic powder is analyzed by the X-ray diffraction.

Further, the magnetic powder of the present invention shows good corrosion resistance at high temperature and high humidity, and its saturation magnetization is hardly deteriorated, even when it is dipped in a corrosive solution such as an aqueous solution of sodium chloride or acetic acid.

A magnetic recording medium comprising the above produced MnBi magnetic powder may be produced by a per se conventional method. For example, the MnBi magnetic powder, a binder resin and an organic solvent are mixed and dispersed to prepare a magnetic paint, and the magnetic paint is coated on a substrate and dried to form a magnetic layer.

As the binder resin, any one of binder resins which are conventionally used in the magnetic recording medium may be used. For example, a vinyl chloride-vinyl acetate copolymer, a polyvinyl butyral resin, a cellulose resin, a fluororesin, a polyurethane resin, an isocyanate compound, a radiation curable resin, and so on can be used.

As explained above, the MnBi magnetic powder is easily corroded and decomposed when water is present. In particular, when water is acidic, the corrosion and decomposition are remarkable. While the above binder resin is sufficient for uniformly dispersing the MnBi magnetic powder in the magnetic layer, it is preferred for the binder resin to include a basic functional group to further improve the stability of the magnetic powder against water.

Though the above treatment can improve the corrosion resistance of the MnBi magnetic powder, the inclusion of the basic functional group in the binder resin can further improve the corrosion resistance. As the basic functional group, imine, amine, amide, thiourea, thiazole, ammonium salt or phosphonium compound is preferred.

To include the basic functional group in the magnetic layer, the addition of a compound having a basic functional group is also effective. As the basic functional group to be included in the additive compound, imine, amine, amide, thiourea, thiazole, ammonium salt or phosphonium compound is preferred as in the case of the binder resin.

Preferred examples of such compound are primary aliphatic amines such as methylamine, ethylamine, propylamine, isopropylamine, butylamine, amylamine, hexylamine, heptylamine, octylamine, nonylamine, decylamine, undecylamine, dodecylamine, tridedylamine, tetradecylamine, pentadecylamine, cetylamine, stearylamine, etc.; secondary aliphatic amines such as dimethylamine, diethylamine, dipropylamine, diisopropylamine, dibutylamine, diamylamine, etc.; tertiary aliphatic amines such as trimethylamine, triethylamine, tripropylamine, tributylamine, triamylamine, tridecylamine, etc.; unsaturated aliphatic amines; alicyclic amines; aromatic amines; and so on. A coupling agent comprising Si, Al, Ti, and the like which is modified by the certain amine may be used.

As an amount of the additive compound having the basic functional group increases, the effect on the improvement of the corrosion resistance increases. But, too much additive compound decreases the magnetic flux density of the magnetic layer. Then, the amount of the additive compound is preferably from 1 to 15 wt. % based on the weight of the magnetic powder. To increase the corrosion resistance without significantly decreasing the magnetic flux density of the magnetic layer, the amount of the additive compound is preferably from 4 to 10 wt. %.

As the organic solvent, a conventionally used organic solvent such as toluene, methyl ethyl ketone, methyl isobutyl ketone, cyclohexanone, tetrahydrofuran, ethyl acetate, or a mixture thereof may be used. For the reason described above, the organic solvent is preferably used after dissolved water is removed as much as possible. Among the organic solvents, a non-polar solvent in which water is less dissolved is more preferably used.

To the magnetic paint, a conventionally used additive such as a dispersant, a lubricant, an antistatic agent, etc. may be optionally added. When an acidic material is present, the MnBi magnetic powder tends to be degraded. Therefore, the amount of the acidic lubricant which is generally used in the magnetic recording medium is made as small as possible in view of the corrosion resistance.

A content of the magnetic powder is selected such that a volume ratio of the magnetic powder in the magnetic layer is from 5 to 60%. When this volume ratio is small, the output of the magnetic recording medium having such magnetic layer is lowered, and the corrosion resistance is decreased. A reason why the corrosion resistance is decreased when the volume ratio of the magnetic powder is small has not been clarified, but assumed as follows:

On one hand, when the volume ratio of the binder resin in the coated layer is too large, water is easily penetrated in the layer, so that the corrosion resistance decreases. On the other hand, when the volume ratio of the magnetic powder is too large, the dispersibility of the magnetic powder is worsened so that the orientation of the magnetic powder is deteriorated, and at the same time, an effect of the binder resin for embedding the magnetic powder becomes insufficient, whereby the corrosion resistance is decreased.

A volume ratio of the MnBi magnetic powder in the magnetic layer has an influence on the magnetic properties and recording characteristics as in the case of the conventional magnetic recording medium, and further an influence on the corrosion resistance which is a specific problem found in the coated layer comprising this magnetic powder.

Accordingly, to obtain the coated layer which is excellent not only in the magnetic properties and the recording characteristics but also in the corrosion resistance, the volume ratio of the magnetic powder is from 5 to 60%. When this volume ratio is from 10 to 50%, the corrosion resistance is more effectively improved. Most preferably, this volume ratio is from 20 to 45%.

When the MnBi magnetic powder, the binder resin, the organic solvent and so on are mixed and dispersed to prepare the magnetic paint, and then the magnetic paint is coated on a substrate such as a polyester film by a suitable coating method and dried to form the magnetic layer, it is preferred to orientate the magnetic powder in a magnetic field in parallel with the plane of the magnetic layer. An intensity of the magnetic field is preferably from 500 to 3000 Oe.

When the magnetic layer is formed as above, there is produced a magnetic recording medium having the coercive force of from 5000 to 16,000 Oe at 300 K. and 100 to 1500 Oe at 80 K. when measured with applying a magnetic field of 16 KOe, the magnetic flux density Bm of from 500 to 2500 G when measured at 300 K. with applying a magnetic field of 16 KOe, and the squareness Br/Bm in the longitudinal direction of from 0.60 to 0.95.

When the above magnetic recording medium is used in the form of the magnetic card, the magnetic paint is coated on a substrate having an already coated releasing layer. As the releasing layer, a synthetic resin which has a low surface activity and used as a releasing agent in a tape, a seal or a sheet, for example, a silicone resin can be used. A thickness of the releasing layer is preferably from 0.1 to 2.0 µm.

To further increase the corrosion resistance and chemical resistance of the magnetic layer comprising the MnBi magnetic powder, a water-repellent layer comprising a water-repellent resin is preferably provided between the releasing layer and the magnetic layer. As the water-repellent resin, a polyvinylidene chloride resin, an ethylene-vinyl alcohol copolymer, a fluororesin or vinylidene fluoride base resin, an acrylic resin and so on can be used. A thickness of the water-repellent layer is preferably from 0.5 to 10 µm. When the thickness is smaller than 0.5 µm, sufficient water repellency is not obtained, while it is too large, a spacing loss increases, so that the output of the magnetic recording medium is decreased.

The above produced magnetic recording medium is excellent in corrosion resistance, and a decrease of the magnetic flux density is 50% or less after being maintained in an atmosphere of 60° C. and 90% RH for 7 days. In addition, after the magnetic recording medium is dipped in a 5% aqueous solution of acetic acid for 24 hours, which is a very severe corroding condition, the decease of the magnetic flux density is 80% or less.

When this recording medium is demagnetized by cooling and then the magnetic field of 1500 Oe is applied at 300 K., a magnetic flux density is at least 50% of the saturated magnetic flux density at 300 K..

The MnBi magnetic powder of the present invention may be used in combination with other magnetic powder. The combined use of the magnetic powders can provide a magnetic recording medium having unique characteristics which are not found in the conventional magnetic recording media, by making the best use of the properties of the MnBi magnetic powder.

In such case, as the magnetic powder to be used in combination with the MnBi magnetic powder, a magnetic powder having a coercive force of 250 to 3000 Oe at room temperature, such as a gamma iron oxide magnetic powder, a cobalt-containing iron oxide magnetic powder, a barium ferrite magnetic powder, a strontium ferrite magnetic powder, or a metal magnetic powder comprising iron, is preferably used. The use of such other magnetic powder in combination with the MnBi magnetic powder has the following four advantages:

Since, in general, the other magnetic powder has a larger saturation magnetization than the MnBi magnetic powder, the magnetic recording medium has the larger magnetic flux density than the magnetic recording medium comprising the MnBi magnetic powder alone, so that the high output is easily obtained.

When the oxide magnetic powder is mixed, it does not suffer from the corrosion problem, so that the corrosion resistance of the magnetic recording medium is further improved.

When the MnBi magnetic powder and other magnetic powder having the low coercive force are mixed, a value of an electric current for data recording can be lowered while maintaining the characteristic that the data altering is difficult.

As explained later in detail, multiple recording is possible by recording different data on over another in the same track when they are recorded, and separately reproducing the data through a filter and so on when they are reproduced.

When the MnBi magnetic powder and the above other magnetic powder are used in combination, basically the magnetic paint may be prepared in the same manner as when the MnBi magnetic powder alone is used. The dispersing method or the intensity of magnetic field for orientation may be selected according to the kinds and amounts of the magnetic powders to be mixed.

A mixing ratio of the MnBi magnetic powder to the other magnetic powder is preferably from 1:9 to 7:3. When the ratio of the former to the latter is larger than the above upper limit, the above advantages may not be achieved in comparison with the magnetic recording medium using the MnBi magnetic powder alone. When this ratio is smaller than the above lower limit, one of the most important characteristics of the magnetic recording medium using the MnBi magnetic powder that the once recorded data cannot be easily erased is lost.

Alternatively, in the magnetic recording medium, a magnetic layer comprising the MnBi magnetic powder, and a magnetic powder comprising the gamma iron oxide magnetic powder, the cobalt-containing iron oxide magnetic powder, the barium ferrite magnetic powder, the strontium ferrite magnetic powder, or the metal magnetic powder comprising iron can be laminated. The advantages of the lamination of the magnetic layers are basically the same as those achieved by the use of the MnBi magnetic powder and the other magnetic powder in combination.

In particular, the magnetic recording medium comprising the laminated magnetic layers is characterized in that two kinds of data, that is, data which can be rewritten and data which can be hardly rewritten once they are recorded, can be recorded in the single magnetic recording medium.

For example, the magnetic layer comprising the MnBi magnetic powder is formed in a stripe form. Then, the magnetic layer comprising the gamma iron oxide magnetic powder, the cobalt-containing iron oxide magnetic powder, the barium ferrite magnetic powder, the strontium ferrite magnetic powder, or the metal magnetic powder comprising iron is coated to cover the above stripe form magnetic layer. Then, the data can be rewritten in a part of the magnetic recording medium having no magnetic layer comprising the MnBi magnetic powder, as in the conventional magnetic medium. However, in the part where the magnetic layer comprising the MnBi magnetic power and the magnetic layer comprising the other magnetic powder are laminated, the data can be easily written but can be hardly rewritten. Such characteristic cannot be realized in the conventional magnetic recording media, and is firstly realized by the above structure of the magnetic recording medium by the use of the MnBi magnetic powder.

When the magnetic layers are laminated, a thickness of each magnetic layer is preferably from 2 to 20 μm, and a total thickness of the magnetic layers is preferably from 3 to 30 μm in the case of the magnetic card. When these thicknesses are too thin, the output becomes too low, so that the reliability of the card is deteriorated. When they are too thick, it is difficult to uniformly record the data over the whole magnetic recording layers, so that an error rate increases in the reproduction of the data.

In the above embodiment, it is also possible to combine the above explained various measures, for example, formation of the water-repellent resin layer on the surface of the magnetic layer, the insertion of the water-repellent resin layer between the two magnetic layers, and so on.

When the magnetic recording medium is used in the production of the magnetic card, the magnetic paint is coated on a substrate film having an already coated releasing layer while orientating the magnetic powder in the magnetic field, and dried. If necessary, an adhesive layer is coated on the magnetic layer. As the adhesive, a fusion type adhesive such as a urethane resin, an acrylic resin, etc. is preferably used, while other adhesive such as an isocyanate curing type adhesive, a UV light curing type adhesive, etc. may be used. Alternatively, it is possible to fusion bond the magnetic layer to a card substrate using the resin in the magnetic layer.

When the water-repellent layer is provided to further improve the corrosion resistance and water resistance of the magnetic layer, the water-repellent layer comprising the water-repellent resin is inserted between the releasing layer and the magnetic layer. When the water-repellent layer is used, a general structure of the magnetic recording medium comprises the substrate film, the releasing layer, the water-repellent layer, the magnetic layer, and the adhesive layer. In addition, any measure that is used in the magnetic card such as the formation of a shielding layer such as a coloring layer between the releasing layer and the magnetic layer can be combined.

The above produced magnetic recording medium in the form of a tape is slit in a determined width, and a strip form recording medium is laminated on the magnetic card substrate with contacting the adhesive layer to the substrate, and temporarily adhered on the surface of the substrate, for example, by pressing the strip by a heat roller, followed by removal of the substrate film to obtain the magnetic card. Alternatively, the magnetic recording medium is heat pressed by, for example, a press plate so that the adhesive layer, the magnetic layer and the releasing layer are embedded in the substrate, and then cut out in the card form.

The produced magnetic recording medium is initialized and then recorded and reproduced. The magnetic recording medium comprising the MnBi magnetic powder is initialized by utilizing the properties of the MnBi magnetic powder that it has the large coercive force at room temperature while the coercive force is greatly decreased when it is cooled to a low temperature of about 100 K. or lower. Then, the initialization of the magnetic recording medium comprising the MnBi magnetic powder comprises applying an alternating magnetic field of 300 to 3000 to the magnetic recording medium at a temperature of about 100 K. or lower to demagnetize the medium. This initialization can be carried out by traveling a magnetic tape when the medium is in the form of a tape, or in a batchwise manner with the tape wound around a reel. Of course, the magnetic recording medium can be initialized after it is processed in the form of the magnetic card.

The method for recording the data is not different from the conventional recording method. For example, in the case of the magnetic card, the data can be recorded using an encoder or a magnetic card reader-writer. Different from the other magnetic recording media, once the data is recorded on the magnetic recording medium comprising the MnBi magnetic powder, they can be hardly erased or rewritten.

When the MnBi magnetic powder is used in combination with the other magnetic powder or when the magnetic layer comprising the MnBi magnetic powder and the magnetic layer comprising the other magnetic powder are laminated, and the data are multiply recorded, the recording of data is repeated at least twice.

First, fixed data (A) which cannot be rewritten are recorded using a writer. In this step, the same data (A) are recorded in the MnBi magnetic powder and the magnetic powder other than the MnBi magnetic powder. An intensity of the recording magnetic field depends on the coercive force of the other magnetic powder to be used in combination with the MnBi magnetic powder. The intensity of the recording magnetic field is preferably as high as possible in a range in which the other magnetic powder is not demagnetized. This is based on a phenomenon that the coercive force of the magnetic recording medium is larger as the intensity of the recording magnetic filed is higher, which phenomenon is specific to the magnetic recording medium comprising the MnBi magnetic powder.

Thereafter, data (B) which can be rewritten is overwritten in the same track. The unrewritable fixed data (A) and the rewritable data (B) are recorded at different recording densities. In this case, the recording density of the rewritable data is 3 to 100 times larger than that of the fixed data, since, in general, the rewritable data require the larger recording capacity than the fixed data. The recording densities should be differentiated so as to separately reproduce the two kinds of the data using, for example, a filter with preventing mutual interference of the magnetic fields from the signals of the data (A) and (B). In view of a degree of separation, the larger difference between two recording densities is better. To increase the amount of the data (A), the difference is 100 times or less.

In general, it is preferred to record the data which require the low recording density in the lower layer, and record the data which require the high recording density in the upper layer. This is because since the influence of the spacing loss between the magnetic head and the magnetic recording medium increases as the recording density increases, the data requiring the high recording density is preferably recorded in the magnetic layer which is closer to the magnetic head.

By such multiple recording, the data (A) are first written in all the magnetic layers, and the data (B) are overwritten, whereby the data recorded in the other magnetic powder or the magnetic layer comprising the other magnetic powder are rewritten. But, since the MnBi magnetic powder or the magnetic layer comprising the MnBi magnetic powder has the large coercive force of 10,000 Oe or larger at room temperature, the data once recorded therein are not rewritten by the data (B) which are to be recorded later, and the already recorded fixed data (A) remain.

When the direct magnetic field is applied after the unrewritable data (A) are recorded, the data (A) are further stabilized against the external magnetic field. In this case, the direct magnetic field has the intensity of 3000 to 10,000 Oe preferably. Thereafter, the data (B) are recorded as described above, whereby the fixed data (A) and the rewritable data (B) are recorded in the same track.

In addition, when the magnetic layer comprising the MnBi magnetic powder and the magnetic layer comprising the other magnetic powder are laminated, the data which can be rewritten and the data which can be hardly rewritten once recorded can be recorded in the single magnetic recording medium.

For example, the magnetic layer comprising the MnBi magnetic powder is formed in a stripe form. Then, the magnetic layer comprising the gamma iron oxide magnetic powder, the cobalt-containing iron oxide magnetic powder, the barium ferrite magnetic powder, the strontium ferrite magnetic powder, or the metal magnetic powder comprising iron is coated to cover the above magnetic layer. Then, the data, which are recorded in the area where the magnetic layer comprising the MnBi magnetic powder and the magnetic layer comprising the other magnetic powder are laminated, can be hardly rewritten, while the data in the area where the magnetic layers are not laminated can be rewritten as in the case of the conventional magnetic recording medium.

To record the data, the unrewritable fixed data (a) are recorded in the area where the magnetic layer comprising the MnBi magnetic powder and the magnetic layer comprising the other magnetic powder are laminated by the conventional method. If it is attempted to rewrite the recorded data (a) by the data (b) for the purpose of the altering of the data, two signals from the data (a) and (b) are mixed up in the reproduction step so that the data are destroyed, since the data recorded in the magnetic layer comprising the MnBi magnetic powder cannot be rewritten. Then, the data cannot be reproduced by a conventional reading apparatus.

When the present invention is applied in the magnetic card, data which should not be rewritten such as an issue date of the card, an issuer of the card and an ID number of a card holder are recorded as the fixed data (a).

In the magnetic layer comprising the magnetic powder other than the MnBi magnetic powder, rewritable data (c) are recorded. The data (c) can be rewritten at any time in use as in the case of the conventional magnetic medium.

In the above, the present invention has been explained by making reference to the magnetic layer comprising the MnBi magnetic powder and the other magnetic powder in combination, and the laminated magnetic layers comprising these magnetic powders respectively. These magnetic layers may be combined in various manners. For example, in the case of the magnetic card, the laminated magnetic layers are formed on one surface of the card, while the conventional magnetic layer comprising the iron oxide magnetic powder or the barium ferrite magnetic powder is formed on the other surface of the card.

The data reproduction can be carried out by substantially the same reproducing method as that of the conventional magnetic recording medium. For example, the magnetic card can be read using the magnetic card reader.

To reproduce the multiple recorded data explained above, two data (A) and (B) having the different recording density are separately reproduced by passing the signals which are read by the magnetic head through a band path filter, as will be explained in detail in the Examples. A band width of the band path filter is preferably adjusted in a range between +100% and −50% from a frequency corresponding to the recording density to be reproduced.

The present invention has been explained by making reference to the case where the invention is applied in the magnetic card. The present invention, in which the hardly rewritable data and the easily rewritable data as in the case of the conventional magnetic recording media are multiple recorded or recorded in combination in a single magnetic recording medium, can be used in any magnetic recording medium such as a magnetic tape or a floppy disc, in addition to the magnetic card.

The magnetic recording medium such as the magnetic card comprising the MnBi magnetic powder is characterized in that the once recorded data cannot be easily erased at room temperature, that is, the once recorded data cannot be easily altered, but the recorded data can be easily read in the same manner as that used with the conventional magnetic card. Then, it is thought that such data are copied on a normal magnetic card, and the copied card is used as if it were a genuine card.

To prevent such fraudulent use, a method and apparatus for reproducing only the genuine data which are recorded using the MnBi magnetic powder are required. In such reproducing method, before reproducing the data recorded in the magnetic recording medium comprising the MnBi magnetic powder, a direct or alternating magnetic filed having an intensity smaller than the coercive force of the magnetic layer is applied on the magnetic layer using, for example, a permanent magnet or a magnetic head for applying the magnetic filed.

This method is explained by making reference to the magnetic card. Since the data once recorded in the magnetic card comprising the MnBi magnetic powder cannot be easily erased at room temperature, they can be reproduced without being influenced by the applied magnetic field substantially. Since the data recorded in the normal magnetic card are erased or destroyed by the magnetic field, the data in the copied card cannot be reproduced, if the data recorded in the magnetic card comprising the MnBi magnetic powder are copied.

An intensity of such magnetic field is smaller than the coercive force of the magnetic layer comprising the MnBi magnetic powder and larger than the coercive force of the magnetic layer comprising the conventional magnetic powder. In the case of the magnetic layer comprising the gamma iron oxide magnetic powder or the cobalt-containing iron oxide magnetic powder, the data of the copied card are almost erased by the application of a magnetic field of 500 to 1000 Oe. In the case of the magnetic layer comprising the barium ferrite magnetic powder or the strontium ferrite magnetic powder, the data are almost erased by the application of the magnetic field of about 3000 Oe. Therefore, the intensity of the applied magnetic field is preferably from 500 to 5000 Oe. When the magnetic field having the intensity in this range is applied, the data recorded in the magnetic layer comprising the MnBi magnetic powder are not influenced substantially, so that the data can be correctly read.

Such magnetic filed may be the direct one or the alternating one. Means for generating the magnetic field is not limited insofar as the magnetic field having the intensity in the above range can be generated. For example, to apply the direct magnetic field, the permanent magnet is provided between a mouth for card insertion and the magnetic head. To apply the alternating magnetic field, a magnetic head for applying the alternative magnetic field is provided between the mouth for card insertion and the magnetic head for reproducing the data. Alternatively, the direct or alternating magnetic field is applied on the magnetic card using the magnetic head for reproducing the data, and thereafter, the magnetic card is again inserted and read by the same magnetic head.

When the method and apparatus for reproduction of the data according to the present invention are employed, not only the data of the magnetic card which is fraudulently used are erased, but also the data of the normal magnetic card are erased. Such trouble can be prevented by employing measure for preventing the insertion of the normal magnetic card in the apparatus or ejecting the normal magnetic card from the apparatus, or by adding an identification information to the magnetic card.

The identification information can be added by the formation of a cut part or a small hole in a part of the magnetic card to differentiate the shape of the card from the normal magnetic card. Then, the cut part or the small hole is detected optically or mechanically when the magnetic card is inserted in the apparatus, and the card having the cut part or the small hole is allowed to be inserted, while the magnetic card having neither the cut part nor the small hale is ejected from the apparatus.

Alternatively, a mark is printed on the card surface with an ink containing a fluorescent substance which can be excited by IR or UV light, and the magnetic card is identified by exciting the fluorescent substance by the IR or UV light, and detecting the fluorescence emitted from the identification mark.

EXAMPLES

The present invention will be explained more in detail by making reference to the Examples.

Synthesis of MnBi magnetic powder

First, the synthesis of a MnBi magnetic powder is explained.

The synthesis method of the MnBi magnetic powder comprises a step of producing an MnBi ingot, a step of preparing a MnBi magnetic powder by grinding the ingot, and a step of heat treating the ground MnBi magnetic powder.

(1) Production of MnBi ingot

Flakes of Mn (manufactured by FURU-UCHI CHEMICAL Co., Ltd. Purity, 99.9%), and shots of Bi (manufactured by FURU-UCHI CHEMICAL Co., Ltd. Purity, 99.9%) were ground in a mortar, and Mn powder and Bi powder were separately sieved in a range between 10 mesh and 500 mesh to obtain Mn and Bi powders having different particle sizes.

Then, the Mn and Bi powders were weighed so that a molar ratio of Mn to Bi was from 25:75 to 75:25, and mixed thoroughly in a ball mill.

The mixture was molded with a pressure press under pressure of 0.2 to 20 ton/cm$^2$ to obtain a cylinder having a diameter of 6 mm and a height of 6 mm.

The molded article was contained in an aluminum container which could be top closed. After evacuating the container, nitrogen gas of 0.5 atom was introduced in the container. Then, the container was placed in an electric furnace and heated at a temperature of 250° to 300° C. for 1 to 30 days. After heat treatment, the molded article was removed into an air, and lightly ground in a mortar, and its magnetic properties were measured.

As the magnetic properties, a coercive force when the maximum magnetic field of 16 KOe was applied, and an amount of magnetization at 16 KOe were measured.

The coercive force did not depend on the processing conditions significantly, and was from 500 Oe to 1000 Oe, while the amount of magnetization greatly varied with the processing conditions. Then, from the amounts of magnetization, proportions of synthesized MnBi in the ingots were evaluated, and the optimum conditions for the production of MnBi were determined from those proportions.

Examples 1–32

MnBi ingots were produced by changing the particle sizes of the Mn and Bi powders as the raw materials, mixing ratios of the Mn and Bi powders, the molding pressure for pressing the mixture of the Mn and Bi powders, and the heating temperature and time of the molded articles as shown in Table 1, and amounts of magnetization of the MnBi ingots were measured. The results are shown in Table 1.

TABLE 1

| Ex. No. | Particle size of Mn and Bi powders (mesh) | Molar ratio of Mn/Bi | Synthesis pressure (t/cm$^2$) | Treating temp. (°C.) | Treating time (days) | Amount of magnetization (emu/g) |
|---|---|---|---|---|---|---|
| 1 | 10 | 55/45 | 3 | 265 | 3 | 36.8 |
| 2 | 50 | 55/45 | 3 | 265 | 3 | 48.1 |
| 3 | 100 | 55/45 | 3 | 265 | 3 | 53.4 |

TABLE 1-continued

| Ex. No. | Particle size of Mn and Bi powders (mesh) | Molar ratio of Mn/Bi | Synthesis pressure (t/cm$^2$) | Treating temp. (°C.) | Treating time (days) | Amount of magnetization (emu/g) |
|---|---|---|---|---|---|---|
| 4 | 200 | 55/45 | 3 | 265 | 3 | 52.2 |
| 5 | 300 | 55/45 | 3 | 265 | 3 | 49.2 |
| 6 | 500 | 55/45 | 3 | 265 | 3 | 32.3 |
| 7 | 100 | 25/75 | 3 | 265 | 3 | 28.8 |
| 8 | 100 | 35/65 | 3 | 265 | 3 | 35.4 |
| 9 | 100 | 45/55 | 3 | 265 | 3 | 46.1 |
| 10 | 100 | 50/50 | 3 | 265 | 3 | 51.1 |
| 11 | 100 | 65/35 | 3 | 265 | 3 | 40.2 |
| 12 | 100 | 75/25 | 3 | 265 | 3 | 30.6 |
| 13 | 100 | 55/45 | 0.5 | 265 | 3 | 40.1 |
| 14 | 100 | 55/45 | 1 | 265 | 3 | 49.8 |
| 15 | 100 | 55/45 | 5 | 265 | 3 | 53.5 |
| 16 | 100 | 55/45 | 8 | 265 | 3 | 53.1 |
| 17 | 100 | 55/45 | 10 | 265 | 3 | 53.7 |
| 18 | 100 | 55/45 | 3 | 255 | 3 | 10.9 |
| 19 | 100 | 55/45 | 3 | 260 | 3 | 44.3 |
| 20 | 100 | 55/45 | 3 | 270 | 3 | 53.6 |
| 21 | 100 | 55/45 | 3 | 275 | 3 | 22.6 |
| 22 | 100 | 55/45 | 3 | 265 | 1 | 42.1 |
| 23 | 100 | 55/45 | 3 | 265 | 2 | 50.3 |
| 24 | 100 | 55/45 | 3 | 265 | 8 | 54.0 |
| 25 | 100 | 55/45 | 3 | 265 | 15 | 53.3 |
| 26 | 100 | 55/45 | 3 | 265 | 20 | 53.6 |
| 27 | 200 | 55/45 | 5 | 265 | 3 | 52.8 |
| 28 | 100 | 55/45 | 3 | 260 | 10 | 53.9 |
| 29 | 100 | 53/47 | 3 | 265 | 5 | 53.6 |
| 30 | 200 | 53/47 | 3 | 265 | 3 | 53.1 |
| 31 | 100 | 53/47 | 5 | 265 | 3 | 53.7 |
| 32 | 100 | 55/45 | 3 | 267 | 3 | 54.3 |

From the results in Table 1, it is understood that the particle sizes of the raw material Mn and Bi powders had influences on the amounts of magnetization of ingots obtained by heat treatment. When the particle sizes are too small, the surface areas of the powders are large. As the result, a ratio of the oxide coating formed on the particle surfaces increases so that the reaction is interfered. When the particle sizes are too large, the surface area is too small. As the result, a contact area for effecting the diffusion of Mn and Bi is decreased so that the reaction rate is lowered, whereby the amount of magnetization of the obtained ingot is small. From the results in Table 1, it is understood that the optimum particle size of the Mn and Bi powders as the raw materials is from 50 mesh to 300 mesh.

In connection with the mixed ratio of the Mn and Bi powders, when the molar ratio of Mn to Bi is in the range between 45:55 and 65:35, the amount of magnetization of 40 emu/g or higher is attained. In particular, when this molar ratio is in the range between 55:45 and 50:50, that is, an amount of Mn is slightly larger than that of Bi, the large amount of magnetization of 50 emu/g or higher is attained.

When the pressing pressure of the mixture of the Mn and Bi powder is increased, there arises no specific problem. But, too high pressure is undesirable in the production. To attain the sufficiently large amount of magnetization, 1 to 8 ton/cm$^2$ is preferred.

The heat treating temperature of the molded article is very important to attain the large amount of magnetization, and it is preferred to carry out the heat treatment at a temperature just below the melting point of metal Bi. When the molded article is heated at a temperature higher than the melting point of Bi, only Bi is molten and agglomerated. Therefore, the reactivity as MnBi is greatly decreased. When this heat treatment temperature is too low, the diffusion rates of Mn and Bi are lowered, so that a very long time is required in the heat treatment to achieve the large amount of magnetization. In view of the productivity, the heat treatment is preferably carried out at a temperature of 260° to 271° C. which is just below the melting point of Bi.

With respect to the heat treatment time, too long treatment may not cause any problem. In general, by the heat treatment of 2 to 15 days, the reaction is almost completed, and the large amount of magnetization of 50 emu/g or larger is obtained.

Examples 33–38

The obtained MnBi ingot was coarsely ground using a mortar in an inert (nitrogen) atmosphere in a glove box, and further finely ground using a ball mill and a jet mill. As the ingot, one prepared in Example 3 was used. For ball milling, a planetary ball mill was used, and the coarse powder was milled in one of various solvents of an amount of 100 wt. parts per 10 wt. parts of MnBi. In one grinding process, zirconia balls were used and the powder was ground under the same conditions. In another grinding process, the powder was ground with the zirconia balls under a gentle milling condition at a small rotation rate (100 rpm) as the first milling step, and then ground with the zirconia balls having a smaller diameter than those used in the first step and a large rotation rate (150 rpm) as the second milling step. Then, the two kinds of the powders were compared.

In jet milling, the powder was milled in different atmospheres.

With these obtained MnBi powders, average particle sizes, coercive forces and amount of magnetization were measured. The results are shown in Table 2.

TABLE 2

| Ex. No. | Milling method | Ball diameter (mm) | Milling time (hrs) | Solvent or atmosphere | Average particle size (μm) | Coercive force (Oe) | Amount of magnetization (emu/g) |
|---|---|---|---|---|---|---|---|
| 33 | One step ball milling | 1 | 4 | Toluene | 3.2 | 8800 | 48.1 |
| 34 | One step ball milling | 0.5 | 4 | Toluene | 2.3 | 10200 | 44.3 |
| 35 | Two step ball milling | 1/0.5 | 2/2 | Toluene | 2.5 | 9800 | 48.6 |
| 36 | Two step ball milling | 1/0.5 | 2/2 | Ethanol | 2.9 | 9100 | 28.3 |
| 37 | Jet milling | — | 2 | Nitrogen | 7.3 | 4700 | 51.6 |
| 38 | Jet milling | — | 4 | Nitrogen | 3.9 | 6900 | 47.3 |

As is clear from the results of Table 2, the MnBi fine powder can be produced by either the ball milling or the jet milling. In particular, when a non-polar solvent such as toluene or xylene is used in the ball milling, the decrease of the amount of magnetization caused by milling is small. When the diameter of the balls is decreased as the grinding proceeds, the powder having the uniform particle size distribution is obtained. This is supported by Example 35 of Table 2, in which while the particle size was small, the high saturation magnetization was attained, since the formation of the very fine particles which cause the decrease of saturation magnetization was suppressed.

FIGS. 4 to 7 show the particle sizes, coercive forces at 300 K. and 80 K., and the saturation magnetization at 300 K. obtained in Example 35 in which the first milling was carried out for 2 hours, and thereafter, the second milling was carried out in varying time periods.

Figure 8:
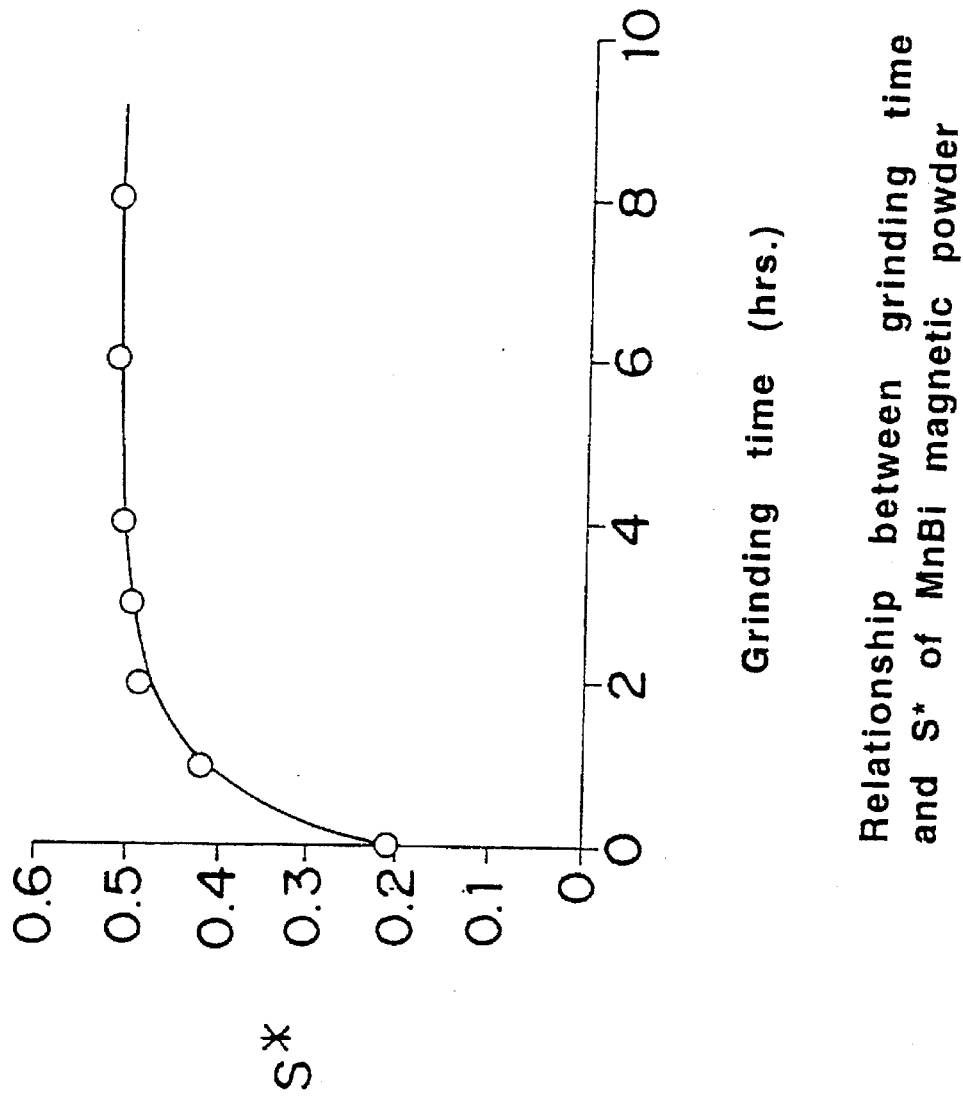
FIG. 8 shows a relationship between a grinding time and S* of the MnBi magnetic powder.
Figure 9:
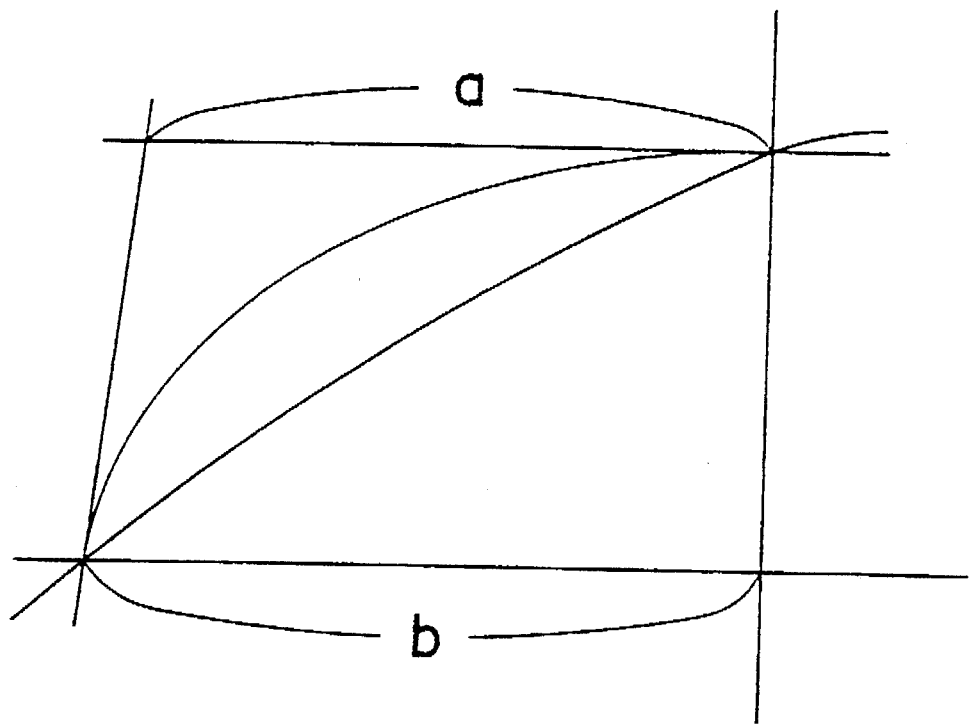
FIG. 9 illustrates a method for measuring S*.

FIG. 8 shows the results of the measurement of change of S* by grinding. As shown in FIG. 9, the S* is a parameter obtained from a slope of a demagnetization curve of the hysteresis curve. The larger value of S* indicates a narrower distribution of the coercive force. This measurement was done at 300 K. with applying the magnetic filed of 16 kOe.

From these Figures, it is seen that as the grinding time is elongated, the particle size decreases, and the coercive forces at 300 K. and 80 K. both increases, while the saturation magnetization decreases. In addition, it is seen that as the grinding time is elongated, the S* increases and the distribution of the coercive force is narrowed. From these results, it is understood that the coercive force at 300 K. should be 3000 Oe or larger to obtain the magnetic powder having the narrow distribution of the coercive force.

When the coercive force at 300 K. exceeds 15,000 Oe, the magnetic recording medium comprising such magnetic powder has the further improved function of preventing the data alteration. But, as seen from FIG. 7, the amount of magnetization considerably decreases. Then, the coercive force at 300 K. is preferably from 3000 Oe to 15,000 Oe.

The magnetic recording medium of the present invention is demagnetized by cooling it to the low temperature and then recorded at room temperature. When the coercive force at 80 K. is 1000 Oe or larger, the demagnetization characteristic at the low temperature is worsened.

Since the magnetic powder having the coercive force of 500 Oe or less at 80 K. has the too large particle size, it will deteriorate the orientation of the magnetic powder or the surface property of the magnetic recording medium, when the magnetic recording medium is produced using such magnetic powder. Then, the coercive force at 80 K. is preferably adjusted in the range between 50 Oe and 1000 Oe. As the grinding proceeds, the amount of magnetization decreases. To achieve the sufficiently high output of the magnetic recording medium, the coercive force at 300 K. should be 20 emu/g or larger. Since the maximum amount of magnetization is about 60 emu/g when a compound having a composition of MnBi is obtained, an amount of magnetization is preferably adjusted in the range between 20 emu/g and 60 emu/g.

From the above analysis, it is understood that, since the particle size, the coercive force and the amount of magnetization are correlated each other, to satisfy the requirements necessary to use the magnetic powder in the magnetic recording medium of the present invention, that is, A particle size suitable for the magnetic recording medium, A demagnetization property at low temperature, A high coercive force to prevent the altering of data at room temperature, and A large amount of magnetization to achieve a high output, the average particle size should be from 0.1 μm to 20 μm, the coercive force at 300 K. should be from 3000 Oe to 15,000 Oe, the coercive force at 80 K. should be from 50 Oe to 1000 Oe, and the amount of magnetization at 300 K. should be from 20 emu/g to 60 emu/g.

As explained above, the magnetic powder can be used in the magnetic recording medium of the present invention, when it satisfies the above requirements at the same time.

Examples 40–55 and Comparative Example 1

Stabilization treatment of MnBi magnetic powder

The above method produces the MnBi magnetic powder having the desired shape and properties. But, the MnBi magnetic powder in this state is unstable and corroded by the presence of water so that the amount of magnetization decreases. Then, the MnBi magnetic powder is stabilized by the following heat treatment.

An example of the heat treatment will be explained using, as the magnetic powder to be heat treated, the magnetic powder which was ball milled by the method described in Example 35 of Table 2.

After ball milling, the MnBi magnetic powder was removed in the state dipped in toluene, and charged in a heat treating vessel followed by drying in vacuo at room temperature (25° C.) for about 2 hours. In the same vessel, the powder was heat treated at a temperature varying from 20° C. to 150° C. as the first step. In general, the heating time was long when the heat treating temperature was low, while it was short when the heat treating temperature was high. In this Example, the heating time was in the range between 0.5 hours to 24 hours. As a heat treating atmosphere, a nitrogen gas containing 1000 ppm of oxygen was used.

Subsequently, as the second step, the oxygen-containing gas was evacuated from the vessel, and a nitrogen gas or an argon gas was introduced at a pressure of about 0.3 torr. in the vessel so that the pressure did not exceed 1 torr. when heated. Then, the magnetic powder was heat treated with varying the temperature between 150° C. and 450° C. In this step, the heating time was preferably adjusted according to the heating temperature, as in the first step. In this Example, the heating time was constant at 2 hours.

The amount of magnetization, the coercive force, the degree of decrease of the amount of magnetization and the metal Bi content of the magnetic powder which had been heat treated under the different conditions were measured, and the results are shown in Table 3.

The degree of decrease of the amount of magnetization and the metal Bi content were measured as follows:
Degree of decrease of amount of magnetization A magnetic powder was maintained in a glass dish in an atmosphere of 60° C. and 90% RH for 7 days. From a change rate of the saturation magnetization after this period from that before this period, a degree of decrease of an amount of magnetization was obtained.
Metal Bi content After maintaining a magnetic powder in a glass dish in an atmosphere of 60° C. and 90% RH for 7 days, a content of metal Bi was measured by an X-ray diffraction apparatus.

Peak areas assigned to the (101) plane of MnBi and assigned to the (012) plane of metal Bi were measured, and then the metal Bi content was calculated according to the following equation:

Metal Bi content=(Peak area of metal Bi)/(Peak area of MnBi+ Peak area of metal Bi)

Figure 10:
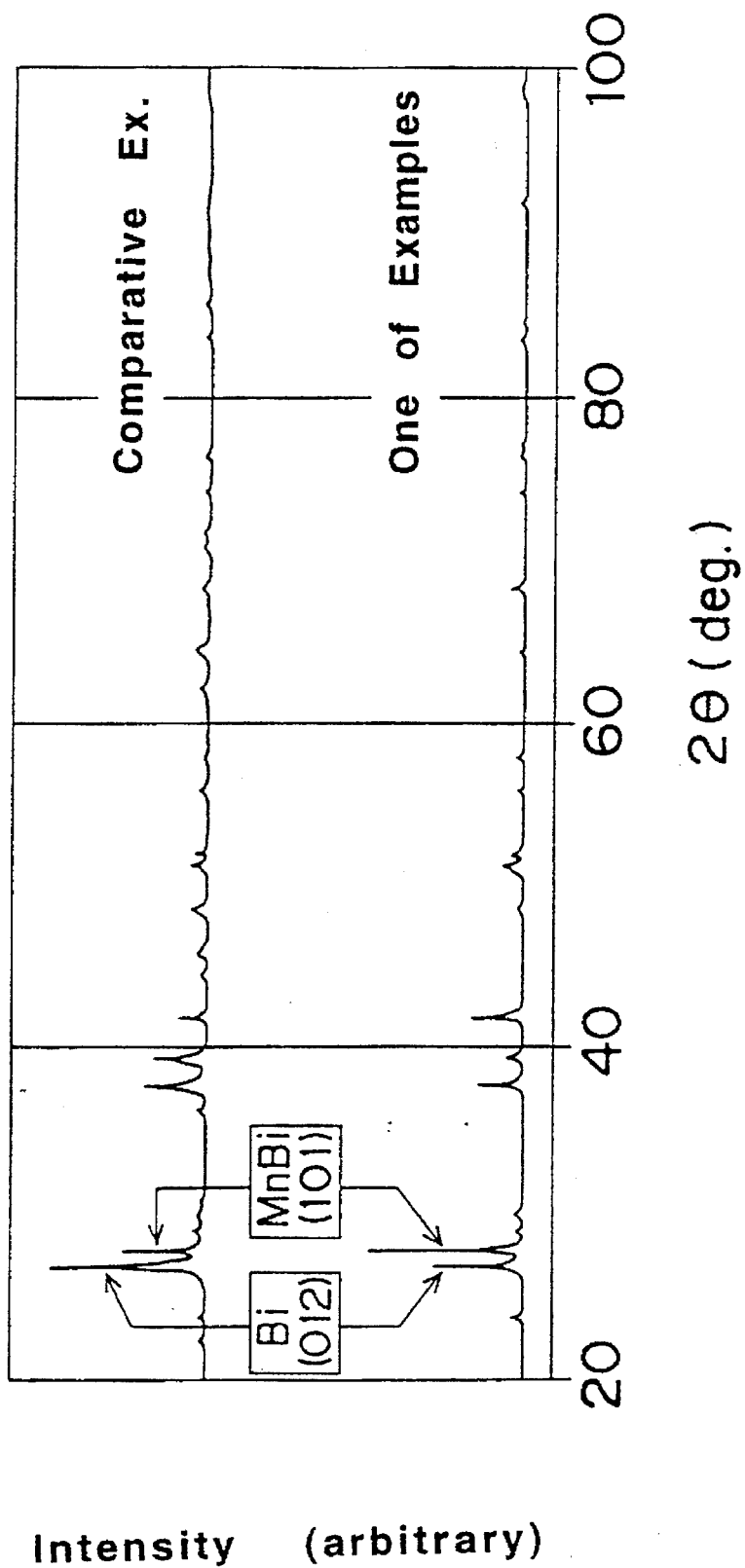
FIG. 10 shows the results of X-ray diffraction analysis of the MnBi magnetic powder when it is maintained in a humid atmosphere.

FIG. 10 shows an example of an X-ray diffraction pattern from which the metal Bi content was calculated after the MnBi magnetic powder was maintained in an atmosphere of 60° C. and 90% RH for 7 days.

TABLE 3

| Ex. No. | 1st step heat treatment | 2nd step heat treatment | Amount of magnetization (emu/g) | Coercive force (Oe) | Decrease of amount of magnetization (%) | Metal Bi content |
|---|---|---|---|---|---|---|
| 40 | — | $N_2$ gas, 350° C. × 2 hrs. | 52.8 | 8300 | 35 | 0.55 |
| 41 | $O_2/N_2$ mixed gas, 30° C. × 24 hrs. | $N_2$ gas, 350° C. × 2 hrs. | 50.4 | 9500 | 8 | 0.06 |
| 42 | $O_2/N_2$ mixed gas, 40° C. × 15 hrs. | $N_2$ gas, 350° C. × 2 hrs. | 50.2 | 9600 | 6 | 0.04 |
| 43 | $O_2/N_2$ mixed gas, 60° C. × 8 hrs. | $N_2$ gas, 350° C. × 2 hrs. | 49.1 | 9600 | 7 | 0.04 |
| 44 | $O_2/N_2$ mixed gas, 80° C. × 3 hrs. | $N_2$ gas, 350° C. × 2 hrs. | 46.3 | 9800 | 10 | 0.10 |
| 45 | $O_2/N_2$ mixed gas, 100° C. × 1 hr. | $N_2$ gas, 350° C. × 2 hrs. | 43.5 | 10100 | 12 | 0.15 |
| 46 | $O_2/N_2$ mixed gas, 200° C. × 0.5 hrs. | $N_2$ gas, 350° C. × 2 hrs. | 33.7 | 12300 | 16 | 0.22 |
| 47 | $O_2/N_2$ mixed gas, 40° C. × 15 hrs. | — | 44.1 | 11200 | 16 | 0.20 |
| 48 | $O_2/N_2$ mixed gas, 40° C. × 15 hrs. | $N_2$ gas, 150° C. × 2 hrs. | 44.3 | 11000 | 16 | 0.25 |
| 49 | $O_2/N_2$ Mixed gas, 40° C. × 15 hrs. | $N_2$ gas, 200° C. × 2 hrs. | 45.2 | 10800 | 12 | 0.13 |
| 50 | $O_2/N_2$ mixed gas, 40° C. × 15 hrs. | $N_2$ gas, 250° C. × 2 hrs. | 46.1 | 10800 | 10 | 0.09 |
| 51 | $O_2/N_2$ mixed gas, 40° C. × 15 hrs. | $N_2$ gas, 300° C. × 2 hrs. | 49.5 | 10100 | 7 | 0.04 |
| 52 | $O_2/N_2$ mixed gas, 40° C. × 15 hrs. | $N_2$ gas, 400° C. × 2 hrs. | 53.0 | 9300 | 12 | 0.15 |
| 53 | $O_2/N_2$ mixed gas, 40° C. × 15 hrs. | $N_2$ gas, 450° C. × 2 hrs. | 31.5 | 8600 | 20 | 0.25 |
| 54 | $O_2/N_2$ mixed gas, 40° C. × 15 hrs. | $N_2$ gas, 350° C. × 2 hrs. | 48.4 | 9800 | 6 | 0.04 |
| 55 | $O_2/N_2$ mixed gas, 60° C. × 8 hrs. | $N_2$ gas, 300° C. × 2 hrs. | 48.8 | 9900 | 6 | 0.05 |
| C. 1 | — | — | 48.6 | 9800 | 90 | 0.85 |

In addition, a ratio of Mn oxides to Bi oxides formed near the particle surfaces of the magnetic powder, atomic ratios of oxygen to Mn and oxygen to Bi, and a content of $MnO_2$ were measured by the photoelectron spectroscopy as follows. The results are shown in Table 4.
Ratio of Mn oxides to Bi oxides The ratio of the Mn oxides to the Bi oxides formed near the particle surfaces of the MnBi magnetic powder was measured by the photoelectron spectroscopy. As a source, metal Mg was used.

With the Mn oxides, 2p electrons were measured, while with the Bi oxides, 4f electrons were measured.

Figure 11:
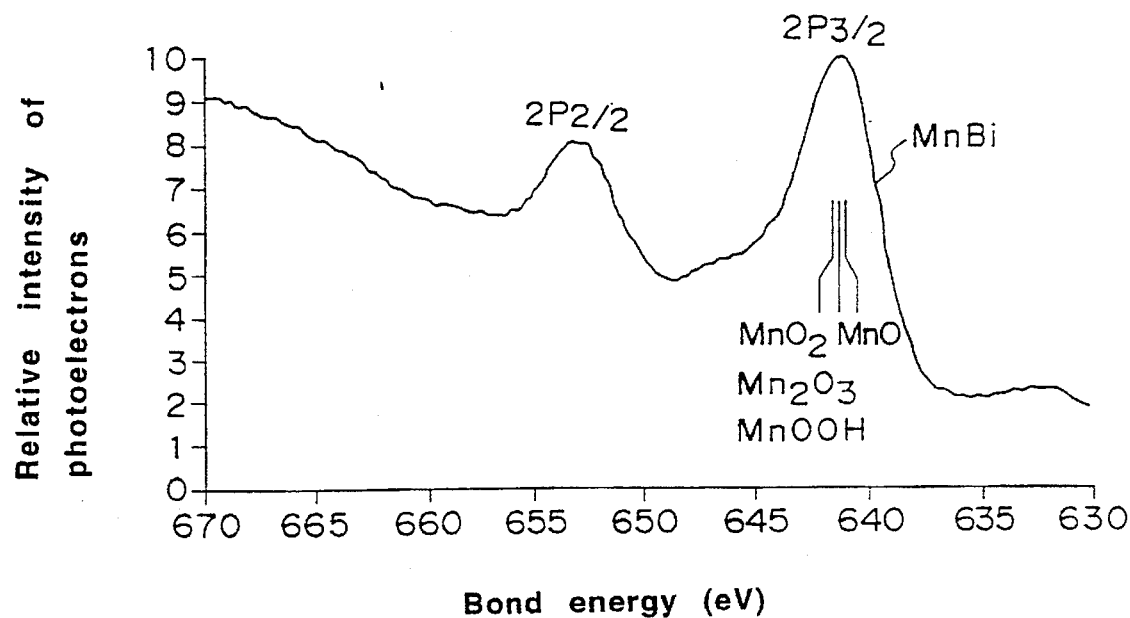
FIG. 11 shows a spectrum of a photoelectron spectroscopic analysis of Mn.
Figure 12:
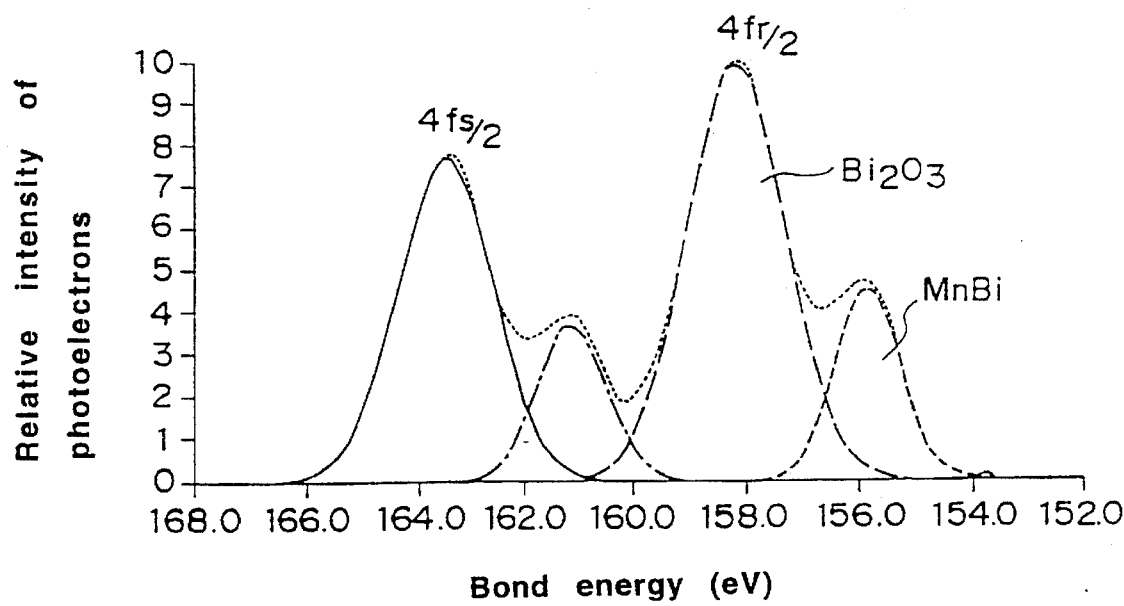
FIG. 12 shows a spectrum of a photoelectron spectroscopic analysis of Bi.

As examples, FIGS. 11 and 12 show the spectra of 2p electrons of Mn and 4f electrons of Bi, respectively. In the both spectra, the peaks assigned to metal Mn and metal Bi of MnBi were observed in addition to the peaks assigned to the Mn oxides and the Bi oxides. These peaks were separated using a computer, and peak areas for the Mn oxides and the Bi oxides were calculated. A ratio of the Mn oxides to the Bi oxides was calculated from a ratio of the peak area of the 2p3/2 electrons of the Mn oxides to that of the 4f7/2 electrons of the Bi oxides.

Atomic ratios of oxygen to Mn and oxygen to Bi and content of $MnO_2$

Each of the Mn oxides and the Bi oxides contain several oxides having different valencies. Then, using the measured peaks of standard samples of Mn and Bi oxides having known valencies, the peaks of FIGS. 11 and 12 were separated by computer fitting. From the separated peak areas, an atomic ratio x of oxygen atoms to Mn or Bi atoms when the oxides were expressed by the composition formulas $MnO_x$ and $BiO_x$, and a content of $MnO_x$ in which x was 2 were calculated.

TABLE 4

| Ex. No. | Ratio of Mn oxides to Bi oxides (Mn/Bi) | Atomic ratio of oxygen to Mn (x) | Atomic ratio of oxygen to Bi (x) | Content of $MnO_2$ in $MnO_x$ (%) |
|---|---|---|---|---|
| 40 | 1.5 | 1.2 | 1.5 | 52 |
| 41 | 5.8 | 1.7 | 1.5 | 73 |
| 42 | 6.2 | 1.7 | 1.5 | 75 |
| 43 | 10.5 | 1.8 | 1.6 | 80 |
| 47 | 4.4 | 1.5 | 1.5 | 53 |
| 48 | 5.1 | 1.5 | 1.5 | 62 |
| 54 | 5.8 | 1.8 | 1.6 | 78 |
| 55 | 11.0 | 1.7 | 1.5 | 76 |
| C. 1 | 1.1 | 1.3 | 1.5 | 30 |

As seen from the results of Table 4, with the MnBi magnetic powder which is heat treated according to the present invention, the degree of decrease of the saturation magnetization is only 40% or less when the magnetic powder is maintained in the high temperature high humidity atmosphere of 60° C. and 90% RH for 7 days, and the content of metal Bi is less than 0.5, whereby the corrosion resistance is much improved.

Further, from the results of Table 4, it is understood that, near the particle surfaces of the MnBi magnetic powder having the improved corrosion resistance, the Mn oxides having the specific structure are preferentially formed. In particular, when the ratio of the Mn oxides to the Bi oxides is at least 2 in terms of the atomic ratio of Mn to Bi (Mn/Bi), the magnetic powder has excellent corrosion resistance. Furthermore, when $MnO_x$ in which x is 2 is present in an amount of 50 atomic % or more of the whole Mn oxides, the magnetic powder has the better corrosion resistance.

Example 56

Formation of oxide coating on MnBi magnetic powder

As a MnBi magnetic powder on particle surfaces of which an oxide coating is formed, a MnBi magnetic powder having a coating of $TiO_2$ or $SiO_2$ will be explained.

The following components were mixed and dispersed using ultrasonic wave at room temperature for 30 minutes:

| | |
|---|---|
| MnBi magnetic powder (stabilization treated in Example 41) | 100 wt. parts |
| Tetraisopropyl titanate | 3 wt. parts |
| Toluene | 1125 wt. parts |

In the above processing, tetraisopropyl titanate was hydrolyzed by water in the air or present on the particle surfaces of the MnBi magnetic powder and absorbed on the particle surfaces of the MnBi powder.

Then, the MnBi magnetic powder carrying the absorbed tetraisopropyl titanate was heated in a nitrogen gas at 350° C. for 2 hours, whereby tetraisopropyl titanate was condensed with liberating water to form a dense $TiO_2$ coating.

Example 57

In the same manner as in Example 56 except that the magnetic powder of Comparative Example 1 which was not subjected to the stabilization treatment was used as the MnBi magnetic powder in place of the magnetic powder of Example 41 which was subjected to the stabilization treatment, the $TiO_2$ coating was formed on the particle surfaces of the MnBi magnetic powder.

Example 58

In the same manner as in Example 56 except that tetramethoxysilane (5 wt. parts) was used in place of tetraisopropyl titanate (3 wt. parts), and the MnBi magnetic powder was maintained in an atmosphere of 60° C. and a humidity of 90% for 10 minutes to positively absorb water on the particle surfaces of the magnetic powder, tetramethoxysilane was absorbed on the particle surfaces of the magnetic powder, and heat treated to form a $SiO_2$ coating on the particle surfaces of the magnetic powder.

Example 59

In the same manner as in Example 58 except that the magnetic powder of Comparative Example 1 which was not subjected to the stabilization treatment was used as the MnBi magnetic powder in place of the magnetic powder of Example 41 which was subjected to the stabilization treatment, the $SiO_2$ coating was formed on the particle surfaces of the MnBi magnetic powder.

With each of the four magnetic powders obtained in Examples 56 to 59, an amount of magnetization at 300 K., a coercive force, a degree of decrease of an amount of magnetization and a content of metal Bi were measured. The results are shown in Table 5.

TABLE 5

| Ex. No. | Amount of magnetization (emu/g) | Coercive force (Oe) | Decrease of amount of magnetization (%) | Metal Bi content |
|---|---|---|---|---|
| 56 | 46.3 | 9500 | 7 | 0.05 |
| 57 | 39.9 | 9100 | 55 | 0.52 |
| 58 | 42.1 | 9600 | 5 | 0.04 |
| 59 | 35.4 | 8900 | 35 | 0.33 |

As seen from the result of Table 5, when the magnetic powder which is stabilization treated (Examples 56 and 58), the formation of the oxide film further improves the corrosion resistance. Even when the magnetic powder which is not stabilization treated (Examples 57 and 59), the formation of the oxide coating can improve the corrosion resistance.

Preparation of magnetic paint and magnetic layer

As a basic preparation method of a magnetic paint, the following components were thoroughly dispersed in a ball mill to obtain a magnetic paint. As the magnetic powder, the heat treated MnBi magnetic powder of Example 41 was used. This magnetic powder had an average particle size of 2.5 µm, a coercive force of 9500 Oe and saturation magnetization of 50.4 emu/g.

Example 60

A magnetic paint having the following composition was coated on a PET film having a thickness of 30 µm on which a releasing layer was formed, to a dry thickness of 15 µm, while applying a magnetic field of 1500 Oe in the longitudinal direction:

| | |
|---|---|
| MnBi magnetic powder | 100 wt. parts |
| MPR-TAO | 25 wt. parts |
| (an amine-modified vinyl chloride-vinyl acetate copolymer manufactured by NISSHIN CHEMICAL Co., Ltd.) | |
| Cyclohexanone | 50 wt. parts |
| Toluene | 50 wt. parts |

Example 61

In the same manner as in Example 60 except that ESLEC P (an amine-modified styrene-acrylate copolymer manufactured by SEKISUI CHEMICAL Co., Ltd.) in place of MPR-TAO, a magnetic paint was prepared and a magnetic layer was formed.

Example 62

In the same manner as in Example 60 except that 6 wt. parts of dodecylamine was further added as an additive, a magnetic paint was prepared and a magnetic layer was formed.

Example 63

In the same manner as in Example 60 except that 1 (one) wt. part of stearylamine was further added as an additive, a magnetic paint was prepared and a magnetic layer was formed.

Example 64

In the same manner as in Example 60 except that 6 wt. parts of stearylamine was further added as an additive, a magnetic paint was prepared and a magnetic layer was formed.

Comparative Example 2

In the same manner as in Example 60 except that VAGH (a vinyl chloride-vinyl acetate copolymer manufactured by UCC) was used in the same amount in place of MPR-TAO, and '6 wt. parts of stearylamine was further added as an additive, a magnetic paint was prepared and a magnetic layer was formed.

Comparative Example 3

In the same manner as in Example 60 except that MR-110 (a sulfonic acid-modified styrene-acrylate copolymer manufactured by NIPPON ZEON) was used in the same amount in place of MPR-TAO, a magnetic paint was prepared and a magnetic layer was formed.

Comparative Example 4

In the same manner as in Example 60 except that a phosphoric acid-modified vinyl chloride-vinyl acetate copolymer (synthesized by the inventors) was used in the same amount in place of MPR-TAO, a magnetic paint was prepared and a magnetic layer was formed.

Comparative Example 5

In the same manner as in Example 60 except that VAGH (a vinyl chloride-vinyl acetate copolymer manufactured by UCC) was used in the same amount in place of MPR-TAO, a magnetic paint was prepared and a magnetic layer was formed.

With these magnetic layers, magnetic properties and corrosion resistance were measured.

As the magnetic properties, a coercive force at 300 K. in the magnetic field of 16 kOe, a magnetic flux density Bm, and a squareness Br/Bm in the longitudinal direction were measured. As the corrosion resistance, a degree of decrease of a magnetic flux density was measured after maintaining the magnetic layer in an atmosphere of 60° C. and 90% RH for 7 days. The results were shown in Table 6.

TABLE 6

| Ex. No. | Coercive force (Oe) | Magnetic flux density (G) | Squareness | Degree of decrease of magnetic flux density (%) |
|---|---|---|---|---|
| 60 | 12,500 | 1850 | 0.84 | 20.9 |
| 61 | 11,200 | 1740 | 0.83 | 28.3 |
| 62 | 12,600 | 1530 | 0.85 | 9.3 |
| 63 | 13,000 | 1810 | 0.85 | 14.3 |
| 64 | 13,600 | 1480 | 0.86 | 8.8 |
| C. 2 | 11,800 | 1390 | 0.84 | 29.5 |
| C. 3 | 11,300 | 1820 | 0.83 | 58.3 |
| C. 4 | 12,100 | 1850 | 0.84 | 65.2 |
| C. 5 | 10,900 | 1650 | 0.82 | 41.6 |

As seen from the results of Table 6, when the conventional vinyl chloride-vinyl acetate is used as the binder resin (Comparative Example 5), the effect of the improvement of corrosion resistance cannot be expected. When the binder resin having the acidic functional group is used to further improve the dispersibility (Comparative Examples 3 and 4), the corrosion resistance is decreased. When the binder resin having the amine group as the basic functional group is used (Examples 60 and 61), the corrosion resistance is greatly improved.

By the further addition of the additive having the basic functional group, the corrosion resistance is further improved. As the amount of such additive increases, the corrosion resistance increases significantly, while the magnetic flux density tends to decrease. The reason why the inclusion of the basic functional group in the binder resin or the additive can improve the corrosion resistance greatly has not been clarified but is assumed as follows:

On the particle surfaces of the MnBi magnetic powder, the oxides of Mn are mainly formed. The oxides of Mn are basic. When the binder resin is absorbed on the particle surfaces of the magnetic powder, the functional group of the binder resin face the magnetic powder generally. If the functional group of the binder resin is acidic, an acid-base reaction takes place on the particle surface of the magnetic powder, whereby the decomposition of MnBi to Mn and Bi is accelerated. When water is present, the property of the functional group as an acid is strengthened, so that the decomposition is further accelerated and the magnetization is decreased. If the functional group of the resin or the additive is basic, the decomposition of MnBi to Mn and Bi does not occur on the particle surface of the magnetic powder when the binder resin or the additive is absorbed with the functional group facing the particle surface, since the functional group is basic. Accordingly, in this case, the functional group is absorbed without damaging the MnBi magnetic powder. In addition, once the resin or the additive having the basic functional group is absorbed on the MnBi magnetic powder, the main chain such as the alkylene block functions to prevent the reaction of the magnetic powder with water and so on which migrates from outside, whereby the corrosion resistance may be improved.

Examples 65–67

In the same manner as in Example 60 except, in place of the MnBi magnetic powder of Example 60, there was used a magnetic powder having different S* which was prepared by grinding the MnBi ingot shown in FIG. 8 in the first step and then grinding it in the second step for a grinding time of 0 hour (S*: 0.21), 1 (one) hour (S*: 0.45) or 4 hours (S*: 0.51), and further subjecting the powder to the stabilization treating under the same conditions as in Example 41, a magnetic layer was formed.

Comparative Example 6

In the same manner as in Comparative Example 3 except that the cobalt-containing γ-Fe$_2$O$_3$ magnetic powder (particle size: 0.4 μm, coercive force: 650 Oe, S*: 0.48) was used in the same amount in place of the MnBi magnetic powder, a magnetic layer was formed.

With each of the magnetic layers obtained in Examples 65–67 and Comparative Example 6, after demagnetization, its initial magnetization was measured at 300 K.. The results are shown in FIG. 13.

On each magnetic layer, data were recorded using a card reader-writer (manufactured by SANWA NEWTEC) at a recording current corresponding to the head magnetic field of about 1500 Oe, and reproduced.

Figure 13:
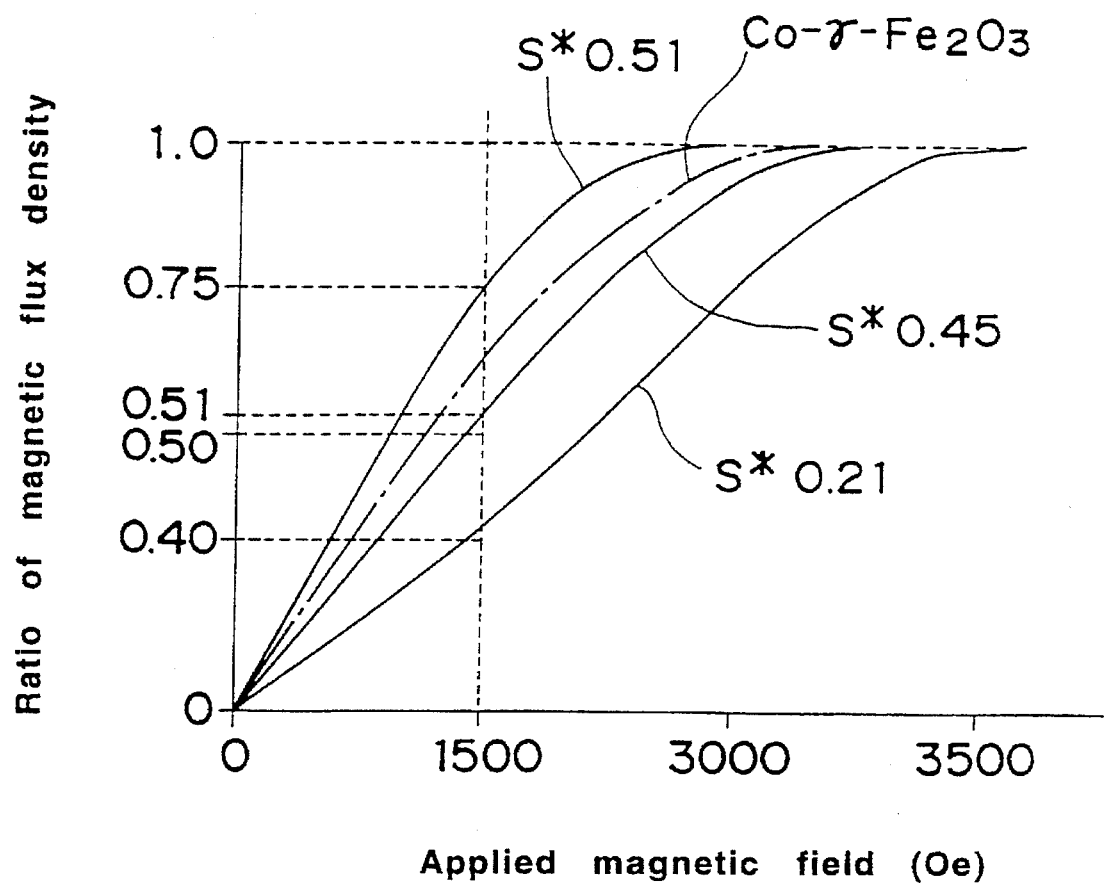
FIG. 13 shows a relationship between a magnetic flux density and a magnetic field applied to a medium comprising the MnBi magnetic powder.

The data could be reproduced normally from the magnetic layer comprising the cobalt-containing γ-Fe$_2$O$_3$ magnetic powder or the MnBi magnetic powder in which the magnetic flux density was 50% or more of the saturated magnetic flux density in FIG. 13. A reason why the data can be normally reproduced from the magnetic recording medium in which the magnetic flux density, when the magnetic field of 1500 Oe is applied, is 50% or more of the saturated magnetic flux density is assumed as follows:

When the magnetic flux density is 50% or more, the output sufficient for reading is achieved. But, when it is less than 50%, the magnetic flux density is too low and the output decreases. Further, as shown in FIG. 13, with the recording medium in which the slope of the original magnetization curve is not steep, the recording magnetization in the magnetic layer is unstabilized, so that the read error tends to occur.

From the above results, it is understood that, in the case of the magnetic recording media comprising the MnBi magnetic powder, when the original magnetization curve after demagnetization has the steeper slope, the magnetic recording medium can be recorded to saturation at the lower current, and that the data can be read without the read error from the magnetic recording medium in which the magnetic flux density, when the magnetic field of 1500 Oe is applied, is 50% or more of the saturated magnetic flux density, when they are recorded and reproduced by the card reader-writer.

Formation of water-repellent layer

When a water-repellent layer comprising a water-repellent resin is formed on the surface of the magnetic layer, the corrosion resistance and acid resistance are further improved. For example, when the water-repellent layer is formed in the magnetic card, it is provided between the releasing layer and the magnetic layer.

Hereinafter, examples in which the water-repellent layer is formed will be explained.

Example 68

A paint having the following composition was coated on a PET film having a releasing layer of an acrylic acid resin thereon, to a dry thickness of 2.5 μm to form a water-repellent layer:

| | |
|---|---|
| SARAN RESIN F216 (vinylidene chloride resin manufactured by ASAHI CHEMICAL Co., Ltd.) | 100 wt. parts |
| Tetrahydrofuran | 200 wt. parts |
| Toluene | 100 wt. parts |

On the water-repellent layer, the magnetic paint prepared in Example 64 was coated to a dry thickness of 15 μm with applying the magnetic field of 1500 Oe in the longitudinal direction. Thereafter, the film was slit in a width of 6 mm to obtain a magnetic tape.

The magnetic layer of the obtained magnetic tape was laminated on a polyvinyl chloride substrate for a magnetic card having a thickness of 0.76 mm, and pressed by a heated roll to adhere the tape to the substrate. After adhesion, the PET film was peeled off, and heat pressed by a press plate to embed the magnetic layer in the polyvinyl chloride substrate, followed by cutting to obtain a magnetic card.

Example 69

In the same manner as in Example 68 except that EVAL RESIN F216 (ethylene-vinyl alcohol copolymer manufactured by KURARAY) was used in the same amount in place of SARAN RESIN F216, a water-repellent paint was prepared and a magnetic card was produced.

Example 70

In the same manner as in Example 68 except that another water repellent layer was formed on the magnetic layer, a magnetic card was produced. That is, on the releasing layer, the water-repellent layer was formed, and on this water-repellent layer, the magnetic layer was formed. Then, on another water-repellent layer was formed on the magnetic layer so as to sandwich the magnetic layer between the water-repellent layers.

Comparative Example 7

In the same manner as in Example 68 except that no water-repellent layer was formed between the releasing layer and the magnetic layer, a magnetic card was produced.

With each of the magnetic cards produced in Examples and Comparative Examples, corrosion resistance and acid resistance were measured.

The corrosion resistance was measured as follows:

Just after the production of the card, a part of the magnetic layer was cut out, and its magnetic flux density Bm (original value) was measured by applying a magnetic field of 16 kOe at 300 K.. Then, the card was maintained in an atmosphere of 60° C. and 90% RH for 7 days, and thereafter, a part of the magnetic tape having the same area as above was cut out, and its magnetic flux density was measured by applying a magnetic field of 16 kOe at 300 K.. The corrosion resistance was evaluated from a degree of decrease of the magnetic flux density in comparison to the original value.

The acid resistance was evaluated by measuring a degree of decrease of the magnetic flux density by dipping a part of the magnetic tape in a 5% aqueous solution of acetic acid at room temperature (25° C.) for one day.

The results are shown in Table 7.

TABLE 7

| Ex. No. | Corrosion resistance (%) | Acid resistance (%) |
|---|---|---|
| 68 | 7.9 | 2.3 |
| 69 | 8.7 | 6.4 |
| 70 | 7.4 | 1.6 |
| C. 7 | 8.6 | 89.2 |

As seen from the results of Table 7, the magnetic card having the water-repellent layer (Example 68) had the slightly better corrosion resistance than one having no water-repellent card (Comparative Example 7). With respect to the acid resistance, the magnetic flux density of the magnetic card having no water-repellent layer (Comparative Example 7) decreased by 89.2%, while that of the magnetic cards having the water-repellent layer between the releasing layer and the magnetic layer (Examples 68 and 69) decreased only by 2 to 6%, and the acid resistance was significantly improved. The acid resistance was more improved in the magnetic card having the water-repellent layers which sandwiched the magnetic layer (Example 70), because the water-repellent layers prevented the migration of water into the magnetic layer from outside.

Examples 71–87

Production of magnetic card and recording-reproducing characteristics

Using various magnetic powders, magnetic paints and magnetic layers were formed, and then magnetic cards were produced and their recording-reproducing characteristics were evaluated.

As the magnetic powders, those produced by changing the grinding time and having different properties as shown in FIGS. 4–8 were used. That is, those magnetic powders were produced from the MnBi ingot produced by the method, of Example 4, and ground by the two-step grinding method of Example 35. In addition, the magnetic powders were stabilized by heat treatment by the method of Example 41 after grinding.

The magnetic paint was prepared by the same method as described in Example 64 except that a weight ratio of the magnetic powder to the binder resin was changed, and then the magnetic layer having the different weight ratio of the magnetic powder in the layer was produced. The weight ratio was deduced from a ratio of the measured magnetic flux density of each magnetic layer to the magnetic flux density of the magnetic layer consisting of 100% of the magnetic powder which was calculated from the saturation magnetization of the magnetic powder.

(1) Production of magnetic card

The magnetic card was produced by substantially the same method as that described in Example 68. The production method is briefly repeated here.

The film on which the magnetic layer was coated by the method of Example 64 was slit in a width of 6 mm to prepare a magnetic tape. Then, the magnetic layer of the magnetic tape was laminated on the polyvinyl chloride substrate of the magnetic card having the thickness of 0.76 mm, and pressed by a heated roll to adhere the tape to the substrate. After adhesion, the PET film was peeled off, and heat pressed by a press plate to embed the magnetic layer in the polyvinyl chloride substrate, followed by cutting to obtain a magnetic card.

In this Example, the results of the magnetic cards having no water-repellent layer are reported. When a water-repellent layer is formed, the production method of the magnetic card and the recording-reproducing characteristics are substantially the same as those for the magnetic card having no water-repellent layer.

(2) Recording and reproducing data

The magnetic card was cooled by dipping it in liquid nitrogen. Thereafter, it was quickly initialized by the application of the alternating magnetic field of 1000 Oe.

As data, rectangular waves at recording densities of 210 FCI and 420 FCI, respectively were recorded using the magnetic card reader-writer (CRS-700 manufactured by SANWA NEWTEC) at a recording current of 200 mA. The data was reproduced by the same magnetic card reader-writer.

Table 8 includes the results of the evaluation of the magnetic layers formed from various MnBi magnetic powders, and TAble 9 includes the results of the evaluation of the magnetic cards produced using the various MnBi magnetic powders.

With the magnetic layers, a coercive force Hc at 300 K. and 80 K., a magnetic flux density Bm at 300 K., a squareness Br/Bm, and a degree of decrease of the magnetic flux density after maintaining the magnetic layer in an atmosphere of 60° C. and 90% RH were measured. With the magnetic card, a reproducing output at 210 FCI and a resolution (a ratio of the reproducing output at 210 FCI to that at 420 FCI) were measured.

Among the important recording properties of the magnetic card, that is, the reproducing output, the resolution and the function of preventing rewriting, the reproducing output is influenced by the magnetic flux density at 300 K., and the resolution and the function of preventing rewriting are influenced by the coercive force at 300 K..

Figure 14:
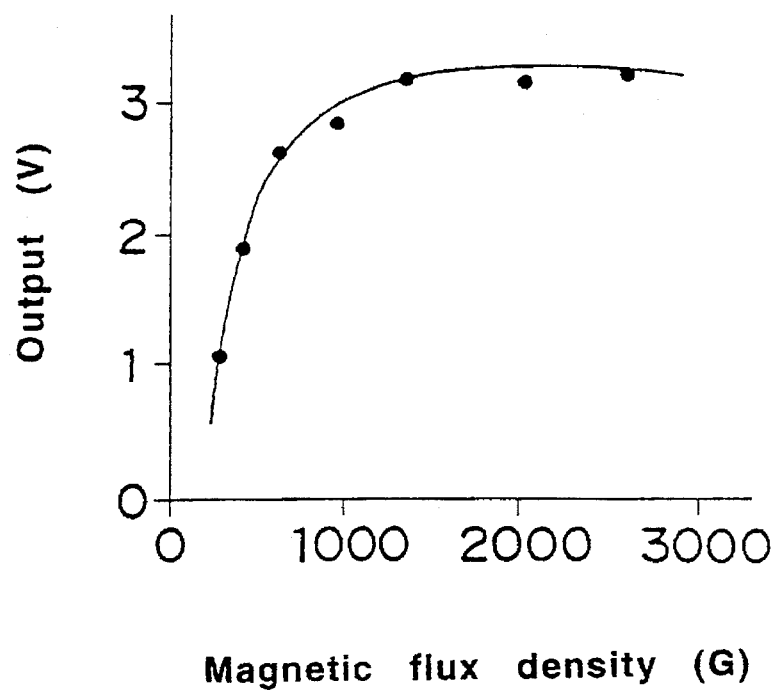
FIG. 14 shows a relationship between an output and a magnetic flux density of a medium comprising the MnBi magnetic powder.

FIG. 14 shows the relationship between the magnetic flux density and the reproducing output at 210 FCI of the magnetic cards the magnetic flux density of which were changed by varying the volume ratio of the magnetic powder with changing the coercive force from 10,000 Oe to 15,000 Oe at 300 K..

Figure 15:
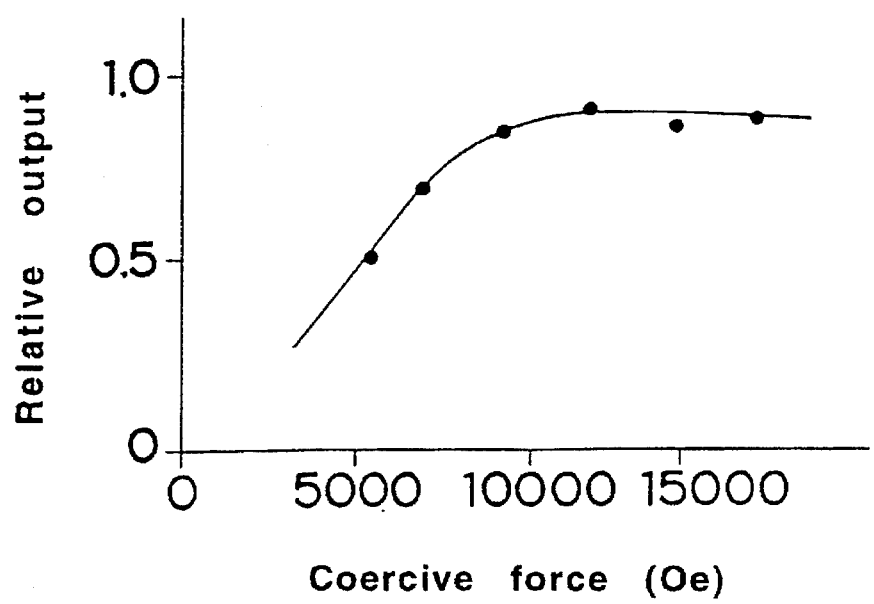
FIG. 15 shows a relationship between a function for preventing data alteration and a coercive force of a medium comprising the MnBi magnetic powder.

FIG. 15 shows the relationship between a function of rewriting of data and a coercive force of the magnetic cards the coercive force of which were changed while changing the magnetic flux density from 1200 G to 1800 G at 300 K..

The function of preventing rewriting was evaluated as follows:

After demagnetizing the magnetic card, signals of 210 FCI (direct current of 250 mA) were recorded to saturation at 300 K. and reproduced. This reproducing value was used as the original value. Using the same magnetic head as that used in recording, a direct current (500 mA) corresponding to the magnetic field of about 7000 Oe was applied to demagnetize the card. Then, the signals of 210 FCI were reproduced.

TABLE 8

| Ex. No. | Volume ratio of magnetic powder (%) | Hc at 300K (Oe) | Hc at 80K (Oe) | Bm at 300K (G) | Br/Bm | Decrease of Bm (%) |
|---|---|---|---|---|---|---|
| 71 | 34 | 16100 | 1650 | 680 | 0.87 | 29.2 |
| 72 | 35 | 15800 | 1530 | 940 | 0.87 | 18.8 |
| 73 | 37 | 15500 | 1190 | 1310 | 0.88 | 16.3 |
| 74 | 38 | 15400 | 1030 | 1320 | 0.87 | 14.2 |

TABLE 8-continued

| Ex. No. | Volume ratio of magnetic powder (%) | Hc at 300K (Oe) | Hc at 80K (Oe) | Bm at 300K (G) | Br/Bm | Decrease of Bm (%) |
|---|---|---|---|---|---|---|
| 75 | 41 | 13500 | 650 | 1510 | 0.85 | 9.3 |
| 76 | 44 | 12600 | 560 | 1850 | 0.86 | 8.8 |
| 77 | 45 | 10900 | 480 | 1890 | 0.85 | 8.7 |
| 78 | 45 | 8800 | 360 | 2040 | 0.87 | 7.3 |
| 79 | 46 | 5300 | 330 | 2150 | 0.83 | 6.3 |
| 80 | 46 | 4800 | 250 | 2100 | 0.78 | 9.3 |
| 81 | 44 | 3500 | 210 | 2090 | 0.66 | 16.1 |
| 82 | 4 | 12800 | 570 | 460 | 0.89 | 8.7 |
| 83 | 12 | 12600 | 560 | 910 | 0.88 | 8.8 |
| 84 | 19 | 12700 | 530 | 1080 | 0.87 | 8.4 |
| 85 | 53 | 10200 | 470 | 2080 | 0.80 | 11.9 |
| 86 | 61 | 9600 | 400 | 2310 | 0.69 | 13.4 |
| 87 | 64 | 8100 | 330 | 2370 | 0.63 | 22.2 |

TABLE 9

| Ex. No. | Volume ratio of magnetic powder (%) | Output at 210 FCI (V) | Resolution (%) |
|---|---|---|---|
| 71 | 34 | 1.5 | 73 |
| 72 | 35 | 2.0 | 85 |
| 73 | 37 | 2.6 | 93 |
| 74 | 38 | 2.8 | 98 |
| 75 | 41 | 3.0 | 96 |
| 76 | 44 | 3.2 | 95 |
| 77 | 45 | 3.3 | 92 |
| 78 | 45 | 3.4 | 90 |
| 79 | 46 | 3.4 | 83 |
| 80 | 46 | 3.0 | 71 |
| 81 | 44 | 2.8 | 65 |
| 82 | 4 | 1.3 | 96 |
| 83 | 12 | 1.9 | 98 |
| 84 | 19 | 2.2 | 97 |
| 85 | 53 | 2.9 | 88 |
| 86 | 61 | 2.8 | 78 |
| 87 | 64 | 2.4 | 73 |

As seen from the results of Tables 8 and 9, the magnetic layers having the coercive force of 5000 Oe or less at 300 K. have the low resolution of 80% or less. The magnetic recording media having the coercive force of 5000 Oe or less do not have the property characteristic to the magnetic recording medium of the present invention that the once recorded data cannot be rewritten.

With the magnetic layer having the coercive force of 1500 Oe at 80 K., since the demagnetization property at low temperature is insufficient, the recording at room temperature is insufficient, so that the high output may not be achieved. In particular, since the output at the high recording density, that is, at 420 FCI is lowered, the resolution is decreased. In addition, with respect to the output at 210 FCI, as the magnetic flux density increases, the output increases. When the magnetic flux density is lower than 500 G, the sufficiently high output cannot be obtained.

The squareness has a close relationship with the resolution. When the squareness is 0.60 or less, the resolution is greatly deteriorated. To achieve the optimum coercive force, magnetic flux density and squareness, the volume ratio of the magnetic powder in the magnetic layer should be optimized. When this volume ratio is from 5 to 60%, the magnetic layer and the magnetic card having the good properties as a whole can be produced.

To achieve the high coercive force at 300 K., in general, the particle size of the magnetic powder to be used should be made small. When the coercive force exceed 16,000 Oe at 300 K., the magnetic flux density decreases and then the output decreases.

As seen from FIG. 15, the function of preventing rewriting has a close relationship with the coercive force at 300 K.. When the coercive force is 5000 Oe or larger, the function of preventing rewriting is well achieved.

From the above observations, it is understood that the volume ratio of the magnetic powder, the coercive forces at 300 K. and 80 K., the magnetic flux density at 300 K. and the squareness in the longitudinal direction should be selected in good balance to provide the magnetic recording medium which satisfies the following properties at the same time:

The medium is sufficiently demagnetized in the initialization step at low temperature;

Data can be written at room temperature by an electric current as low as possible;

The magnetic powder is well dispersed, and excellent in orientation;

The output and the resolution are high enough to prevent the read error;

The magnetic recording medium has the property specific to the present invention, that is, the once recorded data being unable to be rewritten easily at room temperature; and When the magnetic recording medium is maintained at high temperature high humidity, the deterioration of the magnetic flux density is small.

These properties are related each other, and the magnetic recording medium having the above properties can be obtained when the following conditions are satisfied:

A volume ratio of the MnBi magnetic powder in the magnetic layer is from 5 to 60% ;

A coercive force measured with applying a magnetic field of 16 kOe is from 5000 to 16,000 Oe at 300 K.;

A coercive force measured with applying a magnetic field of 16 kOe is from 100 to 1500 Oe at 80 K.;

A magnetic flux density measured with applying a magnetic field of 16 kOe is from 500 to 2500 G at 300 K.; and A squareness measured with applying a magnetic field of 16 kOe is from 0.60 to 0.95.

Production of magnetic card having multiple magnetic layers or a magnetic layer containing mixed magnetic powders The magnetic recording medium comprising the MnBi magnetic powder is characterized in that the once recorded data cannot be easily rewritten at room temperature. When this characteristic is utilized in combination with other magnetic recording medium, a magnetic recording medium having a novel property which is not found in the conventional magnetic media can be obtained.

In the case of a magnetic card, two magnetic layers one of which comprises the MnBi magnetic powder and the other of which comprises the conventional magnetic powder for magnetic recording such as cobalt-containing $\gamma$-Fe$_2$O$_3$ are formed at different positions of a card, the magnetic card has two kinds of data, that is, fixed data which cannot be rewritten and data which can be freely rewritten by a user.

As the fixed data, an ID number or a secret number of a card holder and a place and a date of issue of the card are recorded, while as the rewritable data, use history of the card is recorded at every time when the card is used.

When the magnetic layer comprising the MnBi magnetic powder and the magnetic layer comprising the conventional magnetic powder such as cobalt-containing γ-Fe$_2$O$_3$ are laminated, or when the MnBi magnetic powder and the conventional magnetic powder such as cobalt-containing γ-Fe$_2$O$_3$ are used in admixture, the unrewritable fixed data and the rewritable data can be recorded in the same track.

In particular, when the multiple recording is made, not only the data can be recorded without narrowing a printing area on the surface of the magnetic card, but also decoding of the data is very difficult. Therefore, the magnetic card has very high security.

When the magnetic layer comprising the MnBi magnetic powder and the magnetic layer comprising the conventional magnetic powder such as cobalt-containing γ-Fe$_2$O$_3$ are formed at the different positions on the surface of the magnetic card, they are formed by coating the MnBi magnetic paint and the magnetic paint for the conventional magnetic recording medium at the different positions.

Then, the following Examples will explain a case where the magnetic layer comprising the MnBi magnetic powder and the magnetic layer comprising the conventional magnetic powder such as cobalt-containing γ-Fe$_2$O$_3$ are formed at the different positions on the surface of the magnetic card; a case where the magnetic layer comprising the MnBi magnetic powder and the magnetic layer comprising the conventional magnetic powder such as cobalt-containing γ-Fe$_2$O$_3$ are laminated, and a case where the MnBi magnetic powder and the conventional magnetic powder such as cobalt-containing γ-Fe$_2$O$_3$ are used in admixture.

Card having laminated layer/single layer

This example illustrates a magnetic card on which a magnetic layer comprising the MnBi magnetic powder is formed in a stripe form and a magnetic layer comprising the conventional magnetic powder used in the conventional magnetic medium such as cobalt-containing γ-Fe$_2$O$_3$ or barium ferrite magnetic powder is formed to cover the whole surface of the magnetic card.

Example 88

(1) Preparation of a paint for an unrewritable magnetic layer

As the paint for the unrewritable magnetic layer, the magnetic paint containing the MnBi magnetic powder prepared in Example 64 was used.

(2) Preparation of a paint for a rewritable magnetic layer

As a magnetic powder in the magnetic paint for the rewritable magnetic recording medium, a cobalt-containing γ-Fe$_2$O$_3$ magnetic powder having a coercive force of 640 Oe, a saturation magnetization of 74.5 emu/g and an average particle length of 0.3 μm was used.

The following components were thoroughly kneaded and dispersed in a sand grinder mill, and then a polyfunctional polyisocyanate compound (COLONATE L manufactured by Nippon Polyurethane Industries, Ltd.) (5 wt. parts) was added:

| | |
|---|---|
| Co-γ-Fe$_2$O$_3$ magnetic powder | 80 wt. parts |
| Vinyl chloride-vinyl acetate copolymer (VAGH manufactured by UCC) | 10 wt. parts |
| Polyurethane resin (T-5250 manufactured by Dainippon Ink Chemical Industries, Ltd.) | 6 wt. parts |
| Cyclohexanone | 75 wt. parts |
| Toluene | 75 wt. parts |

(3) Formation of magnetic layer

On a PET base film having a thickness of 190 μm, the magnetic paint comprising the MnBi magnetic powder was coated in a stripe form to a dry thickness of 5 μm while applying a magnetic field of 1500 Oe in the longitudinal direction. This stripe had a width of 5 mm, and was formed such that the stripe was in parallel with a long side of the magnetic card.

Subsequently, the magnetic paint comprising Co-γ-Fe$_2$O$_3$ magnetic powder was coated all over the PET base film to cover the stripe to a dry thickness of 10 μm while applying a magnetic field of 1500 Oe in the longitudinal direction.

(4) Production of magnetic card

The PET base film carrying the formed two magnetic layers was cut in the form of a card to produce a magnetic card.

(5) Initialization and recording/reproducing

The magnetic card was initialized by the method described above. That is, the card was cooled by dipping it in liquid nitrogen. Thereafter, the alternating magnetic field of 1000 Oe was applied quickly to initialize the card. Signals were recorded as follows:

Using the magnetic card reader-writer (CRS-700 manufactured by SANWA NEWTEC), in the part where the magnetic layer comprising the MnBi magnetic powder and the magnetic layer comprising the Co-γ-Fe$_2$O$_3$ magnetic powder were laminated, a series of numerical characters (0, 1, 2, 3 and 4) were recorded as unrewritable data at a recording current of 100 mA. Further, as rewritable data, a series of numerical characters (5, 6, 7, 8 and 9) were recorded in the part where only the magnetic layer comprising the Co-γ-Fe$_2$O$_3$ magnetic powder was formed at a recording current of 100 mA.

Then, using the same magnetic card reader-writer as above, the recorded data were reproduced. From the part having the laminated magnetic layers, the series of the numerical characters (0, 1, 2, 3 and 4) could be reproduced. Also, from the part having only the magnetic layer comprising the Co-γ-Fe$_2$O$_3$ magnetic powder, the series of the numerical characters (5, 6, 7, 8 and 9) could be reproduced.

To simulate the altering of the data, a series of numerical characters (5, 6, 7, 8 and 9) were overwritten in the part having the laminated magnetic layers at the recording current of 100 mA, while a series of numerical characters (0, 1, 2, 3 and 4) were overwritten in the part having only the magnetic layer comprising the Co-γ-Fe$_2$O$_3$ magnetic powder at the same recording current.

Then, the data were reproduced using the same card reader-writer. From the part having only the magnetic layer comprising the Co-γ-Fe$_2$O$_3$ magnetic powder, the data of (0, 1, 2, 3 and 4) were reproduced. It was confirmed that the data were correctly rewritten.

In the part having the laminated magnetic layers, the read error occurred, and the data could not be reproduced. This is because the data which were once recorded in the magnetic layer comprising the MnBi magnetic powder could not be rewritten, so that the data of (0, 1, 2, 3 and 4) which were originally recorded in the magnetic layer comprising the MnBi magnetic powder and the data of (5, 6, 7, 8 and 9) which were overwritten in the magnetic layer comprising the Co-γ-Fe$_2$O$_3$ magnetic powder were mixed up, whereby the read error occurred.

When the magnetic layer comprising the MnBi magnetic powder and the magnetic layer comprising the other magnetic powder such as Co-γ-Fe$_2$O$_3$ are formed at the different position on the surface of the magnetic card, the card having the fixed data which cannot be rewritten once recorded and the data which can be freely rewritten by the user can be obtained.

Example 89

In the same manner as in Example 88 except that a barium ferrite magnetic powder having a coercive force of 2800 Oe, a saturation magnetization of 64.5 emu/g and an average particle length of 0.6 μm was used in place of the Co-γ-Fe$_2$O$_3$ magnetic powder, a magnetic card was produced.

With this card, the same data as those in Example 88 were recorded and reproduced in the same ways as in Example 88. The results were the same as those in Example 88. That is, in the part where the magnetic layer comprising the MnBi magnetic powder and the magnetic layer comprising the barium ferrite powder were laminated, the read error occurred, while the data in the part where only the magnetic layer comprising the barium ferrite magnetic powder was formed were normally rewritten.

Magnetic card using the mixed magnetic powders or having laminated magnetic layers When the MnBi magnetic powder is used in combination with other magnetic powder having the coercive force of 250 to 3000 Oe at room temperature such as gamma iron oxide magnetic powder, cobalt-containing iron oxide magnetic powder, barium ferrite magnetic powder, strontium ferrite magnetic powder or metal magnetic power comprising iron, or when the magnetic layer comprising the MnBi magnetic powder and the magnetic layer comprising such other magnetic powder are laminated, the characteristic of the present invention that the altering of the data is difficult can be achieved as in the case of using only the MnBi magnetic powder. That is, if the data in the other magnetic powder or in the magnetic layer comprising the other magnetic powder are rewritten, those in the MnBi magnetic powder or in the magnetic layer comprising the MnBi magnetic powder cannot be rewritten. Then, two kinds of the signals are mixed up, and the data cannot be read by a normal reader.

As already described, the advantages of the magnetic recording medium having such structure are as follows:

Since the above magnetic powder has the larger saturation magnetization than the MnBi magnetic powder in general, the magnetic recording medium using the former magnetic powder has the larger magnetic flux density than one using the MnBi magnetic powder only, so that the high output is easily achieved.

When the oxide type magnetic powder is used in combination with the MnBi magnetic powder, those magnetic powders do not have the corrosion problem, the corrosion resistance of the magnetic recording medium is further improved.

When the MnBi magnetic powder and other magnetic powder having the small coercive force are used in combination, the data recording current can be lowered while maintaining the property that the data altering is difficult.

Multiple recording is possible when different data are written on the same track in the data recording step, and they are separately reproduced using the filter and so on when the data are reproduced.

Among these advantages, the first three are substantially the same as the advantages which are possessed by the magnetic recording medium using the MnBi magnetic powder. The fourth advantage is achieved only when the MnBi magnetic powder and the other magnetic powder are used in combination, or when the magnetic recording media using these magnetic powders are laminated, whereby the unrewritable fixed data and the rewritable data are multiple recorded on the same track.

Here, a magnetic recording medium which realizes the above fourth advantage and its recording-reproducing characteristics will be explained.

Example 90

Production of laminated magnetic card

This examples illustrates a magnetic card which comprises the magnetic recording medium using the MnBi magnetic powder and the magnetic recording medium using the other magnetic powder in the laminated form, whereby the unrewritable fixed data and the rewritable data are multiple recorded on the same track.

(1) Preparation of magnetic paint for recording unrewritable data

As a magnetic paint of a magnetic layer for recording unrewritable data, the magnetic paint comprising the MnBi magnetic powder shown in Example 64 was used.

(2) Preparation of magnetic paint for recording rewritable data

In a magnetic paint of a magnetic layer for recording rewritable data, cobalt-containing γ-Fe$_2$O$_3$ magnetic powder having a coercive force of 640 Oe, saturation magnetization of 74.5 emu/g, and an average particle length of 0.3 μm was used.

The following components were thoroughly kneaded and dispersed in a sand grinder mill, and then a polyfunctional polyisocyanate compound (COLONATE L manufactured by Nippon Polyurethane Industries, Ltd.) (5 wt. parts) was added.

| | |
|---|---|
| Co-γ-Fe$_2$O$_3$ | 80 wt. parts |
| Vinyl chloride-vinyl acetate copolymer (VAGH manufactured by UCC) | 10 wt. parts |
| Polyurethane resin (T-5250 manufactured by Dainippon Ink Chemical Industries, Ltd.) | 6 wt. parts |
| Cyclohexanone | 75 wt. parts |
| Toluene | 75 wt. parts |

(3) Formation of magnetic layer

The magnetic paint containing Co-γ-Fe$_2$O$_3$ for an upper layer was coated on a PET film having a thickness of 30 μm on which a releasing layer was formed, to a dry thickness of 10 μm, while applying a magnetic field of 1500 Oe in the longitudinal direction.

On the above formed coating layer, the magnetic paint containing the MnBi magnetic powder was coated to a dry thickness of 10 μm, while applying a magnetic field of 1500 Oe in the longitudinal direction.

(4) Production of magnetic card

By the same method as explained in Example 68, the magnetic tape was slit and embedded in the vinyl chloride resin substrate by heating and pressing to obtain a magnetic card.

(5) Initialization and recording/reproducing

The magnetic card was initialized by the same method as explained above. Signals were recorded as follows:

Using a card reader-writer (CRS-700 manufactured by SANWA NEWTEC), first, as the unrewritable data, a sine wave which corresponded to a bit length of 400 μm was recorded at a recording current of 200 mA. This signal was referred to as Signal (A).

Thereafter, using the same card reader-writer, as the rewritable data, a since curve which corresponded to a bit length of 100 μm at a recording current of 100 mA.

For reproducing the data, using the same card readerwriter, a reproducing signal voltage was measured. A reproducing output was calculated from an amplitude of the regenerated wave which was obtained by passing the output from the magnetic head through a band pass filter for separating the signals from the upper and lower layers and inputting the signals in an oscilloscope.

In the band pass filter, frequencies of a low pass filter and a high pass were set so that the frequencies between +100% and −50% from the frequency to be measured could pass.

Example 91

In the same manner as in Example 90 except that the magnetic powder used in the magnetic layer for recording the rewritable data was changed from the Co-γ-Fe$_2$O$_3$ magnetic powder to a barium ferrite magnetic powder having a coercive force of 2800 Oe, saturation magnetization of 64.5 emu/g and an average particle length of 0.6 μm, a magnetic card which had a structure comprising the magnetic layer containing the barium ferrite magnetic powder as the upper layer and the magnetic layer containing the MnBi magnetic powder as the lower layer was produced. Then, the signals were recorded and reproduced by the same way as in Example 90.

Example 92

In the same manner as in Example 90 except that the magnetic powder used in the magnetic layer for recording the rewritable data was changed from the Co-γ-Fe$_2$O$_3$ magnetic powder to a γ-Fe$_2$O$_3$ magnetic powder having a coercive force of 300 Oe, saturation magnetization of 73.4 emu/g and an average particle length of 0.5 μm, a magnetic card which had a structure comprising the magnetic layer containing the γ-Fe$_2$O$_3$ magnetic powder as the upper layer and the magnetic layer containing the MnBi magnetic powder as the lower layer was produced. Then, the signals were recorded and reproduced by the same way as in Example 90.

Example 93

This example illustrates a magnetic card on which the unrewritable fixed data and the rewritable data are multiple recorded on the same track by the use of the MnBi magnetic powder and the other magnetic powder in admixture.

In the same manner as in the preparation of the magnetic paint of the magnetic layer for recording the rewritable data, except that a mixture of the Co-γ-Fe$_2$O$_3$ magnetic powder and the MnBi magnetic powder in a weight ratio of 7:3 was used in place of the Co-γ-Fe$_2$O$_3$ magnetic powder, a magnetic paint was prepared.

The magnetic paint was coated on a PET film having a thickness of 30 μm on which a releasing layer was formed, to a dry thickness of 20 μm, while applying a magnetic field of 1500 Oe in the longitudinal direction.

Then, by the same method as explained in Example 90, the magnetic tape was slit and embedded in the vinyl chloride resin substrate by heating and pressing to obtain a magnetic card. The signals were recorded and reproduced in the same way as in Example 90.

Example 94

In the same manner as in Example 93 except that a weight ratio of the Co-γ-Fe$_2$O$_3$ magnetic powder to the MnBi magnetic powder was changed from 7:3 to 5:5, a magnetic paint was prepared, a magnetic card was produced, and the signals were recorded and reproduced.

Example 95

In the same manner as in Example 93 except that magnetic powders to be mixed were changed from the Co-γ-Fe$_2$O$_3$ magnetic powder and the MnBi magnetic powder to γ-Fe$_2$O$_3$ magnetic powder and the MnBi magnetic powder, and a mixing ratio was 7:3 in weight, a magnetic paint was prepared, a magnetic card was produced, and the signals were recorded and reproduced.

Comparative Example 8

Only the magnetic powder containing the Co-γ-Fe$_2$O$_3$ magnetic powder prepared in Example 90 was coated on a PET film having a thickness of 30 μm on which a releasing layer was formed, to a dry thickness of 20 μm, while applying a magnetic field of 1500 Oe in the longitudinal direction to obtain a magnetic card, and the signals were recorded and reproduced.

Comparative Example 9

Only the magnetic powder containing the barium ferrite powder prepared in Example 91 was coated on a PET film having a thickness of 30 μm on which a releasing layer was formed, to a dry thickness of 20 μm, while applying a magnetic field of 3000 Oe in the longitudinal direction to obtain a magnetic card, and the signals were recorded and reproduced.

Comparative Example 10

Only the magnetic powder containing the MnBi powder prepared in Example 64 was coated on a PET film having a thickness of 30 μm on which a releasing layer was formed, to a dry thickness of 20 μm, while applying a magnetic field of 1500 Oe in the longitudinal direction to obtain a magnetic card, and the signals were recorded and reproduced in the same manner as in Example 91.

With each of the magnetic cards produced in Examples 90–95 and Comparative Examples 8–10, a reproducing output was measured. The results are shown in Table 10.

To check the stability of the recorded data, after recording the data, a direct magnetic field of 4000 Oe was applied, and change of the reproducing output was measured. The results are also shown in Table 10.

TABLE 10

| Ex. No. | After recording Signal A (400 μm), Signal B (100 μm) was overwritten | | After recording Signal A (400 μm), Signal B (100 μm) was overwritten, followed by application of magnetic field of 4 kOe | |
|---|---|---|---|---|
| 90 | Signal A: 45, | Signal B: 100 | Signal A: 40, | Signal B: 0 |
| 91 | Signal A: 50, | Signal B: 85 | Signal A: 40, | Signal B: <5 |
| 92 | Signal A: 45, | Signal B: 90 | Signal A: 40, | Signal B: 0 |
| 93 | Signal A: 35, | Signal B: 105 | Signal A: 30, | Signal B: 0 |
| 94 | Signal A: 60, | Signal B: 75 | Signal A: 50, | Signal B: 0 |
| 95 | Signal A: 35, | Signal B: 100 | Signal A: 30, | Signal B: 0 |
| C. 8 | Signal A: 0, | Signal B: 155 | Signal A: 0, | Signal B: 0 |
| C. 9 | Signal A: <5, | Signal B: 125 | Signal A: 0, | Signal B: <5 |
| C. 10 | Signal A: 90, | Signal B: 15 | Signal A: 70, | Signal B: 0 |

As clearly seen from the results of Table 10, in the case of the magnetic cards of Examples 90, 91 and 92 in which the magnetic layer containing the MnBi magnetic powder and the magnetic layer containing the other magnetic powder are laminated, when the fixed Signal A and the rewritable Signal B are overwritten, they are separately reproduced at the high outputs. Also in the case of the magnetic cards (Examples 93, 94 and 95) in which the MnBi magnetic powder and the other magnetic powder are used in admixture, the fixed Signal A and the rewritable Signal B are separately reproduced at the high outputs. This is one of the characteristics of the magnetic recording medium using the MnBi magnetic powder.

In the case of the magnetic card using only the Co-γ-Fe$_2$O$_3$ magnetic powder or the barium magnetic powder (Comparative Examples 8 and 9), when the Signal B is overwritten, the Signal A is erased and cannot be reproduced.

In the case of the magnetic card using the MnBi magnetic powder only (Comparative Example 10), when the Signal B was overwritten, the Signal A is not erased and cannot be rewritten.

With respect to the stability against the magnetic field, in the case of the cards using the MnBi magnetic powder (Examples 90–95 and Comparative Example 10), the first recorded Signal A is not erased and remains after the application of the magnetic filed of 4000 Oe, which indicates that the Signal A functions as the fixed data. In the case of the cards using only the Co-γ-Fe$_2$O$_3$ magnetic powder or the barium ferrite powder (Comparative Examples 8 and 9), the first recorded Signal A and also the later recorded Signal B are both erased to levels at which they cannot be reproduced, after the application of the magnetic field of 4000 Oe.

In addition, as understood from the comparison between Examples 93 and 94, when the mixture of the MnBi magnetic powder and the other magnetic powder is used, a ratio of the output of the first recorded fixed Signal A to that of the rewritable Signal B increases as the mixed ratio of the MnBi magnetic powder increases.

In the above Examples, the magnetic recording medium in which the magnetic layers are laminated are explained by making reference to the example in which each of the magnetic layer containing the MnBi magnetic powder and the magnetic layer containing the magnetic powder other than the MnBi magnetic powder has the thickness of 10 μm. It is possible to change the ratio of the outputs of the fixed Signal A and the rewritable Signal B by changing the thicknesses of the two magnetic layers.

The above Examples illustrate the basic structures when the magnetic layers are laminated or the mixed magnetic powder is used. It is possible to form the magnetic layers on one surface or both surfaces, or to form an additional magnetic layer or a water-repellent layer between the laminated magnetic layers.

As explained above, when the magnetic card is produced by laminating the magnetic layer containing the MnBi magnetic powder and the magnetic layer containing the magnetic powder other than the MnBi magnetic powder, or by forming the magnetic layer containing the mixture of the MnBi magnetic powder and the other magnetic powder, its configuration can vary widely. For example, the magnetic layers can be formed in the stripe form, or over the whole surface of the card.

Figure 16:
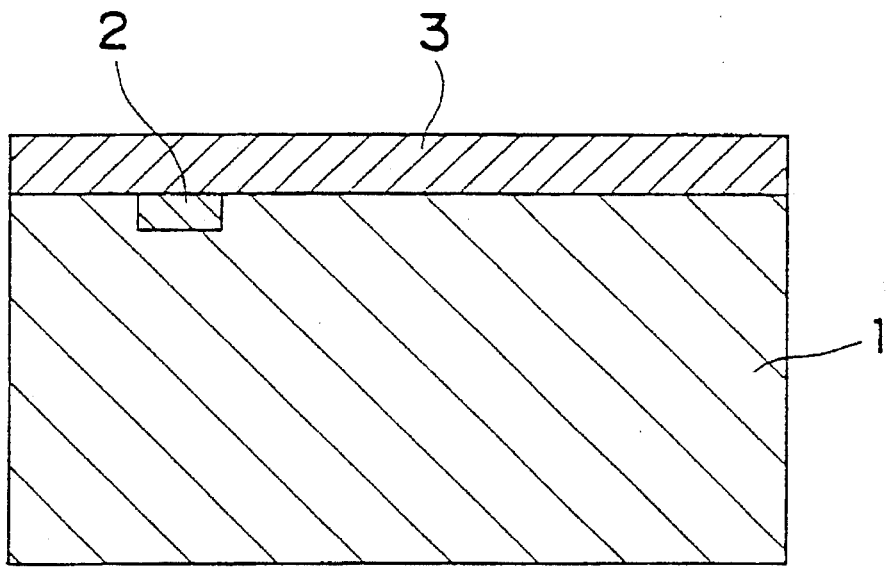
FIG. 16 is an enlarged cross sectional view of an example of the magnetic card produced in the present invention.

As shown in FIG. 16, a stripe-form magnetic layer 2 containing the MnBi magnetic powder is embedded in a card substrate 1, and a magnetic layer 3 containing the magnetic powder other than the MnBi magnetic powder is laminated over the card substrate 1 and the magnetic layer 2 containing the MnBi magnetic powder.

Figure 17:
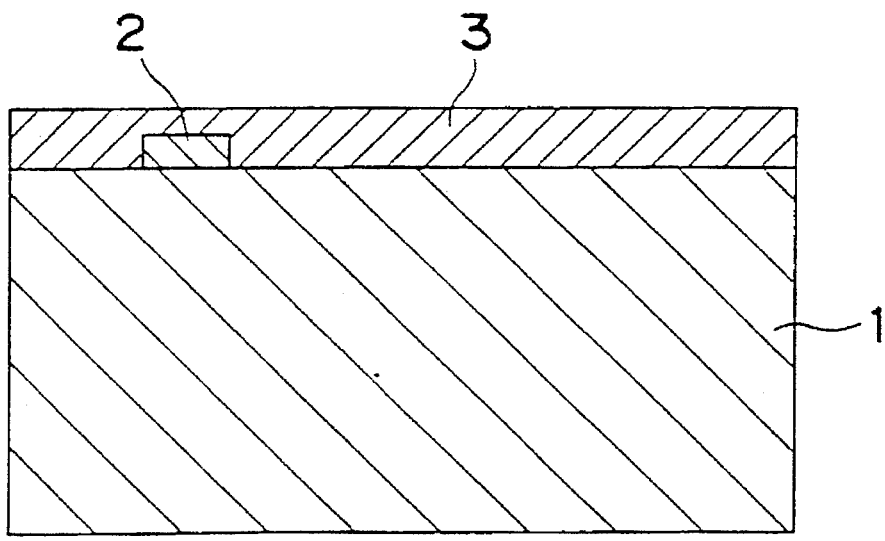
FIG. 17 is an enlarged cross sectional view of another example of the magnetic card produced in the present invention.

As shown in FIG. 17, a stripe-form magnetic layer 2 containing the MnBi magnetic powder is formed on a surface of a card substrate 1, and a magnetic layer 3 containing the magnetic powder other than the MnBi magnetic powder is laminated on the card substrate 1 to cover the magnetic layer 2 containing the MnBi magnetic powder.

Figure 18:
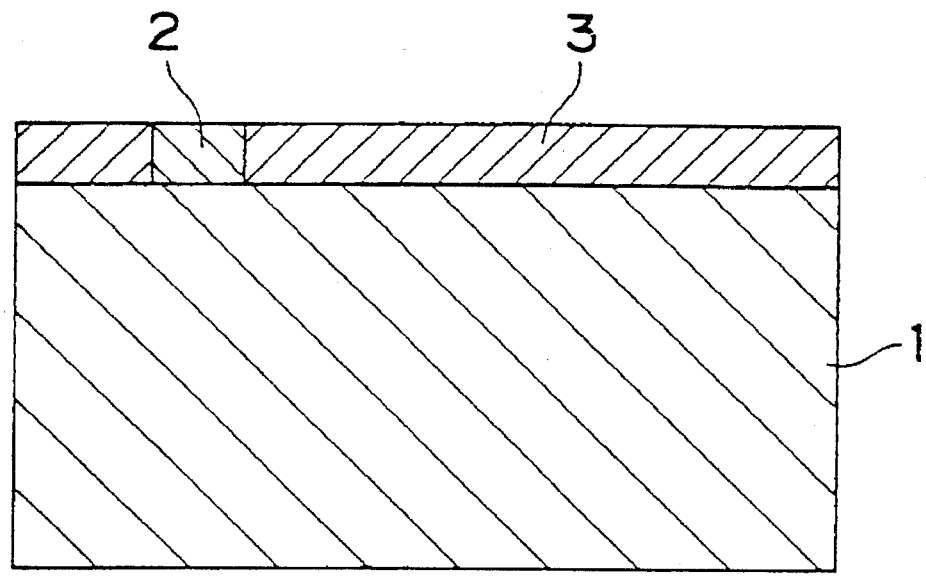
FIG. 18 is an enlarged cross sectional view of a further example of the magnetic card produced in the present invention.

As shown in FIG. 18, a magnetic layer 3 containing the magnetic powder other than the MnBi magnetic powder is formed on a card substrate 1 to sandwich a stripe-form magnetic layer 2 containing the MnBi magnetic powder.

Figure 19:
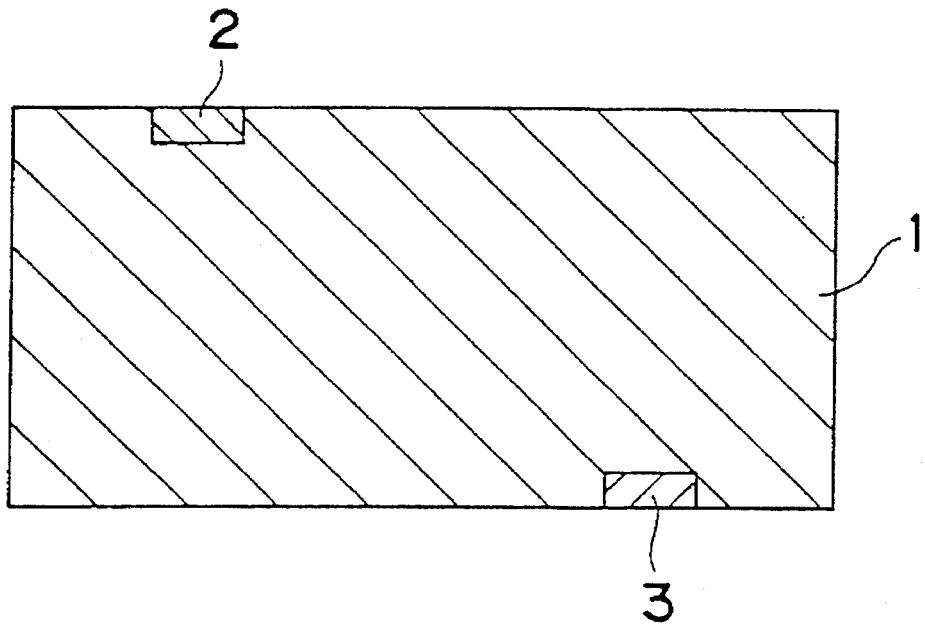
FIG. 19 is an enlarged cross sectional view of yet another example of the magnetic card produced in the present invention.
Figure 20:
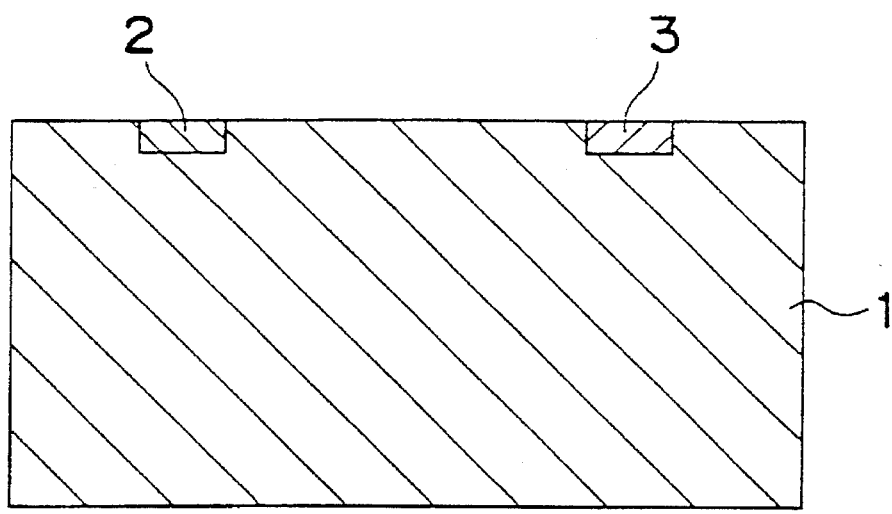
FIG. 20 is an enlarged cross sectional view of a yet further example of the magnetic card produced in the present invention.

As shown in FIG. 19, a stripe-form magnetic layer 2 containing the MnBi magnetic powder is embedded in one surface of a card substrate 1, while a stripe-form magnetic layer 3 containing the magnetic powder other than the MnBi magnetic powder is embedded in the other surface of the card substrate 1. Alternatively, as shown in FIG. 20, a stripe-form magnetic layer 2 containing the MnBi magnetic powder and a stripe-form magnetic layer 3 containing the magnetic powder other than the MnBi magnetic powder are both embedded in the same surface of a card substrate 1.

Figure 21:
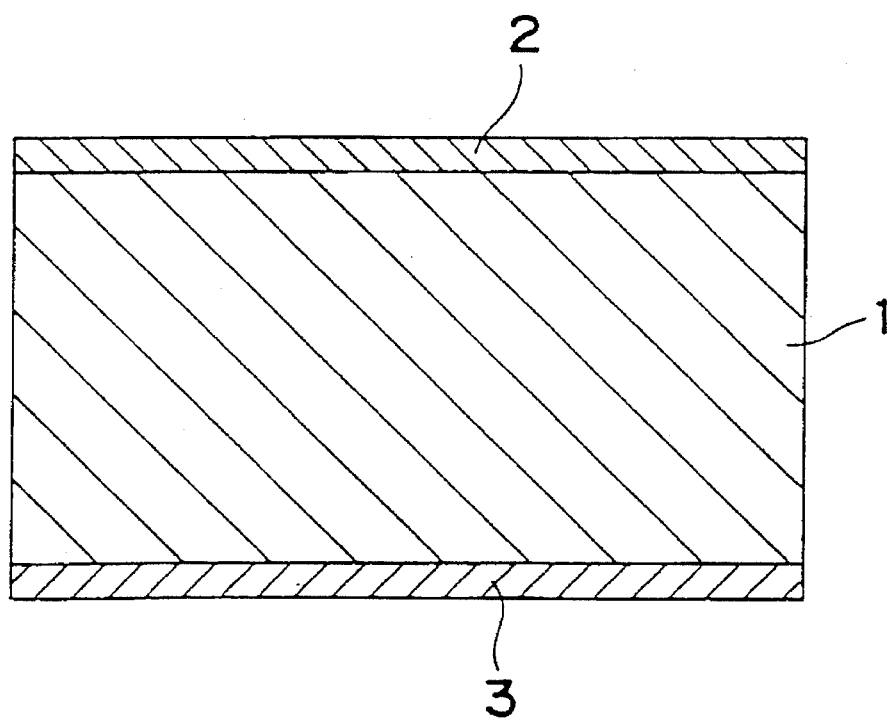
FIG. 21 is an enlarged cross sectional view of a further example of the magnetic card produced in the present invention.
Figure 22:
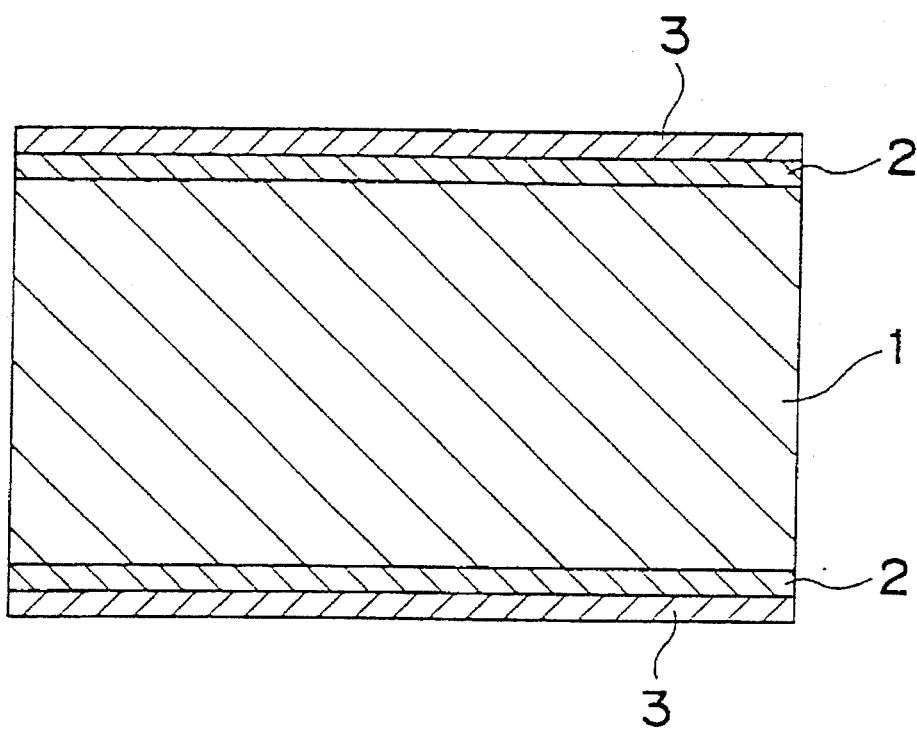
FIG. 22 is an enlarged cross sectional view of an additional example of the magnetic card produced in the present invention.

As shown in FIG. 21, a magnetic layer 2 containing the MnBi magnetic powder is formed over a whole area of one surface of a card substrate 1, while a magnetic layer 3 containing the magnetic powder other than the MnBi magnetic powder is laminated over a whole area of the other surface of the card substrate 1. Alternatively, as shown in FIG. 22, magnetic layers 2 containing the MnBi magnetic are laminated on both surfaces of a card substrate 1, and then, magnetic layers 3 containing the magnetic powder other than the MnBi magnetic powder are laminated on the respective magnetic layers 2.

Apparatus for reproducing magnetic medium

As already explained, the magnetic recording medium such as the magnetic card which uses the MnBi magnetic powder is characterized in that once recorded data cannot be easily erased at room temperature, that is, once recorded data cannot be easily altered.

One of the great characteristics of such magnetic recording medium is that the data can be read by the conventional card reader-writer and a special apparatus is not required.

When the characteristic that the once recorded data are hardly altered is combined with a highly advanced printing method which prevents the forgery of the card itself, the high security is provided.

On the other hand, the characteristic that the data recorded in the magnetic card can be read using the conventional reader by the same method as used in reading the conventional magnetic card enables the copying of such data on the conventional magnetic card.

When the card is used without being read by a person, the reading apparatus will read the copied data as correct data since they are the correct ones even if the card is the forged one.

Hereinafter, a reproducing method and apparatus, which can prevent the reproduction from the copied card, and reproduced the data only from the genuine magnetic card using the MnBi magnetic powder, will be explained.

Example 96

Figure 23:
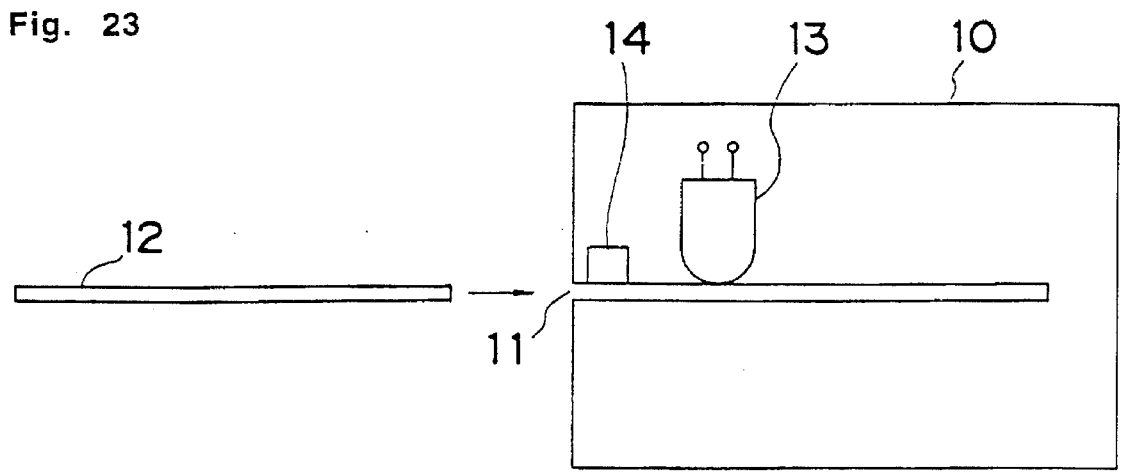
FIG. 23 is a schematic view of a reproducing apparatus according to an example of the present invention.

A reproducing apparatus is shown in FIG. 23. A reproducing apparatus 10 has a reproducing magnetic head 13 for reading data recorded in a magnetic card 12 which is inserted from a card insertion mouth 11, and a permanent magnet 14 having a magnetic field of 500 to 5000 Oe between the card insertion mouth 11 and the reproducing magnetic head 13.

Figure 24:
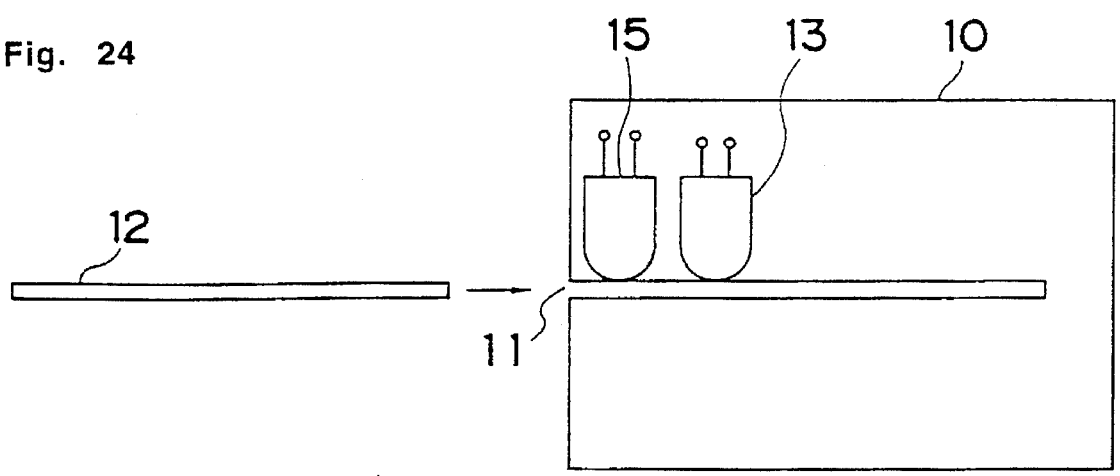
FIG. 24 is a schematic view of a reproducing apparatus according to another example of the present invention.

A reproducing apparatus 10 shown in FIG. 24 has a magnetic head 15 for applying an alternating magnetic field instead of the permanent magnet 14 of FIG. 23. Before the reproduction of the data by the reproducing magnetic head 13, the magnetic field is applied on the magnetic card by this magnetic head.

Figure 25:
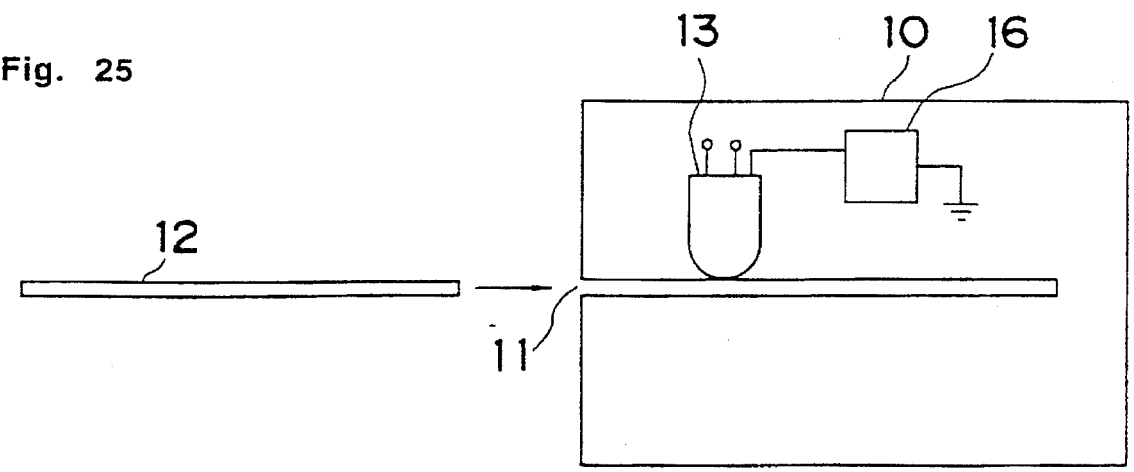
FIG. 25 is a schematic view of a reproducing apparatus according to a further example of the present invention.

In a reproducing apparatus shown in FIG. 25, a direct current bias electric power source 16 is connected to the magnetic head 13 of FIG. 23, whereby the data are reproduced while applying a direct bias magnetic field with the reproducing head 13.

When the reproducing method and apparatus of this example are used, not only the data of the fraudulently used magnetic card but also those of the genuine magnetic card may be erased by mistake. But such mistake can be prevented by designing the card so that the normal card cannot be inserted in the apparatus or can be ejected from the apparatus, or by adding an identification information other than the magnetic data to the card.

Figure 26:
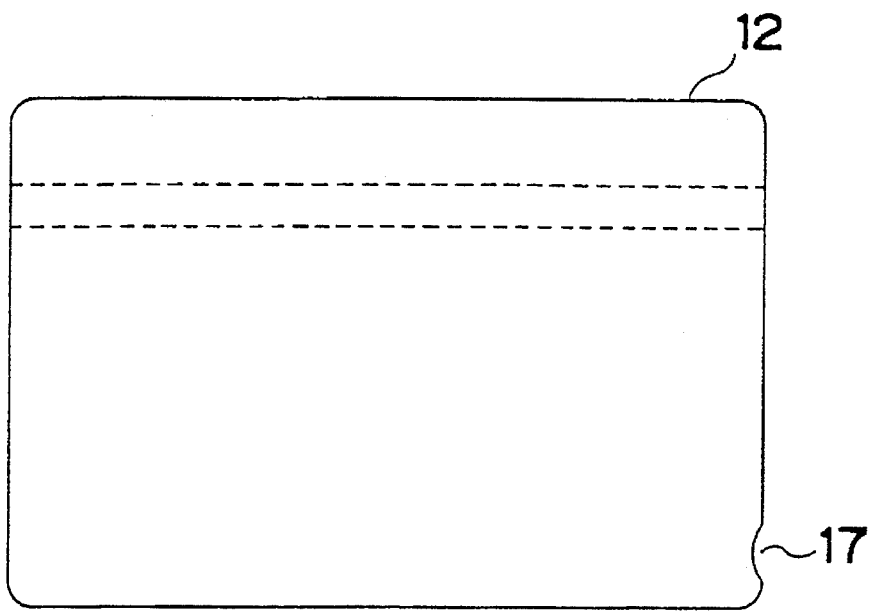
FIG. 26 is a plan view of a card form magnetic recording medium according to an example of the present invention.

FIG. 26 shows an example of a card a shape of which is differentiated from the normal card by forming a cut part 17 or a small hole in a part of a magnetic card 12. When the card is inserted in the reproducing apparatus, the cut part 17 or the small hole is optically or mechanically detected, and the card having the cut part 17 or the small hole is allowed to be inserted, while the magnetic card having neither the cut part nor the small hale is immediately ejected from the apparatus.

Figure 27:
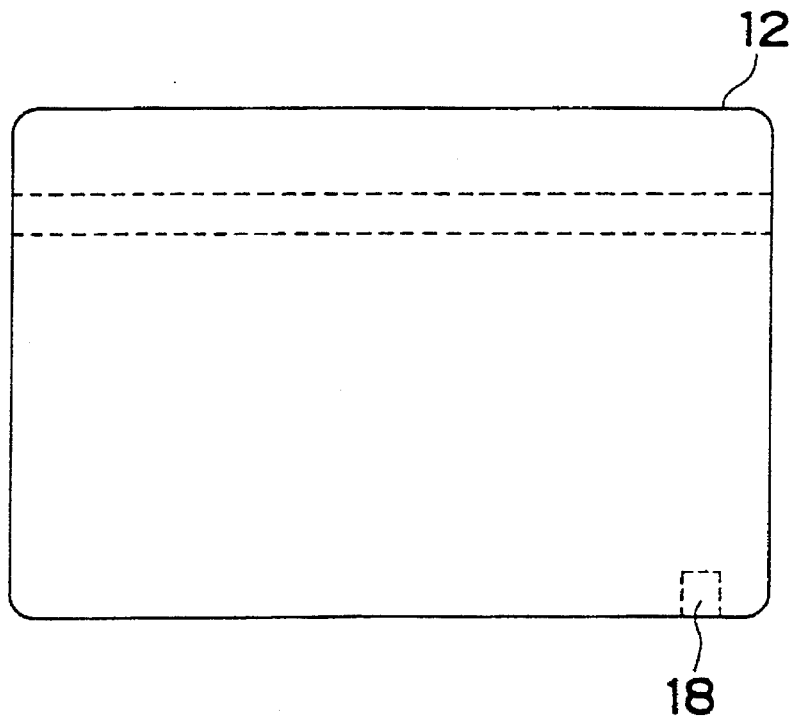
FIG. 27 is a plan view of a card form magnetic recording medium according to another example of the present invention.

FIG. 27 shows an example of a card having an identification mark 18 which is formed by a paint containing a UV-or IR light-exciting fluorescent on a surface of the magnetic card 12. This identification mark is almost transparent, it does not impair the appearance of the card.

When this card is inserted in the reproducing apparats, the above identification mark 18 is irradiated by IR or UV light to excite the fluorescent, and an emitted fluorescent light from the identification mark 18 is detected, whereby the magnetic card 12 having the identification mark 18 is distinguished from other card having no identification mark.

The results of the recording and reproducing of the magnetic card with the above apparatus will be explained.

For measurement, the magnetic cards produced in Comparative Examples 8, 9 and 10 were used. The magnetic card of Comparative Example 10 used the MnBi magnetic powder, while those of Comparative Examples 8 and 9 used the Co-γ-Fe$_2$O$_3$ magnetic powder and the barium ferrite magnetic powder which are used in the conventional magnetic recording media.

The card using the MnBi magnetic powder was initialized and the data were recorded. As explained above, the card was initialized by dipping it in liquid nitrogen, and quickly applying the alternating magnetic field of 1000 Oe. Then, using the magnetic card reader-writer, a rectangular wave was recorded at a recording current of 200 mA and a recording density of 210 FCI.

In the same manner as above except the initialization, the data were recorded on the magnetic cards of Comparative Examples 7 and 8.

The data was reproduced using the reader-writer which was used in the data recording to obtain an initial reproducing output. The reader-writer had a MnZn ferrite head having a gap length of 20 μm.

Then, using the apparatus of FIG. 23, an output of each magnetic card was measured. On the surface of the magnetic card, an intensity of the magnetic field generated by the permanent magnet 14 was about 2500 Oe. The output value measured by this reproducing apparatus was expressed as a relative value to the initial reproducing output measured by the reader-writer. The output value was calculated from an amplitude of a reproduced wave imaged on an oscilloscope.

Separately, using the reproducing apparatus of FIG. 24 having a ring-form magnetic head having a gap length of 40 μm instead of the permanent magnet 14, the same measurement was carried out. To the ring-form magnetic head, a magnetic field was applied by passing a current having a frequency of 1 kHz and a recording current of 100 mA. An intensity of the magnetic field was about 2000 Oe at the position of the magnetic layer. The results of the output measurements using the above two apparatuses are shown in Table 11.

TABLE 11

|  | Apparatus (A) | Apparatus (B) |
| --- | --- | --- |
| Magnetic card of C. Ex. 8 Magnetic powder: Co-γ-Fe$_2$O$_3$ | 0 | 0 |
| Magnetic card of C. Ex. 9 Magnetic powder: Barium ferrite | 0.05 | 0.11 |
| Magnetic card of C. Ex. 10 Magnetic powder: MnBi | 0.88 | 0.91 |

As seen from the results of Table 11, when the magnetic field having a smaller intensity than the coercive force of the magnetic card using the MnBi magnetic powder is applied to the magnetic layer before the reproduction of the signal with the magnetic head, the magnetic card using the MnBi magnetic powder suffers from substantially no change of the reproducing output, while the magnetic cards using the conventional magnetic powders for magnetic recording suffer from the great decrease of the output.

When the data recorded on the genuine magnetic card using the MnBi magnetic powder are copied in the card using the conventional magnetic powder, they are erased or destroyed and cannot be read. Then only the data in the genuine magnetic card using the MnBi magnetic card can be reproduced. Accordingly, the fraudulent use of the copied card is prevented.

Effects of the Invention

As explained above, the magnetic powder of the present invention has greatly improved corrosion resistance, and hardly suffers from the deterioration of saturation magnetization.

The magnetic recording medium of the present invention such as the magnetic card according to the present invention has the characteristic that once recorded data cannot be easily erased at room temperature so that the altering of data, which is one of the big problems of the magnetic cards, can be prevented. In addition, the saturation magnetization is not deteriorated after long-period storage at high temperature high humidity.

Since the magnetic recording medium of the present invention has the property that its coercive force is very high and about 10,000 Oe or higher at room temperature while it decreases to 1500 Oe or lower at a temperature of 100 K. or lower, it is demagnetized by cooling it at a low temperature of 100 K. or lower, and the data are recorded using a magnetic head at room temperature and reproduced using a reproducing apparatus which has means for applying a direct or alternating magnetic field an intensity of which is smaller than the coercive force of the magnetic layer to the magnetic layer, on an upstream side in relation to a magnetic head of the reproducing apparatus.

What is claimed is:

1. A magnetic powder comprising MnBi, wherein an average particle size of the magnetic powder is from 0.1 μm to 20 μm; a coercive force is from 3000 to 15,000 Oe at 300 K. and 50 to 1000 Oe at 80 K. when measured with applying a magnetic field of 16 KOe; an amount of magnetization is from 20 emu/g to 60 emu/g when measured at 300 K. with applying a magnetic field of 16 KOe; a degree of decrease of an amount of magnetization is 40% or less after being maintained in an atmosphere of 60° C. and 90% RH for 7 days; and a content of metal bismuth (Bi) satisfies the following equation:

Metal Bi/(MnBi+metal Bi)<0.5 wherein "metal Bi" means a peak area assigned to the (012) plane in a X-ray diffraction pattern of Bi, and "MnBi" means a peak area assigned to the (101) plane in a X-ray diffraction pattern of MnBi.

2. The magnetic powder according to claim 1, which has a coating of an inorganic material having a thickness corresponding to an amount of 1 to 50 wt. % based on the weight of powder particles.

3. The magnetic powder according to claim 2, wherein said inorganic material of the coating comprises oxides or hydroxides of Mn and Bi, and a ratio of said oxide or hydroxide of Mn to said oxide or hydroxide of Bi is at least 2 in terms of an atomic ratio of Mn to Bi (Mn/Bi).

4. The magnetic powder according to claim 3, wherein an atomic ratio x of Mn to an oxygen atom is from 1 to 3.5 when said oxide of Mn is expressed by the formula: $MnO_x$, and an atomic ratio x of Bi to an oxygen atom is from 1.5 to 2.5 when said oxide of Bi is expressed by the formula: $BiO_x$.

5. The magnetic powder according to claim 4, wherein a content of an oxide of the formula: $MnO_x$ in which x is 2 is at least 50 atomic % of the Mn oxides or Mn hydroxides.

6. The magnetic powder according to claim 5, wherein a content of an oxide of the formula: $MnO_x$ in which x is 2 comprises $\beta$-$MnO_2$.

7. The magnetic powder according to claim 2, wherein said inorganic material of the coating is an oxide of at least one metal selected from the group consisting of titanium, silicon, aluminum, zirconium, magnesium, lead and phosphorus.

8. The magnetic powder according to claim 2, wherein said inorganic material of the coating comprises oxides or hydroxides of Mn and Bi, and an oxide of at least one metal selected from the group consisting of titanium, silicon, aluminum, zirconium, magnesium, lead and phosphorus.

9. The magnetic powder according to claim 7, wherein a content of said oxide of at least one metal selected from the group consisting of titanium, silicon, aluminum, zirconium, magnesium, lead and phosphorus is from 2 to 50 atomic % based on MnBi.

10. The magnetic powder according to claim 1, which further comprises 0.6 to 5.0 atomic % of at least one element selected from the group consisting of nickel, aluminum, copper, platinum, zinc and iron, based on MnBi.

11. A method for producing MnBi comprising the steps of mixing Mn powder or Mn-containing powder and Bi powder or Bi-containing powder both having a particle size of 50 to 300 mesh in amounts such that a molar ratio of Mn to Bi is from 45:55 to 65:35, press molding the mixture, and heating and reacting the mixture in a non-oxidizing or reducing atmosphere at a temperature not higher than the melting point of Bi to form MnBi.

12. The method according to claim 11, which further comprises a step of grinding obtained MnBi in a non-oxidizing atmosphere to form fine magnetic powder of MnBi.

13. The method according to claim 12, which further comprises a step of heat treating said fine magnetic powder of MnBi in an atmosphere containing oxygen.

14. The method according to claim 13, wherein a heat treating temperature is from 20° to 250° C.

15. The method according to claim 12, which further comprises a step of heating treating said fine magnetic powder of MnBi in an atmosphere containing oxygen and then in a non-oxidizing atmosphere.

16. The method according to claim 15, wherein a heat treating temperature in said atmosphere containing oxygen is from 20° to 250° C., and a heat treating temperature in said non-oxidizing atmosphere is from 200° to 400° C.

17. A magnetic recording medium comprising a magnetic layer which contains a MnBi magnetic powder in an amount of 5 to 60 vol. % based on the magnetic layer, wherein a coercive force is from 5000 to 16,000 Oe at 300 K. and 100 to 1500 Oe at 80 K. when measured with applying a magnetic field of 16 KOe; a magnetic flux density is from 500 to 2500 G when measured at 300 K. with applying a magnetic field of 16 KOe; a squareness in the longitudinal direction is from 0.60 to 0.95; a degree of decrease of the magnetic flux density is 50% or less after being maintained in an atmosphere of 60° C. and 90% RH for 7 days.

18. The magnetic recording medium according to claim 17, wherein, after demagnetization by cooling at a low temperature, a magnetic flux density at 300 K. in a magnetic field of 1500 Oe is at least 50% of a saturated magnetic flux density at 300 K.

19. The magnetic recording medium according to claim 17, wherein a thickness of said magnetic layer is from 3 to 30 μm.

20. The magnetic recording medium according to claim 17, wherein said magnetic layer further contains an additive compound having at least one basic functional group selected from the group consisting of imine, amine, amide, thiourea, thiazole, ammonium salt or phosphonium compound.

21. The magnetic recording medium according to claim 17, wherein said magnetic layer is a laminate of a magnetic layer comprising a magnetic powder containing MnBi, and a magnetic layer comprising at least one magnetic powder selected from the group consisting of a gamma iron oxide magnetic powder, a cobalt-containing iron oxide magnetic powder, a barium ferrite magnetic powder, a strontium ferrite magnetic powder and a metal magnetic powder comprising iron.

22. The magnetic recording medium according to claim 21, wherein a total thickness of the laminate magnetic layers is from 4 to 30 μm, and a thickness of each of the magnetic layers is from 2 to 20 μm.

23. The magnetic recording medium according to claim 17, wherein said magnetic layer comprises a MnBi magnetic powder and at least one magnetic powder selected from the group consisting of a gamma iron oxide magnetic powder, a cobalt-containing iron oxide magnetic powder, a barium ferrite magnetic powder, a strontium ferrite magnetic powder and a metal magnetic powder comprising iron.

24. The magnetic recording medium according to claim 17, wherein two different signals are to be recorded in the same track of said magnetic layer.

25. The magnetic recording medium according to claim 17, which further comprises a water-repellent layer on a surface of said magnetic layer, or between said magnetic layer and a substrate of the medium.

26. The magnetic recording medium according to claim 17, which is a card-form magnetic recording medium carrying said magnetic layer or layers on one or both of surfaces of a card-form substrate.

27. A magnetic card comprising a magnetic stripe of a magnetic layer which comprises at least one magnetic powder having a coercive force of 250 to 3000 Oe measured at 300 K. selected from the group consisting of a gamma iron oxide magnetic powder, a cobalt-containing iron oxide magnetic powder, a barium ferrite magnetic powder, a strontium ferrite magnetic powder and a metal magnetic powder comprising iron, and a magnetic stripe of a magnetic layer which comprises a magnetic powder comprising MnBi and having an average particle size of from 0.1 µm to 20 µm, a coercive force of from 3000 to 15,000 Oe at 300 K. and 50 to 1000 Oe at 80 K. when measured with applying a magnetic field of 16 KOe and an amount of magnetization of from 20 emu/g to 60 emu/g when measured at 300 K. with applying a magnetic field of 16 KOe, which stripes are formed on one surface of a card-form substrate, or respective surfaces of a card-form substrate.

28. A magnetic card comprising a magnetic stripe of a magnetic layer which comprises a magnetic powder comprising MnBi and having an average particle size of from 0.1 µm to 20 µm, a coercive force of from 3000 to 15,000 Oe at 300 K. and 50 to 1000 Oe at 80 K. when measured with applying a magnetic field of 16 KOe and an amount of magnetization of from 20 emu/g to 60 emu/g when measured at 300 K. with applying a magnetic field of 16 KOe, and a magnetic layer which comprises at least one magnetic powder having a coercive force of 250 to 3000 Oe measured at 300 K. selected from the group consisting of a gamma iron oxide magnetic powder, a cobalt-containing iron oxide magnetic powder, a barium ferrite magnetic powder, a strontium ferrite magnetic powder and a metal magnetic powder comprising iron, said latter magnetic layer being formed over said magnetic stripe and having an area wider than that of said magnetic stripe.

29. The magnetic card according to claim 28, wherein said magnetic layer which comprises at least one magnetic powder having a coercive force of 250 to 3000 Oe measured at 300 K. selected from the group consisting of a gamma iron oxide magnetic powder, a cobalt-containing iron oxide magnetic powder, a barium ferrite magnetic powder, a strontium ferrite magnetic powder and a metal magnetic powder comprising iron is formed all over a surface of the card.

30. The magnetic card according to claim 28 or wherein unrewritable data are recorded in an area in which said magnetic layer which comprises a magnetic powder comprising MnBi and having an average particle size of from 0.1 µm to 20 µm, a coercive force of from 3000 to 15,000 Oe at 300 K. and 50 to 1000 Oe at 80 K. when measured with applying a magnetic field of 16 KOe and an amount of magnetization of from 20 emu/g to 60 emu/g when measured at 300 K. with applying a magnetic field of 16 KOe, and said magnetic layer which comprises at least one magnetic powder having a coercive force of 250 to 3000 Oe measured at 300 K. selected from the group consisting of a gamma iron oxide magnetic powder, a cobalt-containing iron oxide magnetic powder, a barium ferrite magnetic powder, a strontium ferrite magnetic powder and a metal magnetic powder comprising iron are laminated, and rewritable data are recorded in an area which has only said magnetic layer which comprises at least one magnetic powder having a coercive force of 250 to 3000 Oe measured at 300 K. selected from the group consisting of a gamma iron oxide magnetic powder, a cobalt-containing iron oxide magnetic powder, a barium ferrite magnetic powder, a strontium ferrite magnetic powder and a metal magnetic powder comprising iron.

31. The magnetic card according to claim 27, which further comprises a water-repellent layer on a surface of said magnetic layer, or between said magnetic layer and a substrate of the medium.

32. The magnetic card according to claim 27, wherein one surface of said magnetic card is a surface for printing.

33. The magnetic card according to claim 27, which has, on a back face, a magnetic layer which comprises at least one magnetic powder having a coercive force of 250 to 3000 Oe measured at 300 K. selected from the group consisting of a gamma iron oxide magnetic powder, a cobalt-containing iron oxide magnetic powder, a barium ferrite magnetic powder, a strontium ferrite magnetic powder and a metal magnetic powder comprising iron.

34. The magnetic card according to claim 27, which further comprises a nonmagnetic layer having a thickness of 1 to 10 µm on said magnetic layer.

35. The magnetic card according to claim 27, wherein the number of tracks to be recorded on said magnetic stripe is at least 2.

36. The magnetic card according claim 27, which has an identification information for distinguishing said card from other magnetic card.

37. The magnetic card according to claim 36, wherein said identification information comprises a latent mark.

38. A method for recording and reproducing a magnetic recording medium which comprises a magnetic layer containing a MnBi magnetic powder in an amount of 5 to 60 vol. % based on the magnetic layer, and has a coercive force of from 5000 to 16,000 Oe at 300 K. and 100 to 1500 Oe at 80 K. when measured with applying a magnetic field of 16 KOe, a magnetic flux density of from 500 to 2500 G when measured at 300 K. with applying a magnetic field of 16 KOe and a squareness in the longitudinal direction of from 0.60 to 0.95, which method comprises demagnetizing said magnetic recording medium by cooling it to a low temperature, and recording and reproducing a signal using a magnetic head.

39. The method according to claim 38, wherein an alternating magnetic field is further applied to said magnetic recording medium while it is in the cooled state or just after it is cooled, when said magnetic recording medium is demagnetized by cooling.

40. A method for recording and reproducing a magnetic recording medium which comprises a magnetic layer containing a MnBi magnetic powder in an amount of 5 to 60 vol. % based on the magnetic layer, and has a coercive force of from 5000 to 16,000 Oe at 300 K. and 100 to 1500 Oe at 80 K. when measured with applying a magnetic field of 16 KOe, a magnetic flux density of from 500 to 2500 G when measured at 300 K. with applying a magnetic field of 16 KOe and a squareness in the longitudinal direction of from 0.60 to 0.95, which method comprises demagnetizing said magnetic recording medium by cooling it to a low temperature, recording a signal using a magnetic head, applying an alternating magnetic field to said magnetic layer to stabilize the signal, and reproducing the signal using the magnetic head.

41. The method according to claim 40, wherein an intensity of said alternating magnetic field to be applied for stabilizing the signal is from 3000 to 10,000 Oe.

42. A method for recording signals in a magnetic recording medium comprising a magnetic layer which comprises a magnetic powder comprising MnBi and having an average particle size of from 0.1 µm to 20 µm, a coercive force of from 3000 to 15,000 Oe at 300 K. and 50 to 1000 Oe at 80 K. when measured with applying a magnetic field of 16 KOe and an amount of magnetization of from 20 emu/g to 60 emu/g when measured at 300 K. with applying a magnetic field of 16 KOe, and a magnetic layer which comprises at least one magnetic powder having a coercive force of 250 to 3000 Oe measured at 300 K. selected from the group consisting of a gamma iron oxide magnetic powder, a cobalt-containing iron oxide magnetic powder, a barium ferrite magnetic powder, a strontium ferrite magnetic powder and a metal magnetic powder comprising iron, two magnetic layers being laminated, which method comprises recording a first signal in both magnetic layers, and recording a second signal with overlapping at least a part of a track in which the first signal is recorded, whereby the first signal is recorded in the former magnetic layer, and the second signal is recorded in the latter magnetic layer.

43. A method for recording signals in a magnetic recording medium comprising a magnetic layer which comprises a magnetic powder comprising MnBi and having an average particle size of from 0.1 μm to 20 μm, a coercive force of from 3000 to 15,000 Oe at 300 K. and 50 to 1000 Oe at 80 K. when measured with applying a magnetic field of 16 KOe and an amount of magnetization of from 20 emu/g to 60 emu/g when measured at 300 K. with applying a magnetic field of 16 KOe, and at least one magnetic powder having a coercive force of 250 to 3000 Oe measured at 300 K. selected from the group consisting of a gamma iron oxide magnetic powder, a cobalt-containing iron oxide magnetic powder, a barium ferrite magnetic powder, a strontium ferrite magnetic powder and a metal magnetic powder comprising iron, which method comprises recording a first signal in said magnetic layer, and recording a second signal which is different from the first signal with overlapping at least a part of a track in which the first signal is recorded, whereby the two different kinds of signals are recorded in the magnetic layer.

44. A method for reproducing a signal which is recorded in a magnetic recording medium comprising a magnetic layer which contains a MnBi magnetic powder in an amount of 5 to 60 vol. % based on the magnetic layer and has a coercive force of from 5000 to 16,000 Oe at 300 K. and 100 to 1500 Oe at 80 K. when measured with applying a magnetic field of 16 KOe, a magnetic flux density of from 500 to 2500 G when measured at 300 K. with applying a magnetic field of 16 KOe and a squareness in the longitudinal direction of from 0.60 to 0.95, which method comprises applying a direct or alternating magnetic field having an intensity smaller than said coercive force of the magnetic layer to said magnetic layer before reproducing the signal using a magnetic head.

45. The method according to claim 44, wherein said direct magnetic field is applied using a permanent magnet.

46. A method for reproducing a signal which is recorded in a magnetic recording medium comprising a magnetic layer which contains a MnBi magnetic powder in an amount of 5 to 60 vol. % based on the magnetic layer and has a coercive force of from 5000 to 16,000 Oe at 300 K. and 100 to 1500 Oe at 80 K. when measured with applying a magnetic field of 16 KOe, a magnetic flux density of from 500 to 2500 G when measured at 300 K. with applying a magnetic field of 16 KOe and a squareness in the longitudinal direction of from 0.60 to 0.95, which method comprises applying a bias magnetic field having an intensity smaller than said coercive force of the magnetic layer to said magnetic layer during reproducing the signal using a magnetic head.

47. An apparatus for reproducing a signal from a magnetic recording medium comprising a magnetic layer which contains a MnBi magnetic powder in an amount of 5 to 60 vol. % based on the magnetic layer and has a coercive force of from 5000 to 16,000 Oe at 300 K. and 100 to 1500 Oe at 80 K. when measured with applying a magnetic field of 16 KOe, a magnetic flux density of from 500 to 2500 G when measured at 300 K. with applying a magnetic field of 16 KOe and a squareness in the longitudinal direction of from 0.60 to 0.95, which apparatus comprises a magnetic head for reproducing data which are magnetically recorded in said magnetic recording medium, and means for applying a direct or alternating magnetic field an intensity of which is smaller than said coercive force of the magnetic layer onto the magnetic layer, said means being provided on an upstream side in relation to said magnetic head.

48. The apparatus according to claim 47, wherein means for applying the direct magnetic field is a permanent magnet.

* * * * *